(12) United States Patent
Prakash et al.

(10) Patent No.: US 8,709,521 B2
(45) Date of Patent: Apr. 29, 2014

(54) SWEETENER COMPOSITIONS HAVING ENHANCED SWEETNESS AND IMPROVED TEMPORAL AND/OR FLAVOR PROFILES

(75) Inventors: Indra Prakash, Alpharetta, GA (US); Grant E. DuBois, Roswell, GA (US); George A. King, Atlanta, GA (US); Rafael I. San Miguel, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 684 days.

(21) Appl. No.: 12/120,876

(22) Filed: May 15, 2008

(65) Prior Publication Data

US 2009/0053378 A1 Feb. 26, 2009

Related U.S. Application Data

(60) Provisional application No. 60/939,549, filed on May 22, 2007.

(51) Int. Cl.
*A23L 1/236* (2006.01)

(52) U.S. Cl.
USPC .......................................... 426/548; 426/534

(58) Field of Classification Search
USPC .......... 426/534, 535, 536, 537, 538, 548, 658
See application file for complete search history.

(56) References Cited

U.S. PATENT DOCUMENTS

| | | | |
|---|---|---|---|
| 4,627,987 A * | 12/1986 | Barnett et al. | 426/548 |
| 4,871,570 A | 10/1989 | Barnett et al. | |
| 5,437,880 A | 8/1995 | Takaichi et al. | |
| 7,879,376 B2 * | 2/2011 | Boghani et al. | 426/5 |
| 2005/0084506 A1 * | 4/2005 | Tachdjian et al. | 424/400 |
| 2006/0045953 A1 * | 3/2006 | Tachdjian et al. | 426/534 |
| 2006/0286202 A1 | 12/2006 | Boghani et al. | |
| 2006/0286259 A1 | 12/2006 | Hargreaves | |

FOREIGN PATENT DOCUMENTS

| | | |
|---|---|---|
| EP | 0131640 A | 1/1985 |
| JP | 60019472 A | 1/1985 |
| JP | 60019473 A | 1/1985 |
| JP | 03251160 | 11/1991 |
| JP | 07143860 | 6/1995 |
| JP | 08000214 A | 9/1996 |
| JP | 08256725 A | 10/1996 |
| JP | 10136953 | 5/1998 |
| JP | 11123069 | 11/1999 |
| JP | 11346708 A | 12/1999 |
| JP | 2000270804 A | 10/2000 |
| JP | 2006238828 A | 9/2006 |
| JP | 2008530017 | 8/2008 |
| JP | 2008530020 | 8/2008 |
| WO | WO 9915032 A | 4/1999 |
| WO | WO 0001253 A | 1/2000 |
| WO | WO 0062628 A1 | 10/2000 |
| WO | WO 2006024587 A | 3/2006 |
| WO | WO 2006127935 A1 | 11/2006 |
| WO | WO 2007061795 A1 | 5/2007 |
| WO | WO 2007084185 A1 | 7/2007 |

OTHER PUBLICATIONS

Prakash, I. et al. "Development of Rebiana, a Natural, Non-Caloric Sweetener" Food and Chemical Toxicology, 2008, vol. 46, p. S75-S82.

Schiffman et al. "Synergism Among Ternary Mixtures of Fourteen Sweeteners," Chemical Senses 2000, vol. 25, p. 131-140.

* cited by examiner

*Primary Examiner* — Leslie Wong

(74) *Attorney, Agent, or Firm* — King & Spalding

(57) ABSTRACT

The present invention relates generally to improving the taste of sweetener compositions having enhanced sweetness. In particular, the present invention relates to compositions that can improve the tastes of sweetness enhanced sweetener compositions including at least one sweetness enhancer and at least one sweetener by imparting a more sugar-like taste or characteristic. In particular, the compositions and methods provide at least one sweetness enhancer, at least one sweetener comprising a carbohydrate sweetener, a natural-high-potency sweetener, a synthetic high-potency sweetener, or a combination thereof, and at least one sweet taste improving composition.

42 Claims, 5 Drawing Sheets

US 8,709,521 B2

SWEETENER COMPOSITIONS HAVING ENHANCED SWEETNESS AND IMPROVED TEMPORAL AND/OR FLAVOR PROFILES

CROSS-REFERENCE TO RELATED APPLICATIONS

The present application claims priority under 35 U.S.C. §119(e) to U.S. Provisional Application No. 60/939,549, filed on May 22, 2007, the disclosure of which is hereby incorporated by reference in its entirety.

FIELD OF THE INVENTION

The present invention relates to sweeteners having enhanced sweetness. More particularly, the present invention relates to improving the temporal and/or flavor profile of sweetener compositions having enhanced sweetness.

BACKGROUND OF THE INVENTION

Although natural caloric sweetener compositions such as sucrose, fructose, and glucose taste good to most consumers, they are caloric. Therefore, alternative non-caloric or low-caloric sweeteners have been used widely as sugar or sucrose substitutes. Many non-caloric or low-caloric sweeteners, however, are prohibitively expensive and/or exhibit sweet tastes that have different temporal profiles, maximal responses, flavor profiles, mouthfeels, and/or adaptation behaviors than that of sugar.

For example, the sweet tastes of natural and synthetic high-potency sweeteners are slower in onset and longer in duration than the sweet taste produced by sugar and thus change the taste balance of a food composition. Because of these differences, use of natural and synthetic high-potency sweeteners to replace a bulk sweetener, such as sugar, in a food or beverage, causes an unbalanced temporal profile and/or flavor profile. In addition to the difference in temporal profile, high-potency sweeteners generally exhibit (i) lower maximal response than sugar, (ii) off tastes including bitter, metallic, cooling, astringent, licorice-like taste, etc., and/or (iii) sweetness which diminishes on iterative tasting.

Compounds have been identified that are capable of enhancing or increasing the perception of sweetness of sweeteners. By combining these compounds with sweeteners the amount of sweetener needed to obtain a desired degree of sweetness may be reduced significantly, thereby reducing the calories imparted by natural caloric sweeteners or reducing the amounts of low-caloric or non-caloric natural or synthetic high-potency sweeteners. It is well known to those skilled in the art of food/beverage formulation, however, that changing the sweetener in a composition requires re-balancing of the flavor and other taste components (e.g., acidulants). If the taste profile of sweetness enhanced sweetener compositions could be modified to impart specific desired taste characteristics to be more sugar-like, the type and variety of compositions that may be prepared with that sweetness enhanced sweetener may be expanded significantly. Accordingly, it may be desirable to selectively modify the taste characteristics of sweetness enhanced sweetener compositions.

SUMMARY OF THE INVENTION

Generally, this invention addresses the above-described need by providing a sweetener composition having enhanced sweetness with improved temporal profile or flavor profile, or both, a method for improving the temporal profile and/or flavor profile of a sweetness enhanced sweetener, and a method for improving the temporal profile and/or flavor profile of a sweetness enhanced sweetener.

More particularly, this invention encompasses a sweetener composition having an enhanced sweetness and more sugar-like temporal profile and/or flavor profile comprising (i) at least one sweetness enhancer, (ii) at least one sweetener comprising a carbohydrate sweetener, a natural high-potency sweetener, a synthetic high-potency sweetener, or a combination thereof, and (iii) at least one sweet taste improving composition selected from the group consisting of carbohydrates, polyols, amino acids, other sweet taste improving additives, and combinations thereof.

According to another aspect, this invention encompasses a method for imparting a more sugar-like temporal profile and/or flavor profile to a sweetness enhanced sweetener by combining (i) at least one sweetness enhancer, (ii) at least one sweetener comprising a carbohydrate sweetener, a natural high-potency sweetener, a synthetic high-potency sweetener, or a combination thereof, and (iii) at least one sweet taste improving composition selected from the group consisting of carbohydrates, polyols, amino acids, other sweet taste improving additives, and combinations thereof.

According to still another aspect, this invention encompasses compositions sweetened with the sweetness enhanced sweetener having a more sugar-like temporal profile and/or flavor profile comprising (i) a sweetenable composition, (ii) at least one sweetness enhancer, (iii) at least one sweetener comprising a carbohydrate sweetener, a natural high-potency sweetener, a synthetic high-potency sweetener, or a combination thereof and (iv) at least one sweet taste improving composition selected from the group consisting of carbohydrates, polyols, amino acids, other sweet taste improving additives, and combinations thereof. According to particular embodiments, the sweetened composition comprises a beverage, food, pharmaceutical, nutraceutical, tobacco, oral hygienic/cosmetic product, or the like.

According to still another aspect, this invention encompasses a method for imparting a more sugar-like temporal profile and/or flavor profile to sweetened compositions comprising a sweetness enhanced sweetener by combining with a sweetenable composition (i) at least one sweetness enhancer, (ii) at least one sweetener comprising a carbohydrate sweetener, a natural high-potency sweetener, a synthetic high-potency sweetener, or a combination thereof, and (iii) at least one sweet taste improving composition selected from the group consisting of carbohydrates, polyols, amino acids, other sweet taste improving additives, and combinations thereof. According to particular embodiments, the sweetened composition comprises a beverage, food, pharmaceutical, nutraceutical, tobacco, oral hygienic/cosmetic product, or the like.

Objects and advantages of the invention will be set forth in part in the following description, or may be obvious from the description, or may be learned through practice of the invention. Unless otherwise defined, all technical and scientific terms and abbreviations used herein have the same meaning as commonly understood by one of ordinary skill in the art to which this invention pertains. Although methods and compositions similar or equivalent to those described herein can be used in the practice of the present invention, suitable methods and compositions are described without intending that any such methods and compositions limit the invention herein.

DETAILED DESCRIPTION OF THE EMBODIMENTS

Figure 1:
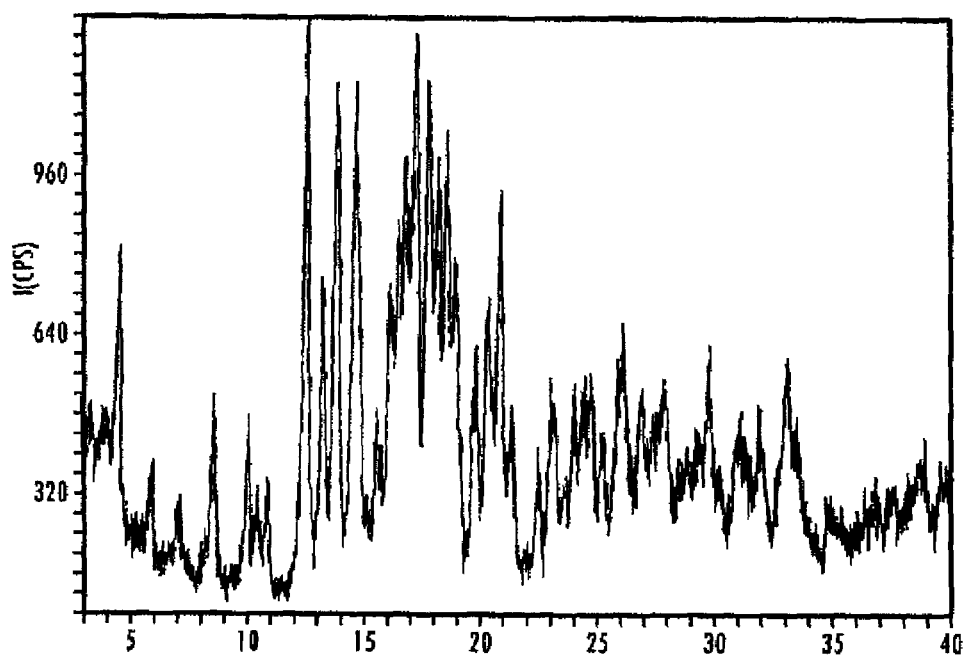
FIG. 1 is a powder x-ray diffraction scan of rebaudioside A polymorphic Form 1 on a plot of the scattering intensity versus the scattering angle 2θ in accordance with an embodiment of this invention.

Reference now will be made in detail to the presently proffered embodiments of the invention. Each example is provided by way of explanation of embodiments of the invention, not limitation of the invention. In fact, it will be apparent to those skilled in the art that various modifications and variations can be made in the present invention without departing from the spirit or scope of the invention. For instance, features illustrated or described as part of one embodiment, can be used on another embodiment to yield a still further embodiment. Thus, it is intended that the present invention cover such modifications and variations within the scope of the appended claims and their equivalents.

Briefly described, embodiments of the present invention include sweetener compositions and sweetened compositions having enhanced sweetness with improved temporal and/or flavor profile. In particular, embodiments provided herein combine sweetness enhancers and sweetener compositions, to increase the perception of sweet taste of a sweetener composition, with sweet taste improving compositions to improve the temporal and/or flavor profile of the sweetness enhanced sweetener composition.

I. Sweetness Enhancers

As used herein, the phrase "sweetness enhancer" includes compositions capable of enhancing or intensifying the perception of sweet taste of sweetener compositions or sweetened compositions. The phrase sweetness enhancer is synonymous with the terms "sweet taste potentiator," "sweetness potentiator," and "sweetness intensifier." Generally, the sweetness enhancers provided herein enhance the sweet taste of sweeteners without providing any noticeable sweet taste by themselves at the concentrations employed; however, the sweetness enhancers may provide sweet taste at higher concentrations.

Non-limiting examples of suitable sweetness enhancers in particular embodiments include aryl carboxylic acid derivatives (e.g., hydroxybenzoic acids), aryl sulfonic acid derivatives, isoxazoles, amides, ureas, thioureas, benzisoxazoles, salts thereof, derivatives thereof, and combinations thereof.

Aryl carboxylic acid derivatives, as used herein, include hydroxybenzoic acids and naphthoic acids. Hydroxybenzoic acids generally may be described as including compounds having the general chemical structure:

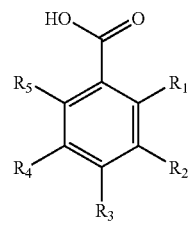

wherein $R_1$, $R_2$, $R_3$, $R_4$, and $R_5$, independent of one another, may be a hydrogen, halogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximino, hydrazino, carbamyl, phosphonic acid, phosphonato, or a straight chained, branched, or cyclic alkyl, alkenyl, alkynyl, aryl, heteroaryl, or heterocyclic group.

In particular embodiments, the hydroxybenzoic acid comprises a monohydroxybenzoic acid, a dihydroxybenzoic acid, a trihydroxybenzoic acid, or a derivative thereof. Non-limiting examples of suitable hydroxybenzoic acids include salicylic acid, 2,4-dihydroxybenzoic acid, 2,5-dihydroxybenzoic acid, 2,3-dihydroxybenzoic acid, 2-hydroxy-3-methylbenzoic acid, 2-hydroxy-4-nitrobenzoic acid, 4-ethoxy-2-hydroxybenzoic acid, N-(3-methoxy-4-hydroxyphenylmethyl)-2,4-dihydroxy-benzamide, N-(4-hydroxy-3-methoxybenzyl)-2,4-dihydroxybenzamide, N-(4-hydroxy-3-methoxybenzyl)-2-hydroxybenzamide, N-(4-hydroxy-3-methyoxybenzyl)-4-hydroxybenzamide, N-(4-hydroxy-3-methyoxybenzyl)-2,4-dihydroxybenzamide, N-2-(4-hydroxy-3-methyoxyphenylethyl)-2,4-dihydroxybenzamide, N-(4-hydroxy-3-ethoxybenzyl)-2,4-dihydroxybenzamide, N-(3,4-dihydroxybenzyl)-2,4-dihydroxybenzamide, N-[2-(4-hydroxy-3-methoxyphenylethyl)]-2-hydroxy-5-methoxyamide, N-(3-methoxy-4-hydroxyphenylmethyl)-4-hydroxybenzamide, 2,4,5-trihydroxybenzoic acid, 2,4,6-trihydroxybenzoic acid, and derivatives thereof. Particular embodiments of hydroxybenzoic acids are illustrated in Table 1.

TABLE 1

Exemplary embodiments of hydroxybenzoic acid sweetness enhancers

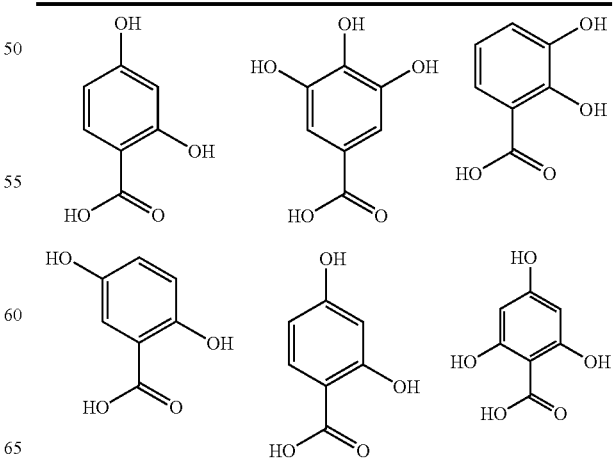

TABLE 1-continued

Exemplary embodiments of hydroxybenzoic acid sweetness enhancers

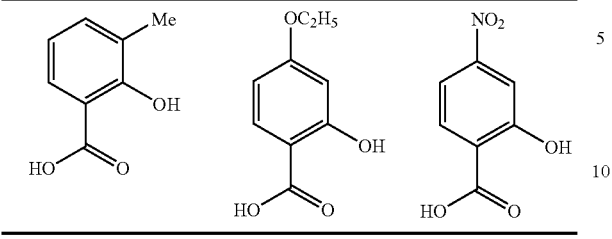

Naphthoic acids generally may be described as including compounds having the general chemical structure:

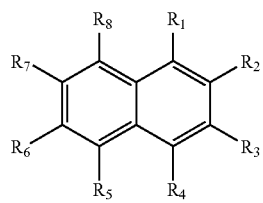

wherein at least one of $R_1$-$R_8$ comprises a carboxyl and wherein $R_1$-$R_8$, independent of one another, may be a hydrogen, halogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight chained, branched, or cyclic alkyl, alkenyl, alkynyl, aryl, heteroaryl, or heterocyclic group. In particular embodiments, $R_1$ or $R_2$ comprise a carboxyl.

Aryl sulfonic acid derivatives, as used herein, include benzenesulfonic acids and naphthalene sulfonic acids. Benzenesulfonic acids generally may be described as including compounds having the general chemical structure:

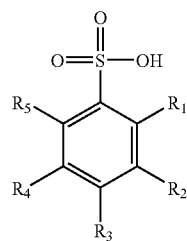

wherein $R_1$, $R_2$, $R_3$, $R_4$, and $R_5$, independent of one another, may be a hydrogen, halogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight chained, branched, or cyclic alkyl, alkenyl, alkynyl, aryl, heteroaryl, or heterocyclic group. Naphthalene sulfonic acids generally may be described as including compounds having the general chemical structure:

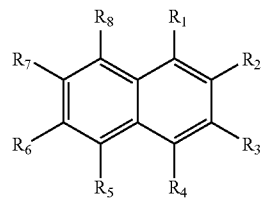

wherein at least one of $R_1$-$R_8$ comprises a sulfonyl and wherein $R_1$-$R_8$, independent of one another, may be a hydrogen, halogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight chained, branched, or cyclic alkyl, alkenyl, alkynyl, aryl, heteroaryl, or heterocyclic group. In particular embodiments, $R_1$ or $R_2$ comprise a sulfonyl.

Particular embodiments of isoxazoles include compounds having the general chemical structure:

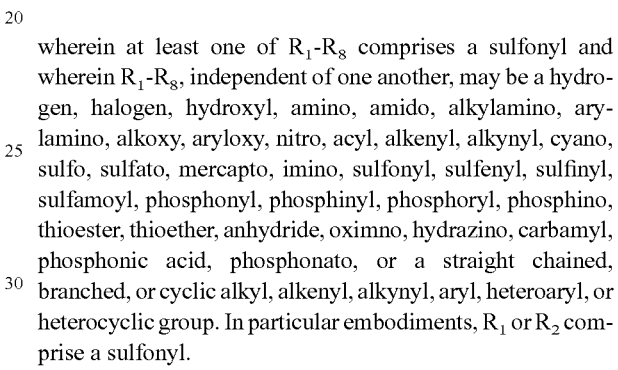

wherein $R_1$, $R_2$, and $R_3$, independent of one another, may be a hydrogen, halogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximino, hydrazino, carbamyl, phosphonic acid, phosphonato, or a straight chained, branched, or cyclic alkyl, alkenyl, alkynyl, aryl, heteroaryl, or heterocyclic group. Non-limiting examples of suitable isoxazoles include (R)—N-(5,7-dimethyl-1,2,3,4-tetrahydronaphthalen-1-yl)-isoxazole-5-carboxamide, (R)-4-methyl-N-(1,2,3,4-tetrahydronaphthalen-1-yl)isoxazole-5-carboxamide, and (R)—N-(1,2,3,4-tetrahydronaphthalen-1-yl)isoxazole-5-carboxamide.

Particular embodiments of isoxazoles suitable for use as sweetness enhancers are illustrated in Table 2.

TABLE 2

Exemplary embodiments of isoxazole sweetness enhancers

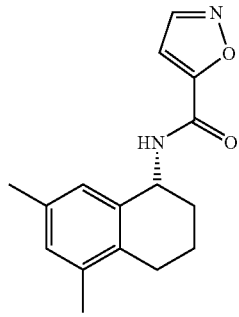

(R)-N-(5,7-dimethyl-1,2,3,4-tetrahydronaphthalen-1-yl)isoxazole-5-carboxamide

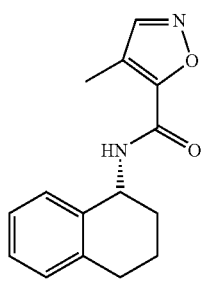

(R)-4-methyl-N-(1,2,3,4-tetrahydronaphthalen-1-yl)isoxazole-5-carboxamide

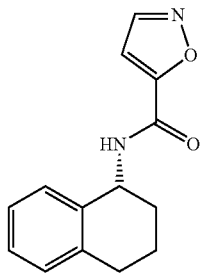

(R)-N-(1,2,3,4-tetrahydronaphthalen-1-yl)isoxazole-5-carboxamide

Particular embodiments of amides include compounds having the general chemical structure:

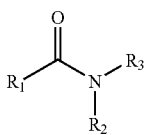

wherein $R_1$, $R_2$, and $R_3$, independent of one another, may be a hydrogen, halogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximino, hydrazino, carbamyl, phosphonic acid, phosphonato, or a straight chained, branched, or cyclic alkyl, alkenyl, alkynyl, aryl, heteroaryl, or heterocyclic group. Non-limiting examples of suitable amides include (R)-3-chloro-2-hydroxy-N-(5-methoxy-1,2,3,4-tetrahydronaphthalen-1-yl) benzamide, 2,3,5,6-tetrafluoro-4-methyl-N-(2-methylcyclohexyl)benzamide, 2,6-dimethyl-N-(2-methylcyclohexyl) benzamide, and (S)-2,3,5,6-tetrafluoro-4-methyl-N-(3-methylbutan-2-yl)benzamide. Particular embodiments of amides suitable for use as sweetness enhancers are illustrated in Table 3. Other amides capable of functioning as sweetness enhancers are described in U.S. Patent Publication No. 2005/0084506.

TABLE 3

Exemplary embodiments of amide sweetness enhancers

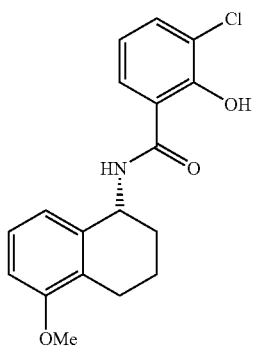

(R)-3-chloro-2-hydroxy-N-(5-methoxy-1,2,3,4-tetrahydronaphthalen-1-yl)benzamide

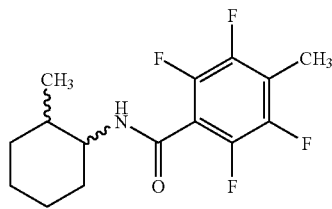

2,3,5,6-tetrafluro-4-methyl-N-(2-methylcyclohexyl)benzamide

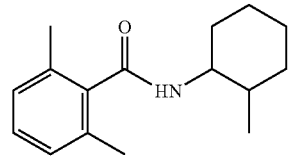

2,6-dimethyl-N-(2-methylcyclohexyl)benzamide

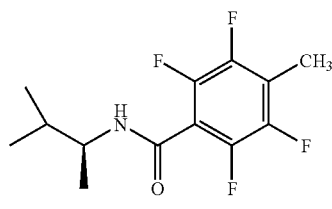

(S)-2,3,5,6-tetrafluoro-4-methyl-N-(3-methylbutan-2-yl)benzamide

Particular embodiments of ureas include compounds having the general chemical structure:

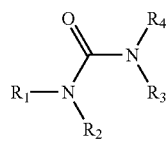

wherein $R_1$, $R_2$, $R_3$, and $R_4$, independent of one another, may be a hydrogen, halogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximino, hydrazino, carbamyl, phosphonic acid, phosphonato, or a straight chained, branched, or cyclic alkyl, alkenyl, alkynyl, aryl, heteroaryl, or heterocyclic group. Non-limiting examples of ureas suitable for use as sweetness enhancers include N-(4-chloro-2,6-difluorophenyl)-4-methylisoindoline-2-carboxamide, N-(2,4-dimethylphenyl)-4-methylisoindoline-2-carboxamide, and N-(benzo[d][1,3]dioxol-5-yl)isoindoline-2-carboxamide. Particular embodiments of ureas suitable for use as sweetness enhancers are illustrated in Table 4.

TABLE 4

Exemplary embodiments of urea sweetness enhancers

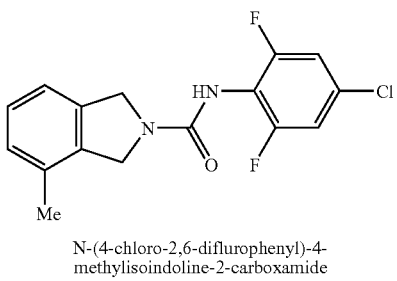 [SMILES: Cc1cccc2c1CN(C(=O)Nc1c(F)cc(Cl)cc1F)C2]

N-(4-chloro-2,6-difluorophenyl)-4-methylisoindoline-2-carboxamide

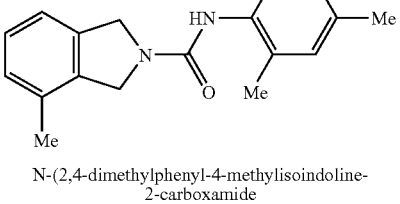

N-(2,4-dimethylphenyl-4-methylisoindoline-2-carboxamide

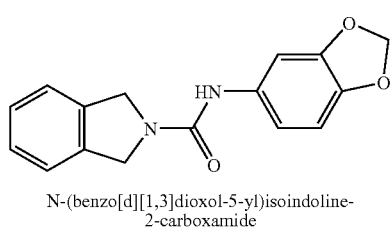 [SMILES: O=C(Nc1ccc2c(c1)OCO2)N1Cc2ccccc2C1]

N-(benzo[d][1,3]dioxol-5-yl)isoindoline-2-carboxamide

Particular embodiments of thioureas include compounds having the general chemical structure:

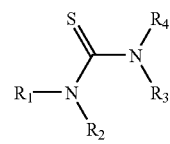

wherein $R_1$, $R_2$, $R_3$, and $R_4$, independent of one another, may be a hydrogen, hydroxyl, amino, amido, alkylamino, arylamino, alkoxy, aryloxy, acyl, alkenyl, alkynyl, cyano, sulfo, sulfato, mercapto, imino, sulfonyl, sulfenyl, sulfinyl, sulfamoyl, thioester, thioether, anhydride, oximino, hydrazino, carbamyl, or a straight chained, branched, or cyclic alkyl, alkenyl, alkynyl, aryl, heteroaryl, or heterocyclic group. Non-limiting examples of thioureas suitable for use as sweetness enhancers include N-((1H-pyrrol-3-yl)methyl)-N'-(4-isopropoxyphenyl)thiourea and N-(4-ethoxyphenyl)-N'-(furan-2-ylmethyl)thiourea. Particular embodiments of thioureas suitable for use as sweetness enhancers are illustrated in Table 5.

TABLE 5

Exemplary embodiments of thiourea sweetness enhancers

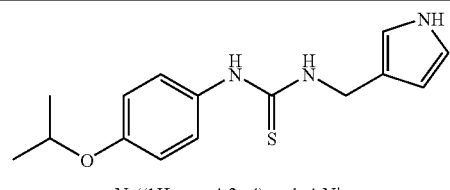

N-((1H-pyrrol-3-yl)methyl-N'-(4-isopropoxyphenyl)thiourea

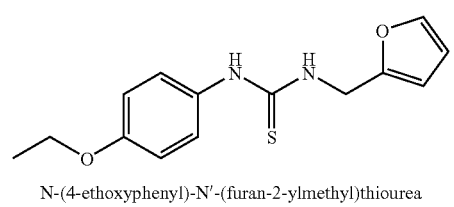 [SMILES: CCOc1ccc(NC(=S)NCc2ccco2)cc1]

N-(4-ethoxyphenyl)-N'-(furan-2-ylmethyl)thiourea

Particular embodiments of benzisoxazole derivatives include compounds having the general chemical structure:

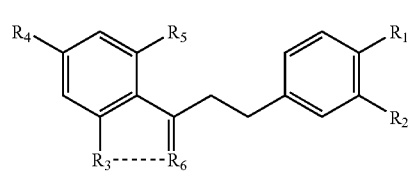

wherein $R_1$, $R_2$, $R_3$, $R_4$, and $R_5$, independent of one another, may be a hydrogen, halogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximino, hydrazino, carbamyl, phosphonic acid, phosphonato, or a straight chained, branched, or cyclic alkyl, alkenyl, alkynyl, aryl, heteroaryl, or heterocyclic group; wherein $R_6$ may be an oxygen, nitrogen, or sulfur; and wherein x may be 0 when $R_6$ is an oxygen or wherein x may be 0 or 1 when $R_6$ is a nitrogen or sulfur. Non-limiting examples of benzisoxazole derivatives suitable for use as sweetness enhancers include 3-(3-hydroxy-4-methoxyphenethyl)-4,6-dihydroxybenzo[d]isoxazole- and 1-(2,6-dihydroxyphenyl)-3-(3-hydroxy-4-methoxyphenyl)propan-1-one. Particular embodiments of dihydrochalcone derivatives suitable for use as sweetness enhancers are illustrated in Table 6.

TABLE 6

Exemplary embodiments of thiourea sweetness enhancers

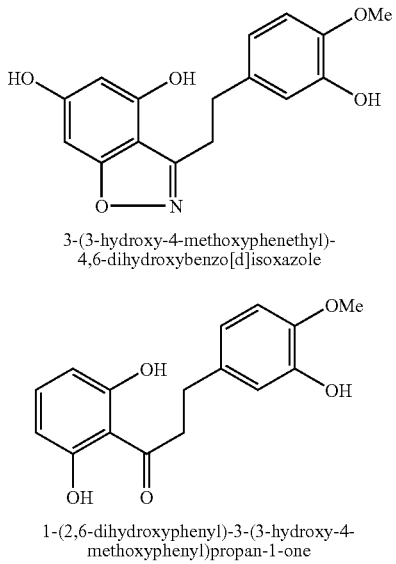

3-(3-hydroxy-4-methoxyphenethyl)-
4,6-dihydroxybenzo[d]isoxazole 1-(2,6-dihydroxyphenyl)-3-(3-hydroxy-4-
methoxyphenyl)propan-1-one In particular embodiments, the sweetener compositions provided herein include an effective amount of sweetness enhancers in the sweetener composition. An effective amount of a sweetness enhancer is an amount sufficient to increase or enhance the sweetness intensity of a sweetener composition beyond the degree of sweetness perceived for a sweetener composition without a sweetness enhancer. For example, particular embodiments may include the sweetness enhancer in an amount from about 0.01 ppm to 1000 ppm in the final product, in another embodiment from about 0.1 ppm to about 100 ppm, in another embodiment from about 0.5 ppm to about 50 ppm, and in still another embodiment from about 1 ppm to about 10 ppm.

II. Sweeteners

The sweetness enhancers described hereinabove may be used to enhance the sweet taste or perception of any suitable caloric, low-caloric, or non-caloric sweetener. Non-limiting examples of such sweeteners include caloric carbohydrate sweeteners, natural high-potency sweeteners, synthetic high-potency sweeteners, and combinations thereof. As used herein, the phrase "sweetness enhanced sweetener composition" refers to combinations including at least one sweetness enhancer and at least one sweetener.

Non-limiting examples of suitable caloric carbohydrate sweeteners include sucrose, fructose, glucose, erythritol, maltitol, lactitol, sorbitol, mannitol, xylitol, D-tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, nigero-oligosaccharides, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, and glucose syrup.

Other sweeteners suitable for use in embodiments provided herein include natural and synthetic high-potency sweeteners. As used herein the phrases "natural high-potency sweetener", "NHPS", "NHPS composition", and "natural high-potency sweetener composition" are synonymous. "NHPS" means any sweetener found in nature which may be in raw, extracted, purified, or any other form, singularly or in combination thereof and characteristically have a sweetness potency greater than sucrose, fructose, or glucose, yet have less calories. Non-limiting examples of NHPSs suitable for embodiments of this invention include rebaudioside A, rebaudioside B, rebaudioside C (dulcoside B), rebaudioside D, rebaudioside E, rebaudioside F, dulcoside A, rubusoside, stevia, stevioside, mogroside IV, mogroside V, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobtain, baiyunoside, osladin, polypodoside A, pterocaryoside A, pterocaryoside B, mukurozioside, phlomisoside I, periandrin I, abrusoside A, and cyclocarioside I. NHPS also includes modified NHPSs. Modified NHPSs include NHPSs which have been altered naturally. For example, a modified NHPS includes, but is not limited to, NHPSs which have been fermented, contacted with enzyme, or derivatized or substituted on the NHPS. In one embodiment, at least one modified NHPS may be used in combination with at least one NHPS. In another embodiment, at least one modified NHPS may be used without a NHPS. Thus, modified NHPSs may be substituted for a NHPS or may be used in combination with NHPSs for any of the embodiments described herein. For the sake of brevity, however, in the description of embodiments of this invention, a modified NHPS is not expressly described as an alternative to an unmodified NHPS, but it should be understood that modified NHPSs can be substituted for NHPSs in any embodiment disclosed herein.

In one embodiment, extracts of a NHPS may be used in any purity percentage. In another embodiment, when a NHPS is used as a non-extract, the purity of the NAPS may range for example from about 25% to about 100%. According to other embodiments, the purity of the NHPS may range from about 50% to about 100%; from about 70% to about 100%; from about 80% to about 100%; from about 90% to about 100%; from about 95% to about 100%; from about 95% to about 99.5%; from about 96% to about 100%; from about 97% to about 100%; from about 98% to about 100%; and from about 99% to about 100%.

Purity, as used here, represents the weight percentage of a respective NHPS compound present in a NHPS extract, in raw or purified form. In one embodiment, a steviolglycoside extract comprises a particular steviolglycoside in a particular purity, with the remainder of the stevioglycoside extract comprising a mixture of other steviolglycosides.

To obtain a particularly pure extract of a NAPS, such as rebaudioside A, it may be necessary to purify the crude extract to a substantially pure form. Such methods generally are known to those of ordinary skill in the art.

An exemplary method for purifying a NHPS, such as rebaudioside A, is described in U.S. patent application Ser. No. 11/751,627, filed May 21, 2007, which claims priority to U.S. Provisional Patent Applications 60/805,216 and 60/889,318, filed on Jun. 19, 2006, and Feb. 12, 2007, respectively, all entitled "Rebaudioside A Composition and Method for Purifying Rebaudioside A," the disclosures of which are incorporated herein by reference in their entirety.

Briefly described, substantially pure rebaudioside A is crystallized in a single step from an aqueous organic solution comprising at least one organic solvent and water in an amount from about 10% to about 25% by weight, more particularly from about 15% to about 20% by weight. Organic solvents may comprise alcohols, acetone, and acetonitrile. Non-limiting examples of alcohols include ethanol, methanol, isopropanol, 1-propanol, 1-butanol, 2-butanol, tert-butanol, and isobutanol. In one embodiment, the at least one organic solvent comprises a mixture of ethanol and methanol present in the aqueous organic solution in a weight ratio ranging from about 20 parts to about 1 part ethanol to about 1 part methanol, in another embodiment from about 3 parts to about 1 part ethanol to about 1 part methanol.

In one embodiment, the weight ratio of the aqueous organic solution and crude rebaudioside A ranges from about 10 to about 4 parts aqueous organic solution to about 1 part crude rebaudioside A, more particularly from about 5 to about 3 parts aqueous organic solution to about 1 part crude rebaudioside A.

In an exemplary embodiment, the method of purifying rebaudioside A is carried out at approximately room temperature. In another embodiment, the method of purifying rebaudioside A further comprises the step of heating the rebaudioside A solution to a temperature in a range from about 20° C. to about 40° C., or in another embodiment to a reflux temperature, for about 0.25 hour to about 8 hours. In another exemplary embodiment, wherein the method for purifying rebaudioside A comprises the step of heating the rebaudioside A solution, the method further comprises the step of cooling the rebaudioside A solution to a temperature in the range from about 4° C. to about 25° C. for about 0.5 hour to about 24 hours.

According to particular embodiments, the purity of rebaudioside A may range from about 50% to about 100%; from about 70% to about 100%; from about 80% to about 100%; from about 90% to about 100%; from about 95% to about 100%; from about 95% to about 99.5%; about 96% to about 100%; from about 97% to about 100%; from about 98% to about 100%; and from about 99% to about 100%. According to particular embodiments, upon crystallization of crude rebaudioside A the substantially pure rebaudioside A composition comprises rebaudioside A in a purity greater than about 95% by weight up to about 100% by weight on a dry basis. In other exemplary embodiments, substantially pure rebaudioside A comprises purity levels of rebaudioside A greater than about 97% up to about 100% rebaudioside A by weight on a dry basis, greater than about 98% up to about 100% by weight on a dry basis, or greater than about 99% up to about 100% by weight on a dry basis. The rebaudioside A solution during the single crystallization step may be stirred or unstirred.

In an exemplary embodiment, the method of purifying rebaudioside A further comprises the step of seeding (optional step) the rebaudioside A solution at an appropriate temperature with high-purity crystals of rebaudioside A sufficient to promote crystallization of the rebaudioside A to form pure rebaudioside A. An amount of rebaudioside A sufficient to promote crystallization of substantially pure rebaudioside A comprises an amount of rebaudioside A from about 0.0001% to about 1% by weight of the rebaudioside A present in the solution, more particularly from about 0.01% to about 1% by weight. An appropriate temperature for the step of seeding comprises a temperature in a range from about 18° C. to about 35° C.

In another exemplary embodiment, the method of purifying rebaudioside A further comprises the steps of separating and washing the substantially pure rebaudioside A composition. The substantially pure rebaudioside A composition may be separated from the aqueous organic solution by a variety of solid-liquid separation techniques that utilize centrifugal force, that include, without limitation, vertical and horizontal perforated basket centrifuge, solid bowl centrifuge, decanter centrifuge, peeler type centrifuge, pusher type centrifuge, Heinkel type centrifuge, disc stack centrifuge and cyclone separation. Additionally, separation may be enhanced by any of pressure, vacuum, and gravity filtration methods, that include, without limitation, the use of belt, drum, Nutsche type, leaf, plate, Rosenmund type, sparkler type, and bag filters and filter press. Operation of the rebaudioside A solid-liquid separation device may be continuous, semi-continuous or in batch mode. The substantially pure rebaudioside A composition also may be washed on the separation device using various aqueous organic solutions and mixtures thereof. The substantially pure rebaudioside A composition can be dried partially or totally on the separation device using any number of gases, including, without limitation, nitrogen and argon, to evaporate residual liquid solvent. The substantially pure rebaudioside A composition may be removed automatically or manually from the separation device using liquids, gases or mechanical means by either dissolving the solid or maintaining the solid form.

In still another exemplary embodiment, the method of purifying rebaudioside A further comprises the step of drying the substantially pure rebaudioside A composition using techniques well known to those skilled in the art, non-limiting examples of which include the use of a rotary vacuum dryer, fluid bed dryer, rotary tunnel dryer, plate dryer, tray dryer, Nauta type dryer, spray dryer, flash dryer, micron dryer, pan dryer, high and low speed paddle dryer and microwave dryer. In an exemplary embodiment, the step of drying comprises drying the substantially pure rebaudioside A composition using a nitrogen or argon purge to remove the residual solvent at a temperature in a range from about 40° C. to about 60° C. for about 5 hours to about 100 hours.

In yet another exemplary embodiment, wherein the crude rebaudioside A mixture comprises substantially no rebaudioside D impurity, the method of purifying rebaudioside A further comprises the step of slurrying the composition of substantially pure rebaudioside A with an organic solvent or an aqueous organic solution prior to the step of separating and drying the substantially pure rebaudioside A composition. The slurry is a mixture comprising a solid and an aqueous organic solution or organic solvent, wherein the solid comprises the substantially pure rebaudioside A composition and is only sparingly soluble in the aqueous organic solution or organic solvent. In an embodiment, the substantially pure rebaudioside A composition and aqueous organic solution or organic solvent are present in the slurry in a weight ratio ranging from about 15 parts to 1 part aqueous organic solution to about 1 part substantially pure rebaudioside A composition. In one embodiment, the slurry is maintained at room temperature. In another embodiment, the step of slurrying comprises beating the slurry to a temperature in a range from about 20 to about 40° C. The substantially pure rebaudioside A composition is slurried for about 0.5 hour to about 24 hours.

In still yet another exemplary embodiment, the method of purifying rebaudioside A further comprises the steps of separating the substantially pure rebaudioside A composition from the aqueous organic solution or organic solvent of the slurry and washing the substantially pure rebaudioside A composition followed by the step of drying the substantially pure rebaudioside A composition.

If further purification is desired, the method of purifying rebaudioside A described herein may be repeated or the substantially pure rebaudioside A composition may be purified further using an alternative purification method, such as the column chromatography.

It also is contemplated that other NHPSs may be purified using the purification method described herein, requiring only minor experimentation that would be obvious to those of ordinary skill in the art.

Figure 2:
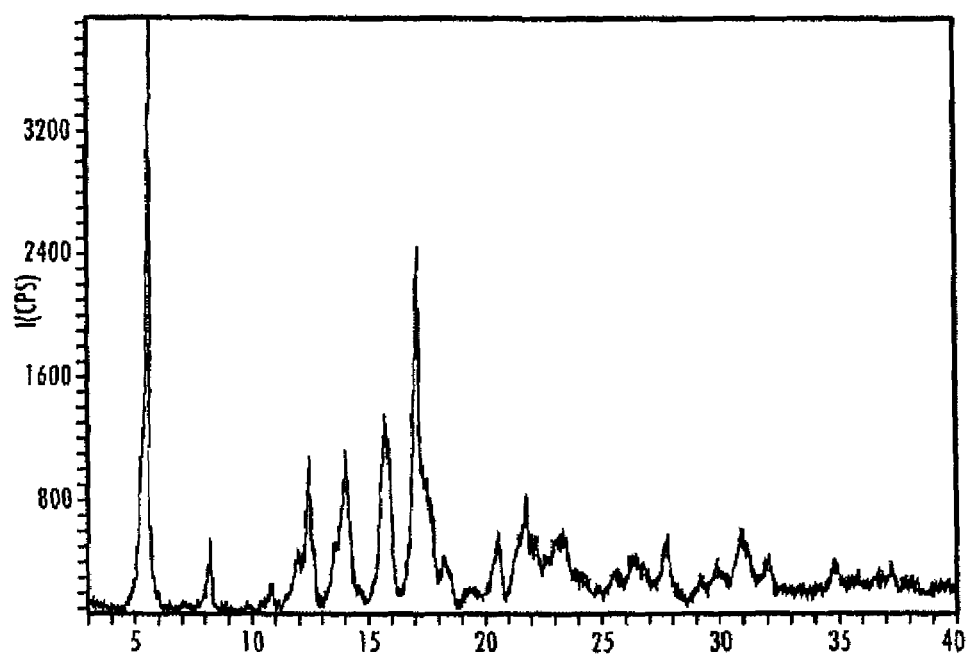
FIG. 2 is a powder x-ray diffraction scan of rebaudioside A polymorphic Form 2 on a plot of the scattering intensity versus the scattering angle 2θ in accordance with an embodiment of this invention.
Figure 3:
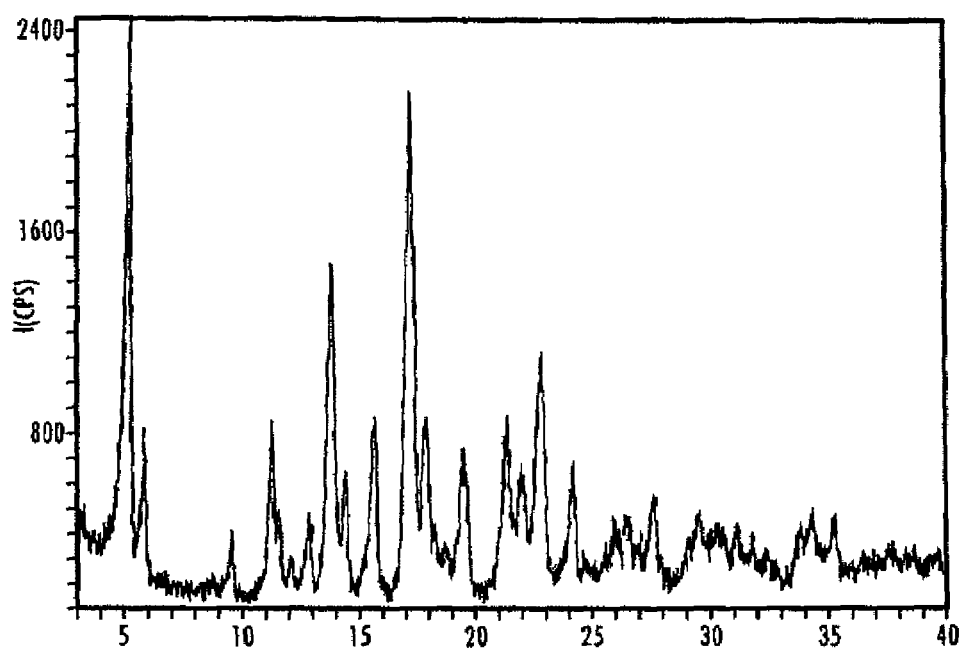
FIG. 3 is a powder x-ray diffraction scan of rebaudioside A polymorphic Form 3A on a plot of the scattering intensity versus the scattering angle 2θ in accordance with an embodiment of this invention.
Figure 4:
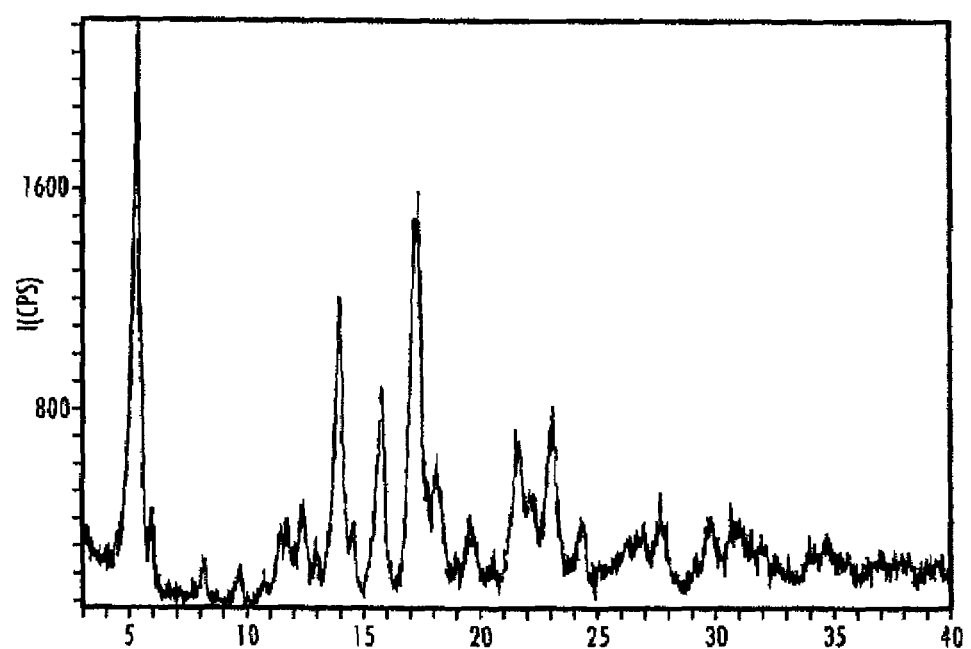
FIG. 4 is a powder x-ray diffraction scan of rebaudioside A polymorphic Form 3B on a plot of the scattering intensity versus the scattering angle 2θ in accordance with an embodiment of this invention.
Figure 5:
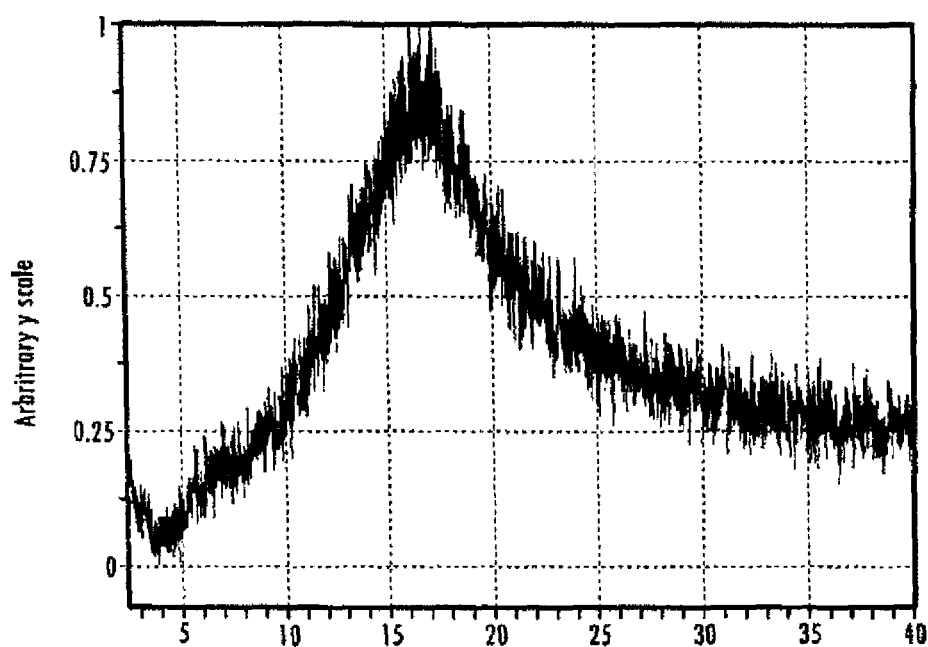
FIG. 5 is a powder x-ray diffraction scan of rebaudioside A amorphous Form 4 on a plot of the scattering intensity versus the scattering angle 2θ in accordance with an embodiment of this invention.

The purification of rebaudioside A by crystallization as described above results in the formation of at least three different polymorphs: Form 1: a rebaudioside A hydrate; Form 2: an anhydrous rebaudioside A; and Form 3: a rebaudioside A solvate. In addition to the at least three polymorphic forms of rebaudioside A, the purification of rebaudioside A may result in the formation of an amorphous form of rebaudioside A, Form 4. The aqueous organic solution and temperature of the purification process influence the resulting polymorphs in the substantially pure rebaudioside A composition. FIGS. 1-5 are exemplary powder x-ray diffraction (XRPD) scans of the polymorphic and amorphous forms of rebaudioside A: Form 1 (hydrate), Form 2 (anhydrate), Form 3A (methanol solvate), Form 3B (ethanol solvate), and Form 4 (amorphous), respectively.

The material properties of the four rebaudioside A polymorphs are summarized in the following table:

TABLE 7

Rebaudioside A Polymorphic and Amorphous Forms

|  | Form 1 Polymorph | Form 2 Polymorph | Form 3 Polymorph | Form 4 Amorphous |
| --- | --- | --- | --- | --- |
| Rate of dissolution in H2O at 25° C. | Very low (<0.2% in 60 minutes) | Intermediate (<30% in 5 minutes) | High (>30% in 5 minutes) | High (>35.0% in 5 minutes) |
| Alcohol content | <0.5% | <1% | 1-3% | >0.05% |
| Moisture content | >5% | <1% | <3% | <6% |

The type of polymorph formed is dependent on the composition of the aqueous organic solution, the temperature of the crystallization step, and the temperature during the drying step. Form 1 and Form 3 are believed to be formed during the single crystallization step while Form 2 is believed to be formed during the drying step after conversion from Form 1 or Form 3.

Low temperatures during the crystallization step, in the range of about 20° C. to about 50° C., and a low ratio of water to the organic solvent in the aqueous organic solution results in the formation of Form 3. High temperatures during the crystallization step, in the range of about 50° C. to about 80° C., and a high ratio of water to the organic solvent in the aqueous organic solution results in the formation of Form 1. Form 1 can be converted to Form 3 by slurrying in an anhydrous solvent at room temperature (2-16 hours) or at reflux for approximately (0.5-3 hours). Form 3 can be converted to Form 1 by slurrying the polymorph in water at room temperature for approximately 16 hours or at reflux for approximately 2-3 hours. Form 3 can be converted to Form 2 during the drying process; however, increasing either the drying temperature above 70° C. or the drying time of a substantially pure rebaudioside A composition can result in decomposition of the rebaudioside A and increase the level of rebaudioside B impurity in the substantially pure rebaudioside A composition. Form 2 can be converted to Form 1 with the addition of water.

Form 4 may be formed from Form 1, 2, 3, or combinations thereof, using methods well known to those of ordinary skill in the art. Non-limiting examples of such methods include ball milling, precipitation, lyophilization, cryo-grinding, and spray-drying. In a particular embodiment, Form 4 can be prepared from a substantially pure rebaudioside A composition obtained by the purification methods described hereinabove by spray-drying a solution of the substantially pure rebaudioside A composition.

According to particular embodiments, the rebaudioside A composition may be modified to comprise particular amounts of the polymorphic or amorphous forms. For example, in one embodiment the rebaudioside A composition may be modified to have an increased amount of Forms 2, 3, or 4, or a combination thereof (such that the total amount of the combined Forms falls within the desired range) while decreasing the amount of Form 1 present. Not wishing to be bound by any theory, by controlling the amount of the particular polymorphic and/or amorphous forms present in the rebaudioside A composition, a desired rate of dissolution of the rebaudioside A composition may be obtained.

For example, in a particular embodiment the rebaudioside A composition may comprise any one of Forms 2, 3, or 4, or a combination thereof (such that the total amount of the combined Forms falls within the designated range) in an amount of at least about 10% by weight of the rebaudioside A composition, at least about 25%, at least about 50%, at least about 75%, at least about 90%, or at least 99% by weight of the rebaudioside A composition. In another embodiment, the rebaudioside A composition may comprise an amount of any one of Forms 2, 3, or 4, or a combination thereof (such that the total amount of the combined Forms falls within the designated range) in an amount from about 10% up to about 100% by weight of the rebaudioside A composition, from about 25% up to about 100%, from about 50% up to about 100%, from about 75% up to about 100%, or from about 90% up to about 100% by weight of the rebaudioside A composition. Alternatively or in addition to controlling the amount of Forms 2, 3, or 4, or combinations thereof which are present in the rebaudioside A composition, one skilled in the art may desire to control the rate of dissolution of the rebaudioside A composition by modifying the amount of Form 1 present in the rebaudioside A composition. Accordingly, in a particular embodiment the rebaudioside A composition may comprise Form 1 in an amount up to about 50% by weight of the rebaudioside A composition, up to about 25%, up to about 10%, up to about 5%, or up to about 1% by weight of the rebaudioside A composition. In another embodiment, the rebaudioside A composition may comprise Form 1 in an amount from about 0.5% up to about 50% by weight of the rebaudioside A composition, from about 0.5% up to about 25%, from about 0.5% up to about 10%, from about 0.5% up to about 5%, or from about 0.5% up to about 1% by weight of the rebaudioside A composition.

As used herein, the phrase "synthetic sweetener" refers to any compositions which are not found in nature and which characteristically have a sweetness potency greater than sucrose, fructose, or glucose, yet have less calories. Non-limiting examples of synthetic sweeteners suitable for embodiments of this invention include sucralose, acesulfame potassium or other salts, aspartame, alitame, saccharin, neohesperidin dihydrochalcone, cyclamate, neotame, N-[3-(3-hydroxy-4-methoxyphenyl)propyl]-L-α-aspartyl]-L-phenylalanine 1-methyl ester, N-[3-(3-hydroxy-4-methoxyphenyl)-3-methylbutyl]-L-α-aspartyl]-L-phenylalanine 1-methyl ester, N-[3-(3-methoxy-4-hydroxyphenyl)propyl]-L-α-aspartyl]-L-phenylalanine 1-methyl ester, salts thereof, and the like.

The NHPS and synthetic sweeteners may be used individually or in combination with other NHPS and/or synthetic sweeteners. For example, the sweetener composition may comprise a single NHPS or a single synthetic sweetener; a single NHPS in combination with a single synthetic sweetener; one or more NHPSs in combination with a single synthetic sweetener; a single NHPS in combination with one or more synthetic sweeteners; or one or more NHPSs in combination with one or more synthetic sweeteners. A plurality of natural and/or synthetic high-potency sweeteners may be used as long as the combined effect does not adversely affect the taste of the sweetener composition or orally sweetened composition.

For example, particular embodiments comprise combinations of NHPSs, such as steviolglycosides. Non-limiting examples of suitable steviolglycosides which may be combined include rebaudioside A, rebaudioside B, rebaudioside C (dulcoside B), rebaudioside D, rebaudioside E, rebaudioside F, dulcoside A, rubusoside, stevioside, or steviolbioside. According to particular embodiments of the present invention, the combination of high-potency sweeteners comprises rebaudioside A in combination with rebaudioside B, rebaudioside C, rebaudioside E, rebaudioside F, stevioside, steviolbioside, dulcoside A, or combinations thereof.

Generally, according to a particular embodiment, rebaudioside A is present in the combination of high-potency sweeteners in an amount in the range of about 50 to about 99.5% by weight of the combination of high-potency sweeteners, in another embodiment in the range of about 70 to about 90% by weight, and in yet another embodiment in the range of about 75 to about 85% by weight.

In another particular embodiment, rebaudioside B is present in the combination of high-potency sweeteners in an amount in the range of about 1 to about 8% by weight of the combination of high-potency sweeteners, in another embodiment in the range of about 2 to about 5% by weight, and in yet another embodiment in the range of about 2 to about 3% by weight.

In another particular embodiment, rebaudioside C is present in the combination of high-potency sweeteners in an amount in the range of about 1 to about 10% by weight of the combination of high-potency sweeteners, in another embodiment in the range of about 3 to about 8% by weight, and in yet another embodiment in the range of about 4 to about 6% by weight.

In still another particular embodiment, rebaudioside E is present in the combination of high-potency sweeteners in an amount in the range of about 0.1 to about 4% by weight of the combination of high-potency sweeteners, in another embodiment in the range of about 0.1 to about 2% by weight, and in yet another embodiment in the range of about 0.5 to about 1% by weight.

In still another particular embodiment, rebaudioside F is present in the combination of high-potency sweeteners in an amount in the range of about 0.1 to about 4% by weight of the combination of high-potency sweeteners, in another embodiment in the range of about 0.1 to about 2% by weight, and in yet another embodiment in the range of about 0.5 to about 1% by weight.

In still yet another particular embodiment, dulcoside A is present in the combination of high-potency sweeteners in an amount in the range of about 0.1 to about 4% by weight of the combination of high-potency sweeteners, in another embodiment in the range of about 0.1 to about 2% by weight, and in yet another embodiment in the range of about 0.5 to about 1% by weight.

In another particular embodiment, stevioside is present in the combination of high-potency sweeteners in an amount in the range of about 0.5 to about 10% by weight of the combination of high-potency sweeteners, in another embodiment in the range of about 1 to about 6% by weight, and in yet another embodiment in the range of about 1 to about 4% by weight.

In still another particular embodiment, steviolbioside is present in the combination of high-potency sweeteners in an amount in the range of about 0.1 to about 4% by weight of the combination of high-potency sweeteners, in another embodiment in the range of about 0.1 to about 2% by weight, and in yet another embodiment in the range of about 0.5 to about 1% by weight.

According to a particular embodiment, the high-potency sweetener composition comprises a combination of rebaudioside A, stevioside, rebaudioside B, rebaudioside C, and rebaudioside F; wherein rebaudioside A is present in the combination of high-potency sweeteners in an amount in the range of about 75 to about 85% by weight based on the total weight of the combination of high-potency sweeteners, stevioside is present in an amount in the range of about 1 to about 6% by weight, rebaudioside B is present in an amount in the range of about 2 to about 5% by weight, rebaudioside C is present in an amount in the range of about 3 to about 8% by weight, and rebaudioside F is present in an amount in the range of about 0.1 to about 2% by weight.

In addition, those of ordinary skill in the art should appreciate that the sweetener composition can be customized to obtain a desired calorie content. For example, a low-caloric or non-caloric NHPS may be combined with a caloric natural sweetener and/or other caloric additives to produce a sweetener composition with a preferred calorie content.

III. Sweet Taste Improving Compositions

The combination of the at least one sweetness enhancer and at least one sweetener often may result in a modified temporal and/or flavor profile. Accordingly, particular embodiments of the sweetness enhanced sweetener compositions provided herein also may include at least one sweet taste improving composition for re-balancing the temporal and/or flavor profile of the sweetness enhanced sweetener composition. Use of sweet taste improving compositions to improve the temporal and/or flavor profile of a sweetener composition are described in detail in co-pending U.S. patent application Ser. Nos. 11/561,148 and 11/561,158, the disclosures of which are incorporated herein by reference in their entirety.

In particular embodiments, the at least one sweetness enhancer and at least one sweet taste improving composition may be the same. Thus, it is envisioned herein that the at least one sweetness enhancer may function both to enhance the sweetness of a sweetener while also modifying the temporal and/or flavor profile of a sweetener to be more sugar-like. In other particular embodiments, the at least one sweetness enhancer and at least one sweet taste improving composition may be different.

It also is envisioned that embodiments may comprise any combination of sweetness enhancers, sweeteners and sweet taste improving compositions. For example, in one embodiment a single sweetness enhancer may be combined with a single sweetener and a single sweet taste improving composition. In another embodiment, a single sweetness enhancer may be combined with two or more sweeteners and a single sweet taste improving composition. In yet another embodiment, a single sweetness enhancer may be combined with a single sweetener and two or more sweet taste improving compositions. In still other embodiments two or more sweetness enhancers may be combined with two or more sweeteners and with two or more sweet taste improving compositions. Thus, it is envisioned that any number of sweetness enhancers, sweeteners, and sweet taste improving compositions may be combined to provide the sweetener compositions embodied herein.

Non-limiting examples of suitable sweet-taste improving compositions include carbohydrates, polyols, amino acids and their corresponding salts, polyamino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, surfactants, emulsifiers, flavonoids, alcohols, polymers, other sweet taste improving taste additives imparting such sugar-like characteristics, and combinations thereof.

In one embodiment, a single sweet taste improving composition may be used in combination with a sweetness enhanced sweetener composition. In another embodiment, one or more sweet taste improving compositions may be used in combination with a sweetness enhanced sweetener composition.

In a particular embodiment, combinations of a sweetness enhanced sweetener composition and at least one sweet taste improving composition suppress, reduce, or eliminate undesirable taste and impart sugar-like characteristics to the sweetness enhanced sweetener composition. As used herein, the phrase "undesirable taste" includes any taste property which is not imparted by sugars, e.g. glucose, sucrose, fructose, or similar saccharides. Non-limiting examples of undesirable tastes include delayed sweetness onset, lingering sweet aftertaste, metallic taste, bitter taste, cooling sensation taste or menthol-like taste, licorice-like taste, and/or the like.

In one embodiment, a sweetness enhanced sweetener composition combined with at least one sweet taste improving composition exhibits a more sugar-like temporal and/or sugar-like flavor profile than a sweetness enhanced sweetener composition without a sweet taste improving composition is provided. As used herein, the phrases "sugar-like characteristic," "sugar-like taste," "sugar-like sweet," "sugary," and "sugar-like" are synonymous. Sugar-like characteristics include any characteristic similar to that of sucrose and include, but are not limited to, maximal response, flavor profile, temporal profile, adaptation behavior, mouthfeel, concentration/response function behavior, tastant and flavor/sweet taste interactions, spatial pattern selectivity, and temperature effects. These characteristics are dimensions in which the taste of sucrose is different from the tastes of sweetness enhanced sweetener compositions. Whether or not a characteristic is more sugar-like is determined by expert sensory panel assessments of sugar and compositions comprising the sweetness enhanced sweetener composition, both with and without a sweet taste improving composition. Such assessments quantify similarities of the characteristics of compositions comprising the sweetness enhanced sweetener composition, both with and without a sweet taste improving composition, with those comprising sugar. Suitable procedures for determining whether a composition has a more sugar-like taste are well known in the art.

In a particular embodiment, a panel of assessors is used to measure the reduction of sweetness linger. Briefly described, a panel of assessors (generally 8 to 12 individuals) is trained to evaluate sweetness perception and measure sweetness at several time points from when the sample is initially taken into the mouth until 3 minutes after it has been expectorated. Using statistical analysis, the results are compared between samples containing additives and samples that do not contain additives. A decrease in score for a time point measured after the sample has cleared the mouth indicates there has been a reduction in sweetness perception.

The panel of assessors may be trained using procedures well known to those of ordinary skill in the art. In a particular embodiment, the panel of assessors may be trained using the Spectrum™ Descriptive Analysis Method (Meilgaard et al, *Sensory Evaluation Techniques*, $3^{rd}$ edition, Chapter 11). In one embodiment, the focus of training should be the recognition of and the measure of the basic tastes; specifically, sweet. In order to ensure accuracy and reproducibility of results, each assessor should repeat the measure of the reduction of sweetness linger about three to about five times per sample, taking at least a five minute break between each repetition and/or sample and rinsing well with water to clear the mouth.

Generally, the method of measuring sweetness comprises taking a 10 mL sample into the mouth, holding the sample in the mouth for 5 seconds and gently swirling the sample in the mouth, rating the sweetness intensity perceived at 5 seconds, expectorating the sample (without swallowing following expectorating the sample), rinsing with one mouthful of water (e.g., vigorously moving water in mouth as if with mouth wash) and expectorating the rinse water, rating the sweetness intensity perceived immediately upon expectorating the rinse water, waiting 45 seconds and, while waiting those 45 seconds, identifying the time of maximum perceived sweetness intensity and rating the sweetness intensity at that time (moving the mouth normally and swallowing as needed), rating the sweetness intensity after another 10-15 seconds, rating the sweetness intensity after another 60 seconds (cumulative 120 seconds after rinse), and rating the sweetness intensity after still another 60 seconds (cumulative 180 seconds after rinse). Between samples, take a 5 minute break, rinsing well with water to clear the mouth.

As used herein, the term "carbohydrate" generally refers to aldehyde or ketone compounds substituted with multiple hydroxyl groups, of the general formula $(CH_2O)_n$, wherein n is 3-30, as well as their oligomers and polymers. The carbohydrates of the present invention can, in addition, be substituted or deoxygenated at one or more positions. Carbohydrates, as used herein, encompass unmodified carbohydrates, carbohydrate derivatives, substituted carbohydrates, and modified carbohydrates. As used herein, the phrases "carbohydrate derivatives", "substituted carbohydrate", and "modified carbohydrates" are synonymous. Modified carbohydrate means any carbohydrate wherein at least one atom has been added, removed, substituted, or combinations thereof. Thus, carbohydrate derivatives or substituted carbohydrates include substituted and unsubstituted monosaccharides, disaccharides, oligosaccharides, and polysaccharides. The carbohydrate derivatives or substituted carbohydrates optionally can be deoxygenated at any corresponding C-position, and/or substituted with one or more moieties such as hydrogen, halogen, haloalkyl, carboxyl, acyl, acyloxy, amino, amido, carboxyl derivatives, alkylamino, dialkylamino, arylamino, alkoxy, aryloxy, nitro, cyano, sulfo, mercapto, imino, sulfonyl, sulfenyl, sulfinyl, sulfamoyl, carboalkoxy, carboxamido, phosphonyl, phosphinyl, phosphoryl, phosphino, thioester, thioether, oximino, hydrazino, carbamyl, phospho, phosphonato, or any other viable group provided the carbohydrate derivative or substituted carbohydrate functions to improve the sweet taste of the sweetness enhanced sweetener composition.

Non-limiting examples of carbohydrates in embodiments of this invention include tagatose, trehalose, galactose, rhamnose, cyclodextrin (e.g., α-cyclodextrin, β-cyclodextrin, and γ-cyclodextrin), maltodextrin (including resistant maltodextrins such as Fibersol-2™), dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, gluconolactone, abequose, galactosamine, beet oligosaccharides, isomalto-oligosaccharides (isomaltose, isomaltotriose, panose and the like), xylo-oligosaccharides (xylotriose, xylobiose and the like), gentio-oligoscaccharides (gentiobiose, gentiotriose, gentiotetraose and the like), sorbose, nigero-oligosaccharides, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, and glucose syrup. Additionally, the carbohydrates as used herein may be in either the D- or L-configuration.

The term "polyol", as used herein, refers to a molecule that contains more than one hydroxyl group. A polyol may be a diol, triol, or a tetraol which contain 2, 3, and 4 hydroxyl groups, respectively. A polyol also may contain more than four hydroxyl groups, such as a pentaol, hexaol, heptaol, or the like, which contain, 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Non-limiting examples of sweet taste improving polyol additives in embodiments of this invention include erythritol, maltitol, mannitol, sorbitol, lactitol, xylitol, inositol, isomalt, propylene glycol, glycerol (glycerine), threitol, galactitol, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect the taste of the sweetness enhanced sweetener composition.

Suitable sweet taste improving amino acid additives for use in embodiments of this invention include, but are not limited to, aspartic acid, arginine, glycine, glutamic acid, proline, threonine, theanine, cysteine, cystine, alanine, valine, tyrosine, leucine, isoleucine, asparagine, serine, lysine, histidine, ornithine, methionine, carnitine, aminobutyric acid (alpha-, beta-, or gamma-isomers), glutamine, hydroxyproline, taurine, norvaline, sarcosine, and their salt forms such as sodium or potassium salts or acid salts. The sweet taste improving amino acid additives also may be in the D- or L-configuration and in the mono-, di-, or tri-form of the same or different amino acids. Additionally, the amino acids may be α-, β-, γ-, δ-, and ε-isomers if appropriate. Combinations of the foregoing amino acids and their corresponding salts (e.g., sodium, potassium, calcium, magnesium salts or other alkali or alkaline earth metal salts thereof, or acid salts) also are suitable sweet taste improving additives in embodiments of this invention. The amino acids may be natural or synthetic. The amino acids also may be modified. Modified amino acid refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as trimethyl glycine, N-methyl-glycine, and N-methyl-alanine. As used herein, amino acids encompass both modified and unmodified amino acids. As used herein, modified amino acid also may encompass peptides and polypeptides (e.g., dipeptides, tripeptides, tetrapeptides, and pentapeptides) such as glutathione and L-alanyl-L-glutamine.

Suitable sweet taste improving polyamino acid additives include poly-L-aspartic acid, poly-L-lysine (e.g., poly-L-α-lysine or poly-L-ε-lysine), poly-L-ornithine (e.g., poly-L-α-ornithine or poly-L-γ-ornithine), poly-L-arginine, other polymeric forms of amino acids, and salt forms thereof (e.g., magnesium, calcium, potassium, or sodium salts such as L-glutamic acid mono sodium salt). The sweet taste improving polyamino acid additives also may be in the D- or L-configuration. Additionally, the polyamino acids may be α-, β-, γ-, δ-, and ε-isomers if appropriate. Combinations of the foregoing polyamino acids and their corresponding salts (e.g., sodium, potassium, calcium, magnesium salts or other alkali or alkaline earth metal salts thereof or acid salts) also are suitable sweet taste improving additives in embodiments of this invention. The polyamino acids described herein also may comprise co-polymers of different amino acids. The polyamino acids may be natural or synthetic. The polyamino acids also may be modified, such that at least one atom has been added, removed, substituted, or combinations thereof (e.g., N-alkyl polyamino acid or N-acyl polyamino acid). As used herein, polyamino acids encompass both modified and unmodified polyamino acids. In accordance with particular embodiments, modified polyamino acids include, but are not limited to polyamino acids of various molecular weights (MW), such as poly-L-α-lysine with a MW of 1,500, MW of 6,000, MW of 25,200, MW of 63,000, MW of 83,000, or MW of 300,000.

Suitable sweet taste improving sugar acid additives for use in embodiments of this invention include, but are not limited to, aldonic, uronic, aldaric, alginic, gluconic, glucuronic, glucaric, galactaric, galacturonic, and their salts (e.g., sodium, potassium, calcium, magnesium salts or other physiologically acceptable salts), and combinations thereof.

Suitable sweet taste improving nucleotide additives for use in embodiments of this invention include, but are not limited to, inosine monophosphate (IMP), guanosine monophosphate (GMP), adenosine monophosphate (AMP), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, and their alkali or alkaline earth metal salts, and combinations thereof. The nucleotides described herein also may comprise nucleotide-related additives, such as nucleosides or nucleic acid bases (e.g., guanine, cytosine, adenine, thymine, uracil).

Suitable sweet taste improving organic acid additives include any compound which comprises a —COOH moiety. Suitable sweet taste improving organic acid additives for use in embodiments of this invention include, but are not limited to, C2-C30 carboxylic acids, substituted hydroxyl C1-C30 carboxylic acids, berzoic acid, substituted benzoic acids (e.g. 2,4-dihydroxybenzoic acid), substituted cinnamic acids, hydroxyacids, substituted hydroxybenzoic acids, substituted cyclohexyl carboxylic acids, tannic acid, lactic acid, tartaric acid, citric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, glucosamine hydrochloride, glucono delta lactone, caffeic acid, bile acids, acetic acid, ascorbic acid, alginic acid, erythorbic acid, polyglutamic acid, and their alkali or alkaline earth metal salt derivatives thereof. In addition, the sweet taste improving organic acid additives also may be in either the D- or L-configuration.

Suitable sweet taste improving organic acid salt additives include, but are not limited to, sodium, calcium, potassium, and magnesium salts of all organic acids, such as salts of citric acid, malic acid, tartaric acid, fumaric acid, lactic acid (e.g., sodium lactate), alginic acid (e.g., sodium alginate), ascorbic acid (e.g., sodium ascorbate), benzoic acid (e.g., sodium benzoate or potassium benzoate), and adipic acid. The examples of the sweet taste improving organic acid salt additives described optionally may be substituted with one or more of the following moieties selected from the group consisting of hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phospho, phosphonato, and any other viable group, provided the substituted organic acid salt additive functions to improve the sweet taste of the sweetness enhanced sweetener composition.

Suitable sweet taste improving inorganic acid additives for use in embodiments of this invention include, but are not limited to, phosphoric acid, phosphorous acid, polyphosphoric acid, hydrochloric acid, sulfuric acid, carbonic acid, sodium dihydrogen phosphate, and their corresponding alkali or alkaline earth metal salts thereof.

Suitable sweet taste improving bitter compound additives for use in embodiments of this invention include, but are not limited to, caffeine, quinine, urea, bitter orange oil, naringin, quassia, and salts thereof.

Suitable sweet taste improving flavorant and flavoring ingredient additives for use in embodiments of this invention may include, but are not limited to, vanillin, vanilla extract, mango extract, cinnamon, citrus, coconut, ginger, viridiflorol, almond, menthol (including menthol without mint), grape skin extract, and grape seed extract. "Flavorant" and "flavoring ingredient" are synonymous, and include natural or synthetic substances or combinations thereof. Flavorants also include any other substance which imparts flavor, and may include natural or non-natural (synthetic) substances which are safe for human or animals when used in a generally accepted range. Non-limiting examples of proprietary flavorants may include Döhler™ Natural Flavoring Sweetness Enhancer K14323 (Döhler™, Darmstadt, Germany), Symrise™ Natural Flavor Mask for Sweeteners 161453 and 164126 (Symrise, Holzminden™, Germany), Natural Advantage™ Bitterness Blockers 1, 2, 9 and 10 (Natural Advantage™, Freehold, N.J., U.S.A.), and Sucramask™ (Creative Research Management, Stockton, Calif., U.S.A.).

Suitable sweet taste improving polymer additives for use in embodiments of this invention may include, but are not limited to, chitosan, pectin, pectic, pectinic, polyuronic, polygalacturonic acid, starch, food hydrocolloid or crude extracts thereof (e.g., gum acacia senegal (Fibergum™), gum acacia seyal, carageenan), poly-L-lysine (e.g., poly-L-α-lysine or poly-L-ε-lysine), poly-L-ornithine (e.g., poly-L-α-ornithine or poly-L-γ-ornithine), polyarginine, polypropylene glycol, polyethylene glycol, poly(ethylene glycol methyl ether), polyaspartic acid, polyglutamic acid, polyethyleneimine, alginic acid, sodium alginate, propylene glycol alginate, sodium hexametaphosphate (SHMP) and its salts, and sodium polyethyleneglycolalginate and other cationic and anionic polymers.

Suitable sweet taste improving protein or protein hydrolysate additives for use in embodiments of this invention include, but are not limited to, bovine serum albumin (BSA), whey protein (including fractions or concentrates thereof such as 90% instant whey protein isolate, 34% whey protein, 50% hydrolyzed whey protein, and 80% whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate).

Suitable sweet taste improving surfactant additives for use in embodiments of this invention include, but are not limited to, polysorbates (e.g., polyoxyethylene sorbitan monooleate (polysorbate 80), polysorbate 20, polysorbate 60), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers, and the like.

Suitable sweet taste improving flavonoid additives for use in embodiments of this invention generally are classified as flavonols, flavones, flavanones, flavan-3-ols, isoflavones, or anthocyanidins. Non-limiting examples of flavonoid additives include catechins (e.g., green tea extracts such as Polyphenon™ 60, Polyphenon™ 30, and Polyphenon™ 25 (Mitsui Norin Co., Ltd., Japan), polyphenols, rutins (e.g., enzyme modified rutin Sanmelin™ AO (San-Ei Gen F.F.I., Inc., Osaka, Japan)), neohesperidin, naringin, and the like.

Suitable sweet taste improving alcohol additives for use in embodiments of this invention include, but are not limited to, ethanol.

Suitable sweet taste improving astringent compound additives include, but are not limited to, tannic acid, europium chloride ($EuCl_3$), gadolinium chloride ($GdCl_3$), terbium chloride ($TbCl_3$), alum, tannic acid, and polyphenols (e.g., tea polyphenols).

Suitable sweet taste improving vitamins include nicotinamide (Vitamin B3) and pyridoxal hydrochloride (Vitamin B6).

The sweet taste improving compositions also may comprise other natural and/or synthetic high-potency sweeteners. For example, wherein the sweetener composition comprises at least one NHPS, the at least one sweet taste improving composition may comprise a synthetic high-potency sweetener, non-limiting examples of which include sucralose, potassium acesulfame, aspartame, alitame, saccharin, neohesperidin dihydrochalcone, cyclamate, neotame, N-[3-(3-hydroxy-4-methoxyphenyl)propyl]-L-α-aspartyl]-L-phenylalanine 1-methyl ester, N-[3-(3-hydroxy-4-methoxyphenyl)-3-methylbutyl]-L-α-aspartyl]-L-phenylalanine 1-methyl ester, N-[3-(3-methoxy-4-hydroxyphenyl)propyl]-L-α-aspartyl]-L-phenylalanine 1-methyl ester, salts thereof, and the like.

The sweet taste improving compositions also may be in salt form which may be obtained using standard procedures well known in the art. The term "salt" also refers to complexes that retain the desired chemical activity of the sweet taste improving compositions of the present invention and are safe for human or animal consumption in a generally acceptable range. Alkali metal (for example, sodium or potassium) or alkaline earth metal (for example, calcium or magnesium) salts also can be made. Salts also may include combinations of alkali and alkaline earth metals. Non-limiting examples of such salts are (a) acid addition salts formed with inorganic acids and salts formed with organic acids; (b) base addition salts formed with metal cations such as calcium, bismuth, barium, magnesium, aluminum, copper, cobalt, nickel, cadmium, sodium, potassium, and the like, or with a cation formed from ammonia, N,N-dibenzylethylenediamine, D-glucosamine, tetraethylammonium, or ethylenediamine; or (c) combinations of (a) and (b). Thus, any salt forms which may be derived from the sweet taste improving compositions may be used with the embodiments of the present invention as long as the salts of the sweet taste improving additives do not adversely affect the taste of the sweetness enhanced sweetener compositions or the orally ingestible compositions comprising the sweetness enhanced sweetener compositions. The salt forms of the additives can be added to the sweetness enhanced sweetener compositions in the same amounts as their acid or base forms.

In particular embodiments, suitable sweet taste improving inorganic salts useful as sweet taste improving additives include, but are not limited to, sodium chloride, potassium chloride, sodium sulfate, potassium citrate, europium chloride ($EuCl_3$), gadolinium chloride ($GdCl_3$), terbium chloride ($TbCl_3$), magnesium sulfate, alum, magnesium chloride, mono-, di-, tri-basic sodium or potassium salts of phosphoric acid (e.g., inorganic phosphates), salts of hydrochloric acid (e.g., inorganic chlorides), sodium carbonate, sodium bisulfate, and sodium bicarbonate. Furthermore, in particular embodiments, suitable organic salts useful as sweet taste improving additives include, but are not limited to, choline chloride, alginic acid sodium salt (sodium alginate), glucoheptonic acid sodium salt, gluconic acid sodium salt (sodium gluconate), gluconic acid potassium salt (potassium gluconate), guanidine HCl, glucosamine HCl, monosodium glutamate (MSG), adenosine monophosphate salt, magnesium gluconate, potassium tartrate (monohydrate), and sodium tartrate (dihydrate).

It has been discovered that combinations of the sweetness enhanced sweetener compositions and at least one sweet taste improving composition improve the temporal profile and/or flavor profile, including the osmotic taste, to be more sugar-like. One of ordinary skill in the art, with the teachings of the present invention, may arrive at all the possible combinations of sweetness enhanced sweetener compositions and sweet taste improving compositions. For example, non-limiting combinations of the sweetness enhanced sweetener compositions and sweet taste improving compositions include:

1. a sweetness enhanced sweetener composition and at least one carbohydrate;
2. a sweetness enhanced sweetener composition and at least one polyol;
3. a sweetness enhanced sweetener composition and at least one amino acid;
4. a sweetness enhanced sweetener composition and at least one other sweet taste improving additive;
5. a sweetness enhanced sweetener composition, at least one carbohydrate, at least one polyol, at least one amino acid, and at least one other sweet taste improving additive;
6. a sweetness enhanced sweetener composition, at least one carbohydrate, and at least one polyol;
7. a sweetness enhanced sweetener composition, at least one carbohydrate, and at least one amino acid;
8. a sweetness enhanced sweetener composition, at least one carbohydrate, and at least one other sweet taste improving additive;
9. a sweetness enhanced sweetener composition, at least one polyol, and at least one amino acid;
10. a sweetness enhanced sweetener composition, at least one polyol, and at least one other sweet taste improving additive;
11. a sweetness enhanced sweetener composition, at least one amino acid, and at least one other sweet taste improving additive;
12. a sweetness enhanced sweetener composition, at least one carbohydrate, at least one polyol, and at least one amino acid;
13. a sweetness enhanced sweetener composition, at least one carbohydrate, at least one polyol, and at least one other sweet taste improving additive;
14. a sweetness enhanced sweetener composition, at least one polyol, at least one amino acid, and at least one other sweet taste improving additive; and
15. a sweetness enhanced sweetener composition, at least one carbohydrate, at least one amino acid, and at least one other sweet taste improving additive.

These fifteen major combinations further may be broken down into further combinations in order to improve the overall taste of the sweetness enhanced sweetener composition or the orally ingestible compositions comprising the sweetness enhanced sweetener composition.

As explained above, the sweet taste improving composition is selected from the group consisting of polyols, carbohydrates, amino acids, other sweet taste improving additives, and combinations thereof. The other sweet taste improving additives useful in embodiments of this invention are described hereinabove. In one embodiment, a single sweet taste improving composition may be used with a sweetness enhanced sweetener composition. In another embodiment, one or more sweet taste improving compositions may be used with a sweetness enhanced sweetener composition. Thus, non-limiting examples of sweet taste improving composition combinations for embodiments of this invention include:

i. at least one polyol, at least one carbohydrate, at least one amino acid, and at least one other sweet taste improving additive;
ii. at least one polyol, at least one carbohydrate, and at least one other sweet taste improving additive;

iii. at least one polyol and at least one other sweet taste improving additive;
iv. at least one polyol and at least one carbohydrate;
v. at least one carbohydrate and at least one other sweet taste improving additive;
vi. at least one polyol and at least one amino acid;
vii. at least one carbohydrate and at least one amino acid;
viii. at least one amino acid and at least one other sweet taste improving additive.

Other sweet taste improving composition combinations in accordance with embodiments of this invention include:

1. at least one polyol, at least one carbohydrate, and at least one amino acid;
2. at least one polyol, at least one carbohydrate, and at least one polyamino acid;
3. at least one polyol, at least one carbohydrate, and at least one sugar acid;
4. at least one polyol, at least one carbohydrate, and at least one nucleotide;
5. at least one polyol, at least one carbohydrate, and at least one organic acid;
6. at least one polyol, at least one carbohydrate, and at least one inorganic acid;
7. at least one polyol, at least one carbohydrate, and at least one bitter compound;
8. at least one polyol, at least one carbohydrate, and at least one flavorant or flavoring ingredient;
9. at least one polyol, at least one carbohydrate, and at least one polymer;
10. at least one polyol, at least one carbohydrate, and at least one protein or protein hydrolysate or protein or protein hydrolysate with low molecular weight amino acid;
11. at least one polyol, at least one carbohydrate, and at least one surfactant;
12. at least one polyol, at least one carbohydrate, and at least one flavonoid;
13. at least one polyol, at least one carbohydrate, and at least one alcohol;
14. at least one polyol, at least one carbohydrate, and at least one emulsifier;
15. at least one polyol, at least one carbohydrate, and at least one inorganic salt,
16. at least one polyol, at least one carbohydrate, and at least one organic salt,
17. at least one polyol, at least one carbohydrate, and at least one amino acid, and at least one other sweet taste improving additive;
18. at least one polyol, at least one carbohydrate, and at least one polyamino acid, and at least one other sweet taste improving additive;
19. at least one polyol, at least one carbohydrate, and at least one sugar acid, and at least one other sweet taste improving additive;
20, at least one polyol, at least one carbohydrate, and at least one nucleotide, and at least one other sweet taste improving additive;
21. at least one polyol, at least one carbohydrate, and at least one organic acid, and at least one other sweet taste improving additive;
22. at least one polyol, at least one carbohydrate, and at least one inorganic acid, and at least one other sweet taste improving additive;
23. at least one polyol, at least one carbohydrate, and at least one bitter compound, and at least one other sweet taste improving additive;
24. at least one polyol, at least one carbohydrate, and at least one flavorant or flavoring ingredient, and at least one other sweet taste improving additive;
25. at least one polyol, at least one carbohydrate, and at least one polymer, and at least one other sweet taste improving additive;
26. at least one polyol, at least one carbohydrate, and at least one protein or protein hydrolysate, and at least one other sweet taste improving additive;
27. at least one polyol, at least one carbohydrate, and at least one surfactant, and at least one other sweet taste improving additive;
28. at least one polyol, at least one carbohydrate, and at least one flavonoid, and at least one other sweet taste improving additive;
29. at least one polyol, at least one carbohydrate, and at least one alcohol, and at least one other sweet taste improving additive;
30. at least one polyol, at least one carbohydrate, at least one amino acid, and at least one polyamino acid;
31. at least one polyol, at least one carbohydrate, at least one amino acid, at least one polyamino acid, and at least one sugar acid;
32. at least one polyol, at least one carbohydrate, at least one amino acid, at least one polyamino acid, at least one sugar acid, and at least one nucleotide;
33. at least one polyol, at least one carbohydrate, at least one amino acid, at least one polyamino acid, at least one sugar acid, at least one nucleotide, and at least one organic acid;
34. at least one polyol, at least one carbohydrate, at least one amino acid, at least one polyamino acid, at least one sugar acid, at least one nucleotide, at least one organic acid, and at least one inorganic acid;
35. at least one polyol, at least one carbohydrate, at least one amino acid, at least one polyamino acid, at least one sugar acid, at least one nucleotide, at least one organic acid, at least one inorganic acid, and at least one bitter compound;
36. at least one polyol, at least one carbohydrate, at least one amino acid, at least one polyamino acid, at least one sugar acid, at least one nucleotide, at least one organic acid, at least one inorganic acid, at least one bitter compound, and at least one polymer;
37. at least one polyol, at least one carbohydrate, at least one amino acid, at least one polyamino acid, at least one sugar acid, at least one nucleotide, at least one organic acid, at least one inorganic acid, at least one bitter compound, at least one polymer, and at least one protein or protein hydrolysate;
38. at least one polyol, at least one carbohydrate, at least one amino acid, at least one polyamino acid, at least one sugar acid, at least one nucleotide, at least one organic acid, at least one inorganic acid, at least one bitter compound, at least one polymer, at least one protein or protein hydrolysate, and at least one surfactant;
39. at least one polyol, at least one carbohydrate, at least one amino acid, at least one polyamino acid, at least one sugar acid, at least one nucleotide, at least one organic acid, at least one inorganic acid, at least one bitter compound, at least one polymer, at least one protein or protein hydrolysate, at least one surfactant, and at least one flavonoid;
40. at least one polyol, at least one carbohydrate, at least one amino acid, at least one polyamino acid, at least one sugar acid, at least one nucleotide, at least one organic acid, at least one inorganic acid, at least one bitter compound, at least one polymer, at least one protein or protein hydrolysate, at least one surfactant, at least one flavonoid, and at least one alcohol;

41. at least one polyol, at least one carbohydrate, at least one amino acid, and at least one sugar acid;
42. at least one polyol, at least one carbohydrate, at least one amino acid, and at least one nucleotide;
43. at least one polyol, at least one carbohydrate, at least one amino acid, and at least one organic acid;
44. at least one polyol, at least one carbohydrate, at least one amino acid, and at least one inorganic acid;
45. at least one polyol, at least one carbohydrate, at least one amino acid, and at least one bitter compound;
46. at least one polyol, at least one carbohydrate, at least one amino acid, and at least one polymer;
47. at least one polyol, at least one carbohydrate, at least one amino acid, and at least one protein or protein hydrolysate;
48. at least one polyol, at least one carbohydrate, at least one amino acid, and at least one surfactant;
49. at least one polyol, at least one carbohydrate, at least one amino acid, and at least one flavonoid;
50. at least one polyol, at least one carbohydrate, at least one amino acid, and at least one alcohol;
51. at least one polyol, at least one carbohydrate, at least one polyamino acid, and at least one sugar acid;
52. at least one polyol, at least one carbohydrate, at least one polyamino acid, and at least one nucleotide;
53. at least one polyol, at least one carbohydrate, at least one polyamino acid, and at least one organic acid;
54. at least one polyol, at least one carbohydrate, at least one polyamino acid, and at least one inorganic acid;
55. at least one polyol, at least one carbohydrate, at least one polyamino acid, and at least one bitter compound;
56. at least one polyol, at least one carbohydrate, at least one polyamino acid, and at least one polymer;
57. at least one polyol, at least one carbohydrate, at least one polyamino acid, and at least one protein or protein hydrolysate;
58. at least one polyol, at least one carbohydrate, at least one polyamino acid, and at least one surfactant;
59. at least one polyol, at least one carbohydrate, at least one polyamino acid, and at least one flavonoid;
60. at least one polyol, at least one carbohydrate, at least one polyamino acid, and at least one alcohol;
61. at least one polyol, at least one carbohydrate, at least one sugar acid, and at least one nucleotide;
62. at least one polyol, at least one carbohydrate, at least one sugar acid, and at least one organic acid;
63. at least one polyol, at least one carbohydrate, at least one sugar acid, and at least one inorganic acid;
64. at least one polyol, at least one carbohydrate, at least one sugar acid, and at least one bitter compound;
65. at least one polyol, at least one carbohydrate, at least one sugar acid, and at least one polymer;
66. at least one polyol, at least one carbohydrate, at least one sugar acid, and at least one protein or protein hydrolysate;
67. at least one polyol, at least one carbohydrate, at least one sugar acid, and at least one surfactant;
68. at least one polyol, at least one carbohydrate, at least one sugar acid, and at least one flavonoid;
69. at least one polyol, at least one carbohydrate, at least one sugar acid, and at least one alcohol;
70. at least one polyol, at least one carbohydrate, at least one nucleotide, and at least one organic acid;
71. at least one polyol, at least one carbohydrate, at least one nucleotide, and at least one inorganic acid;
72. at least one polyol, at least one carbohydrate, at least one nucleotide, and at least one bitter compound;
73. at least one polyol, at least one carbohydrate, at least one nucleotide, and at least one polymer;
74. at least one polyol, at least one carbohydrate, at least one nucleotide, and at least one protein or protein hydrolysate;
75. at least one polyol, at least one carbohydrate, at least one nucleotide, and at least one surfactant;
76. at least one polyol, at least one carbohydrate, at least one nucleotide, and at least one flavonoid;
77. at least one polyol, at least one carbohydrate, at least one nucleotide, and at least one alcohol;
78. at least one polyol, at least one carbohydrate, at least one organic acid, and at least one inorganic acid;
79. at least one polyol, at least one carbohydrate, at least one organic acid, and at least one bitter compound;
80. at least one polyol, at least one carbohydrate, at least one organic acid, and at least one polymer;
81. at least one polyol, at least one carbohydrate, at least one organic acid, and at least one protein or protein hydrolysate;
82. at least one polyol, at least one carbohydrate, at least one organic acid, and at least one surfactant;
83. at least one polyol, at least one carbohydrate, at least one organic acid, and at least one flavonoid;
84. at least one polyol, at least one carbohydrate, at least one organic acid, and at least one alcohol;
85. at least one polyol, at least one carbohydrate, at least one inorganic acid, and at least one bitter compound;
86. at least one polyol, at least one carbohydrate, at least one inorganic acid, and at least one polymer;
87. at least one polyol, at least one carbohydrate, at least one inorganic acid, and at least one protein or protein hydrolysate;
88. at least one polyol, at least one carbohydrate, at least one inorganic acid, and at least one surfactant;
89. at least one polyol, at least one carbohydrate, at least one inorganic acid, and at least one flavonoid; 90, at least one polyol, at least one carbohydrate, at least one inorganic acid, and at least one alcohol;
91. at least one polyol, at least one carbohydrate, at least one bitter compound, and at least one polymer;
92. at least one polyol, at least one carbohydrate, at least one bitter compound, and at least one protein or protein hydrolysate;
93. at least one polyol, at least one carbohydrate, at least one bitter compound, and at least one surfactant;
94. at least one polyol, at least one carbohydrate, at least one bitter compound, and at least one flavonoid;
95. at least one polyol, at least one carbohydrate, at least one bitter compound, and at least one alcohol;
96. at least one polyol, at least one carbohydrate, at least one polymer, and at least one protein or protein hydrolysate;
97. at least one polyol, at least one carbohydrate, at least one polymer, and at least one surfactant;
98. at least one polyol, at least one carbohydrate, at least one polymer, and at least one flavonoid;
99. at least one polyol, at least one carbohydrate, at least one polymer, and at least one alcohol;
100. at least one polyol, at least one carbohydrate, at least one protein or protein hydrolysate, and at least one surfactant;

101. at least one polyol, at least one carbohydrate, at least one protein or protein hydrolysate, and at least one flavonoid;
102. at least one polyol, at least one carbohydrate, at least one surfactant, and at least one flavonoid;
103. at least one polyol, at least one carbohydrate, at least one surfactant, and at least one alcohol; and
104. at least one polyol, at least one carbohydrate, at least one flavonoid, and at least one alcohol.

Other sweet taste improving composition combinations in accordance with embodiments of this invention include:
1. at least one polyol and at least one amino acid;
2. at least one polyol and at least one polyamino acid;
3. at least one polyol and at least one sugar acid;
4. at least one polyol and at least one nucleotide;
5. at least one polyol and at least one organic acid;
6. at least one polyol and at least one inorganic acid;
7. at least one polyol and at least one bitter compound;
8. at least one polyol and at least one flavorant or flavoring ingredient;
9. at least one polyol and at least one polymer;
10. at least one polyol and at least one protein or protein hydrolysate;
11. at least one polyol and at least one surfactant;
12. at least one polyol and at least one flavonoid;
13. at least one polyol and at least one alcohol;
14. at least one polyol and at least one emulsifier;
15. at least one polyol and at least one inorganic salt;
16. at least one polyol and at least one organic salt;
17. at least one polyol and at least one protein or protein hydrolysate or mixture of low molecular weight amino acids;
18. at least one polyol, at least one amino acid, and at least one other sweet taste improving additive;
19. at least one polyol, at least one polyamino acid, and at least one other sweet taste improving additive;
20. at least one polyol, at least one sugar acid, and at least one other sweet taste improving additive;
21. at least one polyol, at least one nucleotide, and at least one other sweet taste improving additive;
22. at least one polyol, at least one organic acid, and at least one other sweet taste improving additive;
23. at least one polyol, at least one inorganic acid, and at least one other sweet taste improving additive;
24. at least one polyol, at least one bitter compound, and at least one other sweet taste improving additive;
25. at least one polyol, at least one flavorant or flavoring ingredient, and at least one other sweet taste improving additive;
26. at least one polyol, at least one polymer, and at least one other sweet taste improving additive;
27. at least one polyol, at least one protein or protein hydrolysate, and at least one other sweet taste improving additive;
28. at least one polyol, at least one surfactant, and at least one other sweet taste improving additive;
29. at least one polyol, at least one flavonoid, and at least one other sweet taste improving additive;
30. at least one polyol, at least one alcohol, and at least one other sweet taste improving additive;
31. at least one polyol, at least one amino acid, and at least one polyamino acid;
32. at least one polyol, at least one amino acid, at least one polyamino acid, and at least one sugar acid;
33. at least one polyol, at least one amino acid, at least one polyamino acid, at least one sugar acid, and at least one nucleotide;
34. at least one polyol, at least one amino acid, at least one polyamino acid, at least one sugar acid, at least one nucleotide, and at least one organic acid;
35. at least one polyol, at least one amino acid, at least one polyamino acid, at least one sugar acid, at least one nucleotide, at least one organic acid, and at least one inorganic acid;
36. at least one polyol, at least one amino acid, at least one polyamino acid, at least one sugar acid, at least one nucleotide, at least one organic acid, at least one inorganic acid, and at least one bitter compound;
37. at least one polyol, at least one amino acid, at least one polyamino acid, at least one sugar acid, at least one nucleotide, at least one organic acid, at least one inorganic acid, at least one bitter compound, and at least one polymer;
38. at least one polyol, at least one amino acid, at least one polyamino acid, at least one sugar acid, at least one nucleotide, at least one organic acid, at least one inorganic acid, at least one bitter compound, at least one polymer, and at least one protein or protein hydrolysate;
39. at least one polyol, at least one amino acid, at least one polyamino acid, at least one sugar acid, at least one nucleotide, at least one organic acid, at least one inorganic acid, at least one bitter compound, at least one polymer, at least one protein or protein hydrolysate, and at least one surfactant;
40. at least one polyol, at least one amino acid, at least one polyamino acid, at least one sugar acid, at least one nucleotide, at least one organic acid, at least one inorganic acid, at least one bitter compound, at least one polymer, at least one protein or protein hydrolysate, at least one surfactant, and at least one flavonoid;
41. at least one polyol, at least one amino acid, at least one polyamino acid, at least one sugar acid, at least one nucleotide, at least one organic acid, at least one inorganic acid, at least one bitter compound, at least one polymer, at least one protein or protein hydrolysate, at least one surfactant, at least one flavonoid, and at least one alcohol;
42. at least one polyol, at least one amino acid, and at least one sugar acid;
43. at least one polyol, at least one amino acid, and at least one nucleotide;
44. at least one polyol, at least one amino acid, and at least one organic acid;
45. at least one polyol, at least one amino acid, and at least one inorganic acid;
46. at least one polyol, at least one amino acid, and at least one bitter compound;
47. at least one polyol, at least one amino acid, and at least one polymer;
48. at least one polyol, at least one amino acid, and at least one protein or protein hydrolysate;
49. at least one polyol, at least one amino acid, and at least one surfactant;
50. at least one polyol, at least one amino acid, and at least one flavonoid;
51. at least one polyol, at least one amino acid, and at least one alcohol;
52. at least one polyol, at least one polyamino acid, and at least one sugar acid;
53. at least one polyol, at least one polyamino acid, and at least one nucleotide;
54. at least one polyol, at least one polyamino acid, and at least one organic acid;

55. at least one polyol, at least one polyamino acid, and at least one organic salt;
56. at least one polyol, at least one polyamino acid, and at least one inorganic acid;
57. at least one polyol, at least one polyamino acid, and at least one inorganic salt;
58. at least one polyol, at least one polyamino acid, and at least one bitter compound;
59. at least one polyol, at least one polyamino acid, and at least one polymer;
60. at least one polyol, at least one polyamino acid, and at least one protein or protein hydrolysate;
61. at least one polyol, at least one polyamino acid, and at least one surfactant;
62. at least one polyol, at least one polyamino acid, and at least one flavonoid;
63. at least one polyol, at least one polyamino acid, and at least one alcohol;
64. at least one polyol, at least one sugar acid, and at least one nucleotide;
65. at least one polyol, at least one sugar acid, and at least one organic acid;
66. at least one polyol, at least one sugar acid, and at least one inorganic acid;
67. at least one polyol, at least one sugar acid, and at least one bitter compound;
68. at least one polyol, at least one sugar acid, and at least one polymer;
69. at least one polyol, at least one sugar acid, and at least one protein or protein hydrolysate;
70. at least one polyol, at least one sugar acid, and at least one surfactant;
71. at least one polyol, at least one sugar acid, and at least one flavonoid;
72. at least one polyol, at least one sugar acid, and at least one alcohol;
73. at least one polyol, at least one nucleotide, and at least one organic acid;
74. at least one polyol, at least one nucleotide, and at least one inorganic acid;
75. at least one polyol, at least one nucleotide, and at least one bitter compound;
76. at least one polyol, at least one nucleotide, and at least one polymer;
77. at least one polyol, at least one nucleotide, and at least one protein or protein hydrolysate;
78. at least one polyol, at least one nucleotide, and at least one surfactant;
79. at least one polyol, at least one nucleotide, and at least one flavonoid;
80. at least one polyol, at least one nucleotide, and at least one alcohol;
81. at least one polyol, at least one organic acid, and at least one inorganic acid;
82. at least one polyol, at least one organic acid, and at least one bitter compound;
83. at least one polyol, at least one organic acid, and at least one polymer;
84. at least one polyol, at least one organic acid, and at least one protein or protein hydrolysate;
85. at least one polyol, at least one organic acid, and at least one surfactant;
86. at least one polyol, at least one organic acid, and at least one flavonoid;
87. at least one polyol, at least one organic acid, and at least one alcohol;
88. at least one polyol, at least one inorganic acid, and at least one bitter compound;
89. at least one polyol, at least one inorganic acid, and at least one polymer;
90. at least one polyol, at least one inorganic acid, and at least one protein or protein hydrolysate;
91. at least one polyol, at least one inorganic acid, and at least one surfactant;
92. at least one polyol, at least one inorganic acid, and at least one flavonoid;
93. at least one polyol, at least one inorganic acid, and at least one alcohol;
94. at least one polyol, at least one bitter compound, and at least one polymer;
95. at least one polyol, at least one bitter compound, and at least one protein or protein hydrolysate;
96. at least one polyol, at least one bitter compound, and at least one surfactant;
97. at least one polyol, at least one bitter compound, and at least one flavonoid;
98. at least one polyol, at least one bitter compound, and at least one alcohol;
99. at least one polyol, at least one polymer, and at least one protein or protein hydrolysate;
100. at least one polyol, at least one polymer, and at least one surfactant;
101. at least one polyol, at least one polymer, and at least one flavonoid;
102. at least one polyol, at least one polymer, and at least one alcohol;
103. at least one polyol, at least one protein or protein hydrolysate, and at least one surfactant;
104. at least one polyol, at least one protein or protein hydrolysate, and at least one flavonoid;
105. at least one polyol, at least one surfactant, and at least one flavonoid;
106. at least one polyol, at least one surfactant, and at least one alcohol;
107. at least one polyol, at least one flavonoid, and at least one alcohol;
108. at least one sweet taste improving additive and erythritol;
109. at least one sweet taste improving additive and maltitol;
110. at least one sweet taste improving additive and mannitol;
111. at least one sweet taste improving additive and sorbitol;
112. at least one sweet taste improving additive and lactitol;
113. at least one sweet taste improving additive and xylitol;
114. at least one sweet taste improving additive and isomalt;
115. at least one sweet taste improving additive and propylene glycol;
116. at least one sweet taste improving additive and glycerol;
117. at least one sweet taste improving additive and isomaltulose;
118. at least one sweet taste improving additive and reduced isomalto-oligosaccharides;
119. at least one sweet taste improving additive and reduced xylo-oligosaccharides;
120. at least one sweet taste improving additive and reduced gentio-oligosaccharides;
121. at least one sweet taste improving additive and reduced maltose syrup;

122. at least one sweet taste improving additive and reduced glucose syrup;
123. at least one sweet taste improving additive, erythritol, and at least one other polyol;
124. at least one sweet taste improving additive, maltitol, and at least one other polyol;
125. at least one sweet taste improving additive, mannitol, and at least one other polyol;
126. at least one sweet taste improving additive, sorbitol, and at least one other polyol;
127. at least one sweet taste improving additive, lactitol, and at least one other polyol;
128. at least one sweet taste improving additive, xylitol, and at least one other polyol;
129. at least one sweet taste improving additive, isomalt, and at least one other polyol;
130. at least one sweet taste improving additive, propylene glycol, and at least one other polyol;
131. at least one sweet taste improving additive, glycerol, and at least one other polyol;
132.=
133. at least one sweet taste improving additive, reduced isomalto-oligosaccharides, and at least one other polyol;
134. at least one sweet taste improving additive, reduced xylo-oligosaccharides, and at least one other polyol;
135. at least one sweet taste improving additive, reduced gentio-oligosaccharides, and at least one other polyol;
136. at least one sweet taste improving additive, reduced maltose syrup, and at least one other polyol; and
137. at least one sweet taste improving additive, reduced glucose syrup, and at least one other polyol.

Other sweet taste improving composition combinations in accordance with embodiments of this invention include:

1. at least one polyol and tagatose;
2. at least one polyol and trehalose;
3. at least one polyol and galactose;
4. at least one polyol and rhamnose;
5. at least one polyol and dextrin;
6. at least one polyol and cyclodextrin;
7. at least one polyol and α-cyclodextrin, β-cyclodextrin, or γ-cyclodextrin;
8. at least one polyol and maltodextrin;
9. at least one polyol and dextran;
10. at least one polyol and sucrose;
11. at least one polyol and glucose;
12. at least one polyol and fructose;
13. at least one polyol and threose;
14. at least one polyol and arabinose;
15. at least one polyol and xylose;
16. at least one polyol and lyxose;
17. at least one polyol and allose;
18. at least one polyol and altrose;
19. at least one polyol and mannose;
20. at least one polyol and idose;
21. at least one polyol and talose;
22. at least one polyol and lactose;
23. at least one polyol and maltose;
24. at least one polyol and invert sugar;
25. at least one polyol and trehalose;
26. at least one polyol and isotrehalose;
27. at least one polyol and neotrehalose;
28. at least one polyol and isomaltulose;
29. at least one polyol and galactose;
30. at least one polyol and beet oligosaccharides;
31. at least one polyol and isomalto-oligosaccharides;
32. at least one polyol and isomaltose;
33. at least one polyol and isomaltotriose;
34. at least one polyol and panose;
35. at least one polyol and xylo-oligosaccharides;
36. at least one polyol and xylotriose;
37. at least one polyol and xylobiose;
38. at least one polyol and gentio-oligoscaccharides;
39. at least one polyol and gentiobiose;
40. at least one polyol and gentiotriose;
41. at least one polyol and gentiotetraose;
42. at least one polyol and sorbose;
43. at least one polyol and nigero-oligosaccharides;
44. at least one polyol and fucose;
45. at least one polyol and fructooligosaccharides;
46. at least one polyol and kestose;
47. at least one polyol and nystose;
48. at least one polyol and maltotetraol;
49. at least one polyol and maltotriol;
50. at least one polyol and malto-oligosaccharides;
51. at least one polyol and maltotriose;
52. at least one polyol and maltotetraose;
53. at least one polyol and maltopentaose;
54. at least one polyol and maltohexaose;
55. at least one polyol and maltoheptaose;
56. at least one polyol and lactulose;
57. at least one polyol and melibiose;
58. at least one polyol and raffinose;
59. at least one polyol and rhamnose;
60. at least one polyol and ribose;
61. at least one polyol and isomerized liquid sugars;
62. at least one polyol and high fructose corn syrup (e.g. HFCS55, HFCS42, or HFCS90) or starch syrup;
63. at least one polyol and coupling sugars;
64. at least one polyol and soybean oligosaccharides;
65. at least one polyol and glucose syrup;
66. at least one polyol, tagatose, and at least one other carbohydrate;
67. at least one polyol, trehalose, and at least one other carbohydrate;
68. at least one polyol, galactose, and at least one other carbohydrate;
69. at least one polyol, rhamnose, and at least one other carbohydrate;
70. at least one polyol, dextrin, and at least one other carbohydrate;
71. at least one polyol, cyclodextrin, and at least one other carbohydrate;
72. at least one polyol, β-cyclodextrin, and at least one other carbohydrate;
73, at least one polyol, maltodextrin, and at least one other carbohydrate;
74. at least one polyol, dextran, and at least one other carbohydrate;
75. at least one polyol, sucrose, and at least one other carbohydrate;
76. at least one polyol, glucose, and at least one other carbohydrate;
77. at least one polyol, fructose, and at least one other carbohydrate;
78. at least one polyol, threose, and at least one other carbohydrate;
79. at least one polyol, arabinose, and at least one other carbohydrate;
80. at least one polyol, xylose, and at least one other carbohydrate;
81. at least one polyol, lyxose, and at least one other carbohydrate;
82. at least one polyol, allose, and at least one other carbohydrate;

83. at least one polyol, altrose, and at least one other carbohydrate;
84. at least one polyol, mannose, and at least one other carbohydrate;
85. at least one polyol, idose, and at least one other carbohydrate;
86. at least one polyol, talose, and at least one other carbohydrate;
87. at least one polyol, lactose, and at least one other carbohydrate;
88. at least one polyol, maltose, and at least one other carbohydrate;
89. at least one polyol, invert sugar, and at least one other carbohydrate;
90. at least one polyol, trehalose, and at least one other carbohydrate;
91. at least one polyol, isotrehalose, and at least one other carbohydrate;
92. at least one polyol, neotrehalose, and at least one other carbohydrate;
93. at least one polyol, isomaltulose, and at least one other carbohydrate;
94. at least one polyol, galactose, and at least one other carbohydrate;
95. at least one polyol, beet oligosaccharides, and at least one other carbohydrate;
96. at least one polyol, isomalto-oligosaccharides, and at least one other carbohydrate;
97. at least one polyol, isomaltose, and at least one other carbohydrate;
98. at least one polyol, isomaltotriose, and at least one other carbohydrate;
99. at least one polyol, panose, and at least one other carbohydrate;
100. at least one polyol, xylo-oligosaccharides, and at least one other carbohydrate;
101. at least one polyol, xylotriose, and at least one other carbohydrate;
102. at least one polyol, xylobiose, and at least one other carbohydrate;
103. at least one polyol, gentio-oligoscaccharides, and at least one other carbohydrate;
104. at least one polyol, gentiobiose, and at least one other carbohydrate;
105. at least one polyol, gentiotriose, and at least one other carbohydrate;
106. at least one polyol, gentiotetraose, and at least one other carbohydrate;
107. at least one polyol, sorbose, and at least one other carbohydrate;
108. at least one polyol, nigero-oligosaccharides, and at least one other carbohydrate;
109. at least one polyol, fucose, and at least one other carbohydrate;
110. at least one polyol, fructooligosaccharides, and at least one other carbohydrate;
111. at least one polyol, kestose, and at least one other carbohydrate;
112. at least one polyol, nystose, and at least one other carbohydrate;
113. at least one polyol, maltotetraol, and at least one other carbohydrate;
114. at least one polyol, maltotriol, and at least one other carbohydrate;
115. at least one polyol, malto-oligosaccharides, and at least one other carbohydrate;
116. at least one polyol, maltotriose, and at least one other carbohydrate;
117. at least one polyol, maltotetraose, and at least one other carbohydrate;
118. at least one polyol, maltopentaose, and at least one other carbohydrate;
119. at least one polyol, maltohexaose, and at least one other carbohydrate;
120. at least one polyol, maltoheptaose, and at least one other carbohydrate;
121. at least one polyol, lactulose, and at least one other carbohydrate;
122. at least one polyol, melibiose, and at least one other carbohydrate;
123. at least one polyol, raffinose, and at least one other carbohydrate;
124. at least one polyol, rhamnose, and at least one other carbohydrate;
125. at least one polyol, ribose, and at least one other carbohydrate;
126. at least one polyol, isomerized liquid sugars, and at least one other carbohydrate;
127. at least one polyol, high fructose corn syrup (e.g. HFCS55, HFCS42, or HFCS90) or starch syrup, and at least one other carbohydrate;
128. at least one polyol, coupling sugars, and at least one other carbohydrate;
129. at least one polyol, soybean oligosaccharides, and at least one other carbohydrate;
130. at least one polyol, glucose syrup, and at least one other carbohydrate;
131. at least one carbohydrate and erythritol;
132. at least one carbohydrate and maltitol;
133. at least one carbohydrate and mannitol;
134. at least one carbohydrate and sorbitol;
135. at least one carbohydrate and lactitol;
136. at least one carbohydrate and xylitol;
137. at least one carbohydrate and isomalt;
138. at least one carbohydrate and propylene glycol;
139. at least one carbohydrate and glycerol;
140. at least one carbohydrate and reduced isomalto-oligosaccharides;
141. at least one carbohydrate and reduced xylo-oligosaccharides;
142. at least one carbohydrate and reduced gentio-oligosaccharides;
143. at least one carbohydrate and reduced maltose syrup;
144. at least one carbohydrate and reduced glucose syrup;
145. at least one carbohydrate, erythritol, and at least one other polyol;
146. at least one carbohydrate, maltitol, and at least one other polyol;
147. at least one carbohydrate, mannitol, and at least one other polyol;
148. at least one carbohydrate, sorbitol, and at least one other polyol;
149. at least one carbohydrate, lactitol, and at least one other polyol;
150. at least one carbohydrate, xylitol, and at least one other polyol;
151. at least one carbohydrate, isomalt and at least one other polyol;
152. at least one carbohydrate, propylene glycol, and at least one other polyol;
153. at least one carbohydrate, glycerol, and at least one other polyol;

154. at least one carbohydrate, reduced isomalto-oligosaccharides, and at least one other polyol;
155. at least one carbohydrate, reduced xylo-oligosaccharides, and at least one other polyol;
156. at least one carbohydrate, reduced gentio-oligosaccharides, and at least one other polyol;
157. at least one carbohydrate, reduced maltose syrup, and at least one other polyol; and
158. at least one carbohydrate, reduced glucose syrup, and at least one other polyol.

Other sweet taste improving composition combinations in accordance with embodiments of this invention include:

1. at least one carbohydrate and at least one amino acid;
2. at least one carbohydrate and at least one polyamino acid;
3. at least one carbohydrate and at least one sugar acid;
4. at least one carbohydrate and at least one nucleotide;
5. at least one carbohydrate and at least one organic acid;
6. at least one carbohydrate and at least one inorganic acid;
7. at least one carbohydrate and at least one bitter compound;
8. at least one carbohydrate and at least one flavorant or flavoring ingredient;
9. at least one carbohydrate and at least one polymer;
10. at least one carbohydrate and at least one protein or protein hydrolysate;
11. at least one carbohydrate and at least one surfactant;
12. at least one carbohydrate and at least one flavonoid;
13. at least one carbohydrate and at least one alcohol;
14. at least one carbohydrate and at least one protein or protein hydrolysate or mixture of low molecular weight amino acids;
15. at least one carbohydrate and at least one emulsifier;
16. at least one carbohydrate and at least one inorganic salt;
17. at least one carbohydrate, at least one amino acid, and at least one other sweet taste improving additive;
18. at least one carbohydrate, at least one polyamino acid, and at least one other sweet taste improving additive;
19. at least one carbohydrate, at least one sugar acid, and at least one other sweet taste improving additive;
20. at least one carbohydrate, at least one nucleotide, and at least one other sweet taste improving additive;
21. at least one carbohydrate, at least one organic acid, and at least one other sweet taste improving additive;
22. at least one carbohydrate, at least one inorganic acid, and at least one other sweet taste improving additive;
23. at least one carbohydrate, at least one bitter compound, and at least one other sweet taste improving additive;
24. at least one carbohydrate, at least one flavorant or flavoring ingredient, and at least one other sweet taste improving additive;
25. at least one carbohydrate, at least one polymer, and at least one other sweet taste improving additive;
26. at least one carbohydrate, at least one protein or protein hydrolysate, and at least one other sweet taste improving additive;
27. at least one carbohydrate, at least one surfactant, and at least one other sweet taste improving additive;
28. at least one carbohydrate, at least one flavonoid, and at least one other sweet taste improving additive;
29. at least one carbohydrate, at least one alcohol, and at least one other sweet taste improving additive;
30. at least one carbohydrate, at least one amino acid, and at least one polyamino acid;
31. at least one carbohydrate, at least one amino acid, at least one polyamino acid, and at least one sugar acid;
32. at least one carbohydrate, at least one amino acid, at least one polyamino acid, at least one sugar acid, and at least one nucleotide;
33. at least one carbohydrate, at least one amino acid, at least one polyamino acid, at least one sugar acid, at least one nucleotide, and at least one organic acid;
34. at least one carbohydrate, at least one amino acid, at least one polyamino acid, at least one sugar acid, at least one nucleotide, at least one organic acid, and at least one inorganic acid;
35. at least one carbohydrate, at least one amino acid, at least one polyamino acid, at least one sugar acid, at least one nucleotide, at least one organic acid, at least one inorganic acid, and at least one bitter compound;
36. at least one carbohydrate, at least one amino acid, at least one polyamino acid, at least one sugar acid, at least one nucleotide, at least one organic acid, at least one inorganic acid, at least one bitter compound, and at least one polymer;
37. at least one carbohydrate, at least one amino acid, at least one polyamino acid, at least one sugar acid, at least one nucleotide, at least one organic acid, at least one inorganic acid, at least one bitter compound, at least one polymer, and at least one protein or protein hydrolysate;
38. at least one carbohydrate, at least one amino acid, at least one polyamino acid, at least one sugar acid, at least one nucleotide, at least one organic acid, at least one inorganic acid, at least one hitter compound, at least one polymer, at least one protein or protein hydrolysate, and at least one surfactant;
39. at least one carbohydrate, at least one amino acid, at least one polyamino acid, at least one sugar acid, at least one nucleotide, at least one organic acid, at least one inorganic acid, at least one bitter compound, at least one polymer, at least one protein or protein hydrolysate, at least one surfactant, and at least one flavonoid;
40. at least one carbohydrate, at least one amino acid, at least one polyamino acid, at least one sugar acid, at least one nucleotide, at least one organic acid, at least one inorganic acid, at least one bitter compound, at least one polymer, at least one protein or protein hydrolysate, at least one surfactant, at least one flavonoid, and at least one alcohol;
41. at least one carbohydrate, at least one amino acid, and at least one sugar acid;
42. at least one carbohydrate, at least one amino acid, and at least one nucleotide;
43. at least one carbohydrate, at least one amino acid, and at least one organic acid;
44. at least one carbohydrate, at least one amino acid, and at least one inorganic acid;
45. at least one carbohydrate, at least one amino acid, and at least one bitter compound;
46. at least one carbohydrate, at least one amino acid, and at least one polymer;
47. at least one carbohydrate, at least one amino acid, and at least one protein or protein hydrolysate;
48. at least one carbohydrate, at least one amino acid, and at least one surfactant;
49. at least one carbohydrate, at least one amino acid, and at least one flavonoid;
50. at least one carbohydrate, at least one amino acid, and at least one alcohol;
51. at least one carbohydrate, at least one polyamino acid, and at least one sugar acid;
52. at least one carbohydrate, at least one polyamino acid, and at least one nucleotide;

53. at least one carbohydrate, at least one polyamino acid, and at least one organic acid;
54. at least one carbohydrate, at least one polyamino acid, and at least one inorganic acid;
55. at least one carbohydrate, at least one polyamino acid, and at least one bitter compound;
56. at least one carbohydrate, at least one polyamino acid, and at least one polymer;
57. at least one carbohydrate, at least one polyamino acid, and at least one protein or protein hydrolysate;
58. at least one carbohydrate, at least one polyamino acid, and at least one surfactant;
59. at least one carbohydrate, at least one polyamino acid, and at least one flavonoid;
60. at least one carbohydrate, at least one polyamino acid, and at least one alcohol;
61. at least one carbohydrate, at least one sugar acid, and at least one nucleotide;
62. at least one carbohydrate, at least one sugar acid, and at least one organic acid;
63. at least one carbohydrate, at least one sugar acid, and at least one inorganic acid;
64. at least one carbohydrate, at least one sugar acid, and at least one bitter compound;
65. at least one carbohydrate, at least one sugar acid, and at least one polymer;
66. at least one carbohydrate, at least one sugar acid, and at least one protein or protein hydrolysate;
67. at least one carbohydrate, at least one sugar acid, and at least one surfactant;
68. at least one carbohydrate, at least one sugar acid, and at least one flavonoid;
69. at least one carbohydrate, at least one sugar acid, and at least one alcohol;
70. at least one carbohydrate, at least one nucleotide, and at least one organic acid;
71. at least one carbohydrate, at least one nucleotide, and at least one inorganic acid;
72. at least one carbohydrate, at least one nucleotide, and at least one bitter compound;
73. at least one carbohydrate, at least one nucleotide, and at least one polymer;
74. at least one carbohydrate, at least one nucleotide, and at least one protein or protein hydrolysate;
75. at least one carbohydrate, at least one nucleotide, and at least one surfactant;
76. at least one carbohydrate, at least one nucleotide, and at least one flavonoid;
77. at least one carbohydrate, at least one nucleotide, and at least one alcohol;
78. at least one carbohydrate, at least one organic acid, and at least one inorganic acid;
79. at least one carbohydrate, at least one organic acid, and at least one bitter compound;
80. at least one carbohydrate, at least one organic acid, and at least one polymer;
81. at least one carbohydrate, at least one organic acid, and at least one protein or protein hydrolysate;
82. at least one carbohydrate, at least one organic acid, and at least one surfactant;
83. at least one carbohydrate, at least one organic acid, and at least one flavonoid;
84. at least one carbohydrate, at least one organic acid, and at least one alcohol;
85. at least one carbohydrate, at least one inorganic acid, and at least one bitter compound;
86. at least one carbohydrate, at least one inorganic acid, and at least one polymer;
87. at least one carbohydrate, at least one inorganic acid, and at least one protein or protein hydrolysate;
88. at least one carbohydrate, at least one inorganic acid, and at least one surfactant;
89. at least one carbohydrate, at least one inorganic acid, and at least one flavonoid;
90. at least one carbohydrate, at least one inorganic acid, and at least one alcohol;
91. at least one carbohydrate, at least one bitter compound, and at least one polymer;
92. at least one carbohydrate, at least one bitter compound, and at least one protein or protein hydrolysate;
93. at least one carbohydrate, at least one bitter compound, and at least one surfactant;
94. at least one carbohydrate, at least one bitter compound, and at least one flavonoid;
95. at least one carbohydrate, at least one bitter compound, and at least one alcohol;
96. at least one carbohydrate, at least one polymer, and at least one protein or protein hydrolysate;
97. at least one carbohydrate, at least one polymer, and at least one surfactant;
98. at least one carbohydrate, at least one polymer, and at least one flavonoid;
99. at least one carbohydrate, at least one polymer, and at least one alcohol;
100. at least one carbohydrate, at least one protein or protein hydrolysate, and at least one surfactant;
101. at least one carbohydrate, at least one protein or protein hydrolysate, and at least one flavonoid;
102. at least one carbohydrate, at least one surfactant, and at least one flavonoid;
103. at least one carbohydrate, at least one surfactant, and at least one alcohol;
104. at least one carbohydrate, at least one flavonoid, and at least one alcohol,
105. at least one sweet taste improving additive and D-tagatose;
106. at least one sweet taste improving additive and trehalose;
107. at least one sweet taste improving additive and D-galactose;
108. at least one sweet taste improving additive and rhamnose;
109. at least one sweet taste improving additive and dextrin;
110. at least one sweet taste improving additive and cyclodextrin;
111. at least one sweet taste improving additive and β-cyclodextrin;
112. at least one sweet taste improving additive and maltodextrin;
113. at least one sweet taste improving additive and dextran;
114. at least one sweet taste improving additive and sucrose;
115. at least one sweet taste improving additive and glucose;
116. at least one sweet taste improving additive and fructose;
117. at least one sweet taste improving additive and threose;
118. at least one sweet taste improving additive and arabinose;
119. at least one sweet taste improving additive and xylose;

120. at least one sweet taste improving additive and lyxose;
121. at least one sweet taste improving additive and allose;
122. at least one sweet taste improving additive and altrose;
123. at least one sweet taste improving additive and mannose;
124. at least one sweet taste improving additive and idose;
125. at least one sweet taste improving additive and talose;
126. at least one sweet taste improving additive and lactose;
127. at least one sweet taste improving additive and maltose;
128. at least one sweet taste improving additive and invert sugar;
129. at least one sweet taste improving additive and trehalose;
130. at least one sweet taste improving additive and isotrehalose;
131. at least one sweet taste improving additive and neotrehalose;
132. at least one sweet taste improving additive and isomaltulose;
133. at least one sweet taste improving additive and galactose;
134. at least one sweet taste improving additive and beet oligosaccharides;
135. at least one sweet taste improving additive and isomalto-oligosaccharides;
136. at least one sweet taste improving additive and isomaltose;
137. at least one sweet taste improving additive and isomaltotriose;
138. at least one sweet taste improving additive and panose;
139. at least one sweet taste improving additive and xylo-oligosaccharides;
140. at least one sweet taste improving additive and xylotriose;
141. at least one sweet taste improving additive and xylobiose;
142. at least one sweet taste improving additive and gentio-oligoscaccharides;
143. at least one sweet taste improving additive and gentiobiose;
144. at least one sweet taste improving additive and gentiotriose;
145. at least one sweet taste improving additive and gentiotetraose;
146. at least one sweet taste improving additive and sorbose;
147. at least one sweet taste improving additive and nigero-oligosaccharides;
148. at least one sweet taste improving additive and fucose;
149. at least one sweet taste improving additive and fructooligosaccharides;
150. at least one sweet taste improving additive and kestose;
151. at least one sweet taste improving additive and nystose;
152. at least one sweet taste improving additive and maltotetraol;
153. at least one sweet taste improving additive and maltotriol;
154. at least one sweet taste improving additive and malto-oligosaccharides;
155. at least one sweet taste improving additive and maltotriose;
156. at least one sweet taste improving additive and maltotetraose;
157. at least one sweet taste improving additive and maltopentaose;
158. at least one sweet taste improving additive and maltohexaose;
159. at least one sweet taste improving additive and maltoheptaose;
160. at least one sweet taste improving additive and lactulose;
161. at least one sweet taste improving additive and melibiose;
162. at least one sweet taste improving additive and raffinose;
163. at least one sweet taste improving additive and rhamnose;
164. at least one sweet taste improving additive and ribose;
165. at least one sweet taste improving additive and isomerized liquid sugars;
166. at least one sweet taste improving additive and high fructose corn syrup (e.g., HFCS55, HFCS42, or HFCS90) or starch syrup;
167. at least one sweet taste improving additive and coupling sugars;
168. at least one sweet taste improving additive and soybean oligosaccharides;
169. at least one sweet taste improving additive and glucose syrup;
170. at least one sweet taste improving additive, D-tagatose, and at least one other carbohydrate;
171. at least one sweet taste improving additive, trehalose, and at least one other carbohydrate;
172. at least one sweet taste improving additive, D-galactose, and at least one other carbohydrate;
173. at least one sweet taste improving additive, rhamnose, and at least one other carbohydrate;
174. at least one sweet taste improving additive, dextrin, and at least one other carbohydrate;
175. at least one sweet taste improving additive, cyclodextrin, and at least one other carbohydrate;
176. at least one sweet taste improving additive, β-cyclodextrin, and at least one other carbohydrate;
177. at least one sweet taste improving additive, maltodextrin, and at least one other carbohydrate;
178. at least one sweet taste improving additive, dextran, and at least one other carbohydrate;
179. at least one sweet taste improving additive, sucrose, and at least one other carbohydrate;
180. at least one sweet taste improving additive, glucose, and at least one other carbohydrate;
181. at least one sweet taste improving additive, fructose, and at least one other carbohydrate;
182. at least one sweet taste improving additive, threose, and at least one other carbohydrate;
183. at least one sweet taste improving additive, arabinose, and at least one other carbohydrate;
184. at least one sweet taste improving additive, xylose, and at least one other carbohydrate;
185. at least one sweet taste improving additive, lyxose, and at least one other carbohydrate;
186. at least one sweet taste improving additive, allose, and at least one other carbohydrate;
187. at least one sweet taste improving additive, altrose, and at least one other carbohydrate;
188. at least one sweet taste improving additive, mannose, and at least one other carbohydrate;

189. at least one sweet taste improving additive, idose, and at least one other carbohydrate;
190. at least one sweet taste improving additive, talose, and at least one other carbohydrate;
191. at least one sweet taste improving additive, lactose, and at least one other carbohydrate;
192. at least one sweet taste improving additive, maltose, and at least one other carbohydrate;
193. at least one sweet taste improving additive, invert sugar, and at least one other carbohydrate;
194. at least one sweet taste improving additive, trehalose, and at least one other carbohydrate;
195. at least one sweet taste improving additive, isotrehalose, and at least one other carbohydrate;
196. at least one sweet taste improving additive, neotrehalose, and at least one other carbohydrate;
197. at least one sweet taste improving additive, isomaltulose, and at least one other carbohydrate;
198. at least one sweet taste improving additive, galactose, and at least one other carbohydrate;
199. at least one sweet taste improving additive, beet oligosaccharides, and at least one other carbohydrate;
200. at least one sweet taste improving additive, isomaltooligosaccharides, and at least one other carbohydrate;
201. at least one sweet taste improving additive, isomaltose, and at least one other carbohydrate;
202. at least one sweet taste improving additive, isomaltotriose, and at least one other carbohydrate;
203. at least one sweet taste improving additive, panose, and at least one other carbohydrate;
204. at least one sweet taste improving additive, xylo-oligosaccharides, and at least one other carbohydrate;
205. at least one sweet taste improving additive, xylotriose, and at least one other carbohydrate;
206. at least one sweet taste improving additive, xylobiose, and at least one other carbohydrate;
207. at least one sweet taste improving additive, gentio-oligoscaccharides, and at least one other carbohydrate;
208. at least one sweet taste improving additive, gentiobiose, and at least one other carbohydrate;
209. at least one sweet taste improving additive, gentiotriose, and at least one other carbohydrate;
210. at least one sweet taste improving additive, gentiotetraose, and at least one other carbohydrate;
211. at least one sweet taste improving additive, sorbose, and at least one other carbohydrate;
212. at least one sweet taste improving additive, nigero-oligosaccharides, and at least one other carbohydrate;
213. at least one sweet taste improving additive, fucose, and at least one other carbohydrate;
214. at least one sweet taste improving additive, fructooligosaccharides, and at least one other carbohydrate;
215. at least one sweet taste improving additive, kestose, and at least one other carbohydrate;
216. at least one sweet taste improving additive, nystose, and at least one other carbohydrate;
217. at least one sweet taste improving additive, maltotetraol, and at least one other carbohydrate;
218. at least one sweet taste improving additive, maltotriol, and at least one other carbohydrate;
219. at least one sweet taste improving additive, malto-oligosaccharides, and at least one other carbohydrate;
220. at least one sweet taste improving additive, maltotriose, and at least one other carbohydrate;
221. at least one sweet taste improving additive, maltotetraose, and at least one other carbohydrate;
222. at least one sweet taste improving additive, maltopentaose, and at least one other carbohydrate;
223. at least one sweet taste improving additive, maltohexaose, and at least one other carbohydrate;
224. at least one sweet taste improving additive, maltoheptaose, and at least one other carbohydrate;
225. at least one sweet taste improving additive, lactulose, and at least one other carbohydrate;
226. at least one sweet taste improving additive, melibiose, and at least one other carbohydrate;
227. at least one sweet taste improving additive, raffinose, and at least one other carbohydrate;
228. at least one sweet taste improving additive, rhamnose, and at least one other carbohydrate;
229. at least one sweet taste improving additive, ribose, and at least one other carbohydrate;
230. at least one sweet taste improving additive, isomerized liquid sugars, and at least one other carbohydrate;
231. at least one sweet taste improving additive, high fructose corn syrup (e.g. HFCS55, HFCS42, or HFCS90) or starch syrup, and at least one other carbohydrate;
232. at least one sweet taste improving additive, coupling sugars, and at least one other carbohydrate;
233. at least one sweet taste improving additive, soybean oligosaccharides, and at least one other carbohydrate; and
234. at least one sweet taste improving additive, glucose syrup, and at least one other carbohydrate.

In another embodiment, the sweetener composition comprises a sweetness enhanced sweetener composition in combination with a plurality of sweet taste improving additives, in one embodiment 3 or more sweet taste improving additives, and in another embodiment 4 or more sweet taste improving additives, wherein each sweet taste improving additive is present in an amount such that no one sweet taste improving additive imparts a substantial off taste to the sweetness enhanced sweetener composition. In other words, the amounts of the sweet taste improving additives in the sweetness enhanced sweetener composition are balanced so that no one sweet taste improving additive imparts a substantial off taste to the sweetness enhanced sweetener composition.

According to a particular embodiment of this invention, the sweetness enhanced sweetener composition provided herein comprises at least one sweet taste improving composition in the sweetness enhanced sweetener composition in an amount effective for the sweetness enhanced sweetener composition to impart an osmolarity of at least 10 mOsmoles/L to an aqueous solution of the sweetness enhanced sweetener composition, when the sweetness enhanced sweetener composition is present in the aqueous solution in an amount sufficient to impart a maximum sweetness intensity equivalent to that of a 10% aqueous solution of sucrose by weight. As used herein, "mOsmoles/L" refers to milliosmoles per liter. As used herein, the maximum sweetness intensity is measured by combining the effective degree of sweetness of a sweetener in combination with a sweetness enhancer. According to another embodiment, the sweetness enhanced sweetener composition comprises at least one sweet taste improving composition in an amount effective for the sweetness enhanced sweetener composition to impart an osmolarity of 10 to 500 mOsmoles/L, 25 to 500 mOsmoles/L, 100 to 500 mOsmoles/L, 200 to 500 mOsmoles/L, or 300 to 500 mOsmoles/L to an aqueous solution of the sweetness enhanced sweetener composition, when the sweetness enhanced sweetener composition is present in the aqueous solution in an amount sufficient to impart a sweetness intensity equivalent to that of a 10% aqueous solution of sucrose by weight.

Wherein a plurality of sweet taste improving compositions are combined with a sweetness enhanced sweetener composition, the osmolarity and sweetness imparted is that of the total combination of the plurality of sweet taste improving compositions and sweetness enhanced sweetener.

Osmolarity refers to the measure of osmoles of solute per liter of solution, wherein osmole is equal to the number of moles of osmotically active particles in an ideal solution (e.g., a mole of glucose is one osmole), whereas a mole of sodium chloride is two osmoles (one mole of sodium and one mole of chloride). Thus, in order to improve in the quality of taste of the sweetness enhanced sweetener composition, the osmotically active compounds or the compounds which impart osmolarity must not introduce significant off taste to the formulation.

In one embodiment, suitable sweet taste improving carbohydrate additives for the present invention have a molecular weight less than or equal to 500 and in one embodiment have a molecular weight from 50 to 500. In particular embodiments, suitable carbohydrates with a molecular weight less than or equal to 500 include, but are not limited to, sucrose, fructose, glucose, maltose, lactose, mannose, galactose, and tagatose. Generally, in accordance with desirable embodiments of this invention, a sweet taste improving carbohydrate additive is present in the sweetener compositions in an amount from about 1,000 to about 100,000 ppm. (Throughout this specification, the term ppm means parts per million by weight or volume. For example, 500 ppm means 500 mg in a liter.) In accordance with other desirable embodiments of this invention, a sweet taste improving carbohydrate additive is present in the sweetened compositions in an amount from about 2,500 to about 50,000 ppm. In another embodiment, suitable sweet taste improving carbohydrate additives for imparting osmolarities ranging from about 10 mOsmoles/L to about 500 mOsmoles/L to a sweetenable composition include, but are not limited to, sweet taste improving carbohydrate additives with a molecular weight ranging from about 50 to about 500.

In one embodiment, suitable sweet taste improving polyol additives have a molecular weight less than or equal to 500 and in one embodiment have a molecular weight from 76 to 500. In particular embodiments, suitable sweet taste improving polyol additives with a molecular weight less than or equal to 500 include, but are not limited to, erythritol, glycerol, and propylene glycol. Generally, in accordance with desirable embodiments of this invention, a sweet taste improving polyol additive is present in the sweetener compositions in an amount from about 100 ppm to about 80,000 ppm. In accordance with other desirable embodiments of this invention, a sweet taste improving polyol additive is present in sweetened compositions in an amount from about 400 to about 80,000 ppm. In a sub-embodiment, suitable sweet taste improving polyol additives for imparting osmolarities ranging from about 10 mOsmoles/L to about 500 mOsmoles/L to a sweetenable composition include, but are not limited to, sweet taste improving polyol additives with a molecular weight ranging from about 76 to about 500.

In accordance with still other desirable embodiments of this invention, a sweet taste improving polyol additive is present in sweetener compositions in an amount from about 400 to about 80,000 ppm of the total sweetener composition, more particularly from about 5,000 to about 60,000 ppm, and still more particularly from about 10,000 to about 50,000 ppm.

Generally, in accordance with another embodiment of this invention, a suitable sweet taste improving alcohol additive is present in the sweetener compositions in an amount from about 625 to about 10,000 ppm. In another embodiment, suitable sweet taste improving alcohol additives for imparting osmolarities ranging from about 10 mOsmoles/L to about 500 mOsmoles/L to a sweetenable composition include, but are not limited to, sweet taste improving alcohol additives with a molecular weight ranging from about 46 to about 500. A non-limiting example of sweet taste improving alcohol additive with a molecular weight ranging from about 46 to about 500 includes ethanol.

In one embodiment, suitable sweet taste improving amino acid additives have a molecular weight of less than or equal to 250 and in one embodiment have a molecular weight from 75 to 250. In particular embodiments, suitable sweet taste improving amino acid additives with a molecular weight less than or equal to 250 include, but are not limited to, glycine, alanine, serine, valine, leucine, isoleucine, proline, hydroxyproline, theanine, and threonine. In particular embodiments sweet taste improving amino acid additives include those which are sweet tasting at high concentrations, but are present in embodiments of this invention at amounts below or above their sweetness detection thresholds. In more particular embodiments are mixtures of sweet taste improving amino acid additives at amounts below or above their sweetness detection thresholds. Generally, in accordance with desirable embodiments of this invention, a sweet taste improving amino acid additive is present in the sweetener compositions in an amount from about 100 ppm to about 25,000 ppm, more particularly from about 1,000 to about 10,000 ppm, and still more particularly from about 2,500 to about 5,000 ppm. In accordance with other desirable embodiments of this invention, a sweet taste improving amino acid additive is present in the sweetened compositions in an amount from about 250 ppm to about 7,500 ppm. In a sub-embodiment, suitable sweet taste improving amino acid additives for imparting osmolarities ranging from about 10 mOsmoles/L to about 500 mOsmoles/L to a sweetenable composition include, but are not limited to, sweet taste improving amino acid additives with a molecular weight ranging from about 75 to about 250.

Generally, in accordance with yet another embodiment of this invention, a suitable sweet taste improving amino acid salt additive is present in the sweetener composition in an amount from about 25 to about 10,000 ppm, more particularly from about 1,000 to about 7,500 ppm, and still more particularly from about 2,500 to about 5,000 ppm. In another embodiment, suitable sweet taste improving amino acid salt additives for imparting osmolarities ranging from about 10 mOsmoles/L to about 500 mOsmoles/L to a sweetenable composition include, but are not limited to, sweet taste improving amino acid salt additives with a molecular weight ranging from about 75 to about 300. Non-limiting examples of sweet taste improving amino acid salt additives with a molecular weight ranging from about 75 to about 300 include salts of glycine, alanine, serine, theanine, and threonine.

Generally, in accordance with still another embodiment of this invention, a suitable sweet taste improving protein or protein hydrolysate additive is present in the sweetener composition in an amount from about 200 to about 50,000 ppm. In another embodiment, suitable sweet taste improving protein or protein hydrolysate additives for imparting osmolarities ranging from about 10 mOsmoles/L to about 500 mOsmoles/L to a sweetenable composition include, but are not limited to, sweet taste improving protein or protein hydrolysate additives with a molecular weight ranging from about 75 to about 300. Non-limiting examples of sweet taste improving protein or protein hydrolysate additives with a molecular weight ranging from about 75 to about 300 include proteins or protein hydrolysates containing glycine, alanine, serine, and threonine.

Generally, in accordance with another embodiment of this invention, a suitable sweet taste improving inorganic acid additive is present in the sweetener composition in an amount from about 25 to about 5,000 ppm. In another embodiment, suitable sweet taste improving inorganic acid additives for imparting osmolarities ranging from about 10 mOsmoles/L to about 500 mOsmoles/L to a sweetenable composition include, but are not limited to, phosphoric acid, HCl, and $H_2SO_4$ and any other inorganic acid additives which are safe for human or animal consumption when used in a generally acceptable range. In a sub-embodiment, suitable sweet taste improving inorganic acid additives for imparting osmolarities ranging from about 10 mOsmoles/L to about 500 mOsmoles/L to a sweetenable composition include, but are not limited to, sweet taste improving inorganic acid additives with a molecular weight range from about 36 to about 98.

Generally, in accordance with still another embodiment of this invention, a suitable sweet taste improving inorganic acid salt additive is present in the sweetener composition in an amount from about 25 to about 5,000 ppm. In another embodiment, suitable sweet taste improving inorganic acid salt additives for imparting osmolarities ranging from about 10 mOsmoles/L to about 500 mOsmoles/L to a sweetenable composition include, but are not limited to, salts of inorganic acids, for example sodium, potassium, calcium, and magnesium salts of phosphoric acid or hydrochloric acid, and any other alkali or alkaline earth metal salts of other inorganic acids (e.g., sodium bisulfate) which are safe for human or animal consumption when used in a generally acceptable range. In a sub-embodiment, suitable suitable sweet taste improving inorganic acid salt additives for imparting osmolarities ranging from about 10 mOsmoles/L to about 500 mOsmoles/L to a sweetenable composition include, but are not limited to, sweet taste improving inorganic acid salt additives with a molecular weight range from about 58 to about 120.

Generally, in accordance with still another embodiment of this invention, a suitable sweet taste improving organic acid additive is present in the sweetener composition in an amount from about 10 to about 5,000 ppm, In another embodiment, suitable sweet taste improving organic acid additives for imparting osmolarities ranging from about 10 mOsmoles/L to about 500 mOsmoles/L to a sweetenable composition include, but are not limited to, creatine, citric acid, malic acid, succinic acid, hydroxycitric acid, tartaric acid, fumaric acid, maleic acid, gluconic acid, glutaric acid, adipic acid, and any other sweet taste improving organic acid additives which are safe for human or animal consumption when used in a generally acceptable range. In one embodiment, the sweet taste improving organic acid additive comprises a molecular weight range from about 60 to about 208.

Generally, in accordance with still another embodiment of this invention, a suitable sweet taste improving organic acid salt additive is present in the sweetener composition in an amount from about 20 to about 10,000 ppm. In another embodiment, suitable sweet taste improving organic acid salt additives for imparting osmolarities ranging from about 10 mOsmoles/L to about 500 mOsmoles/L to a sweetenable composition include, but are not limited to, salts of sweet taste improving organic acid additives, such as sodium, potassium, calcium, magnesium, and other alkali or alkaline metal salts of citric acid, malic acid, tartaric acid, fumaric acid, maleic acid, gluconic acid, glutaric acid, adipic acid, hydroxycitric acid, succinic acid, and salts of any other sweet taste improving organic acid additives which are safe for human or animal consumption when used in a generally acceptable range. In one embodiment, the sweet taste improving organic acid salt additive comprises a molecular weight range from about 140 to about 208.

Generally, in accordance with yet another embodiment of this invention, a suitable sweet taste improving organic base salt additive is present in the sweetener composition in an amount from about 10 to about 5,000 ppm. In another embodiment, suitable sweet taste improving organic base salt additives for imparting osmolarities ranging from about 10 mOsmoles/L to about 500 mOsmoles/L to a sweetenable composition include, but are not limited to, inorganic and organic acid salts of organic bases such as glucosamine salts, choline salts, and guanidine salts.

Generally, in accordance with yet another embodiment of this invention, a suitable sweet taste improving astringent additive is present in the sweetener composition in an amount from about 25 to about 1,000 ppm. In another embodiment, suitable sweet taste improving astringent additives for imparting osmolarities ranging from about 10 mOsmoles/L to about 500 mOsmoles/L to a sweetenable composition include, but are not limited to, tannic acid, tea polyphenols, catechins, $Al_2(SO_4)_3$, $AlNa(SO_4)_2$, $AlK(SO_4)_2$ and other forms of alum.

Generally, in accordance with yet another embodiment of this invention, a suitable sweet taste improving nucleotide additive is present in the sweetener composition in an amount from about 5 to about 1,000 ppm. In another embodiment, suitable sweet taste improving nucleotide additives for imparting osmolarities ranging from about 10 mOsmoles/L to about 500 mOsmoles/L to a sweetenable composition include, but are not limited to, adenosine monophosphate.

Generally, in accordance with yet another embodiment of this invention, a suitable sweet taste improving polyamino acid additive is present in the sweetener composition in an amount from about 30 to about 2,000 ppm. In another embodiment, suitable sweet taste improving polyamino acid additives for imparting osmolarities ranging from about 10 mOsmoles/L to about 500 mOsmoles/L to a sweetenable composition include, but are not limited to, poly-L-lysine (e.g., poly-L-α-lysine or poly-L-γ-lysine), poly-L-ornithine (e.g., poly-L-α-ornithine or poly-L-γ-ornithine), and poly-L-arginine.

Generally, in accordance with yet another embodiment of this invention, a suitable sweet taste improving polymer additive is present in the sweetener composition in an amount from about 30 to about 2,000 ppm. In another embodiment, suitable sweet taste improving polymer additives for imparting osmolarities ranging from about 10 mOsmoles/L to about 500 mOsmoles/L to a sweetenable composition include, but are not limited to, chitosan, sodium hexametaphosphate and its salts, pectin, hydrocolloids such as gum acacia senegal, propylene glycol, polyethylene glycol, and poly(ethylene glycol methyl ether).

Generally, in accordance with yet another embodiment of this invention, a suitable sweet taste improving surfactant additive is present in the sweetener composition in an amount from about 1 to about 5,000 ppm. In another embodiment, suitable sweet taste improving surfactant additives for imparting osmolarities ranging from about 10 mOsmoles/L to about 500 mOsmoles/L to a sweetenable composition include, but are not limited to, polysorbates, choline chloride, sodium taurocholate, lecithins, sucrose oleate esters, sucrose stearate esters, sucrose palmitate esters, and sucrose laurate esters.

Generally, in accordance with yet another embodiment of this invention, a suitable sweet taste improving flavonoid additive is present in the sweetener compositions in an amount from about 0.1 to about 1,000 ppm. In another embodiment, suitable sweet taste improving flavonoid additives for imparting osmolarities ranging from about 10 mOsmoles/L to about 500 mOsmoles/L to a sweetenable composition include, but are not limited to, naringin, catechins, rutins, and neohesperidin.

In a particular embodiment, non-limiting examples of high osmolarity enabled sweet taste improving compositions for improving sweetness quality include sweet taste improving carbohydrate additives, sweet taste improving alcohol additives, sweet taste improving polyol additives, sweet taste improving amino acid additives, sweet taste improving amino acid salt additives, sweet taste improving inorganic acid salt additives, sweet taste improving polymer additives, and sweet taste improving protein or protein hydrolysate additives.

In another embodiment, suitable high osmolarity enabled sweet taste improving carbohydrate additives for improving the sweetness quality, but are not limited to, sweet taste improving carbohydrate additives with a molecular weight ranging from about 50 to about 500. Non-limiting examples of sweet taste improving carbohydrate additives with a molecular weight ranging from about 50 to about 500 include sucrose, fructose, glucose, maltose, lactose, mannose, galactose, ribose, rhamnose, trehalose, HFCS, and tagatose.

In another embodiment, suitable high osmolarity enabled sweet taste improving polyol additives for improving the sweetness quality include, but are not limited to, sweet taste improving polyol additives with a molecular weight ranging from about 76 to about 500. Non-limiting examples of sweet taste improving polyol additives with a molecular weight ranging from about 76 to about 500 include erythritol, glycerol, and propylene glycol. In a sub-embodiment, other suitable sweet taste improving polyol additives include sugar alcohols.

In another embodiment, suitable high osmolarity enabled sweet taste improving alcohol additives for improving the sweetness quality include, but are not limited to, sweet taste improving alcohol additives with a molecular weight ranging from about 46 to about 500. A non-limiting example of sweet taste improving alcohol additive with a molecular weight ranging from about 46 to about 500 includes ethanol.

In another embodiment, suitable high osmolarity enabled sweet taste improving amino acid additives for improving the sweetness quality include, but are not limited to, sweet taste improving amino acid additives with a molecular weight ranging from about 75 to about 250. Non-limiting examples of sweet taste improving amino acid additives with a molecular weight ranging from about 75 to about 250 include glycine, alanine, serine, leucine, valine, isoleucine, proline, hydroxyproline, glutamine, theanine, and threonine.

In another embodiment, suitable high osmolarity enabled sweet taste improving amino acid salt additives for improving the sweetness quality include, but are not limited to, sweet taste improving amino acid salt additives with a molecular weight ranging from about 75 to about 300. Non-limiting examples of sweet taste improving amino acid salt additives with a molecular weight ranging from about 75 to about 300 include salts of glycine, alanine, serine, leucine, valine, isoleucine, proline, hydroxyproline, glutamine, theanine, and threonine.

In another embodiment, suitable high osmolarity enabled sweet taste improving protein or protein hydrolysate additives for improving the sweetness quality include, but are not limited to, sweet taste improving protein or protein hydrolysate additives. Non-limiting examples of sweet taste improving protein or protein hydrolysate additives include protein or protein hydrolysates containing glycine, alanine, serine, leucine, valine, isoleucine, proline, and threonine.

In another embodiment, suitable high osmolarity enabled sweet taste improving inorganic acid salt additives for improving the sweetness quality include, but are not limited to, sodium chloride, potassium chloride, magnesium chloride, potassium phosphate and sodium phosphate. Suitable sweet taste improving inorganic acid salt additives for increasing osmolarity may comprise a molecular weight from about 58 to about 120.

In another embodiment, suitable high osmolarity enabled sweet taste improving bitter additives for improving the sweetness quality include, but are not limited to, caffeine, quinine, urea, quassia, tannic acid, and naringin.

In one embodiment, a sweetener composition is provided comprising at least one sweetness enhancer and at least one sweetener in combination with at least one sweet taste improving nucleotide additive chosen from inosine monophosphate (IMP), guanosine monophosphate (GMP), adenosine monophosphate (AMP), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, nucleosides thereof nucleic acid bases thereof, or salts thereof.

In one embodiment, a sweetener composition is provided comprising at least one sweetness enhancer and at least one sweetener in combination with at least one sweet taste improving carbohydrate additive chosen from tagatose, trehalose, galactose, rhamnose, cyclodextrin (e.g., α-cyclodextrin, β-cyclodextrin, and γ-cyclodextrin), maltodextrin (including resistant maltodextrins such as Fibersol-2™), dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, glucono-lactone, abequose, galactosamine, beet oligosaccharides, isomalto-oligosaccharides, isomalto-oligosaccharides (isomaltose, isomaltotriose, panose and the like), xylo-oligosaccharides (xylotriose, xylobiose and the like), gentio-oligoscaccharides (gentiobiose, gentiotriose, gentiotetraose and the like), sorbose, nigero-oligosaccharides, fucose, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, or glucose syrup.

In another embodiment, a sweetener composition is provided comprising at least one sweetness enhancer and at least one sweetener in combination with at least one sweet taste improving polyol additive chosen from erythritol, maltitol, mannitol, sorbitol, lactitol, xylitol, inositol, isomalt, propylene glycol, glycerol (glycerine), threitol, galactitol, reduced isomalto-oligosaccharides, reduced xylo-oligosaccharides, reduced gentio-oligosaccharides, reduced maltose syrup, or reduced glucose syrup.

In another embodiment, a sweetener composition is provided comprising at least one sweetness enhancer and at least one sweetener in combination with at least one sweet taste improving amino acid additive chosen from aspartic acid, arginine, glycine, glutamic acid, proline, threonine, theanine, cysteine, cystine, alanine, valine, tyrosine, leucine, isoleucine, asparagine, serine, lysine, histidine, ornithine, methionine, carnitine, aminobutyric acid (alpha-, beta-, and gamma-isomers), glutamine, hydroxyproline, taurine, norvaline, sarcosine, or salts thereof.

In another embodiment, a sweetener composition is provided comprising at least one sweetness enhancer and at least one sweetener in combination with at least one sweet taste improving polyamino acid additive chosen from poly-L-aspartic acid, poly-L-lysine (e.g., poly-L-α-lysine or poly-L-ϵ-lysine), poly-L-ornithine (e.g., poly-L-α-ornithine or poly-L-γ-ornithine), poly-L-arginine, other polymeric forms of amino acids, or salts thereof.

In another embodiment, a sweetener composition is provided comprising at least one sweetness enhancer and at least one sweetener in combination with at least one sweet taste improving sugar acid additive chosen from aldonic, uronic, aldaric, alginic, gluconic, glucuronic, glucaric, galactaric, galacturonic, or salts thereof.

In another embodiment, a sweetener composition is provided comprising at least one sweetness enhancer and at least one sweetener in combination with at least one sweet taste improving organic acid additive chosen from C2-C30 carboxylic acids, substituted hydroxyl C1-C30 carboxylic acids, benzoic acid, substituted benzoic acids (e.g., 2,4-dihydroxybenzoic acid), substituted cinnamic acids, hydroxyacids, substituted hydroxybenzoic acids, substituted cyclohexyl carboxylic acids, tannic acid, lactic acid, tartaric acid, citric acid, gluconic acid, glucoheptonic acids, glutaric acid, creatine, adipic acid, hydroxycitric acid, malic acid, fruitaric acid, fumaric acid, maleic acid, succinic acid, chlorogenic acid, salicylic acid, caffeic acid, bile acids, acetic acid, ascorbic acid, alginic acid, erythorbic acid, polyglutamic acid, or salts thereof.

In another embodiment, a sweetener composition is provided comprising at least one sweetness enhancer and at least one sweetener in combination with at least one sweet taste improving inorganic acid additive chosen from phosphoric acid, phosphorous acid, polyphosphoric acid, hydrochloric acid, sulfuric acid, carbonic acid, sodium dihydrogen phosphate, or salts thereof.

In another embodiment, a sweetener composition is provided comprising at least one sweetness enhancer and at least one sweetener in combination with at least one sweet taste improving bitter compound additive chosen from caffeine, quinine, urea, bitter orange oil, naringin, quassia, or salts thereof.

In another embodiment, a sweetener composition is provided comprising at least one sweetness enhancer and at least one sweetener in combination with at least one sweet taste improving flavorant additive chosen from vanillin, vanilla extract, mango extract, cinnamon, citrus, coconut, ginger, viridiflorol, almond, menthol, grape skin extract, or grape seed extract. In another particular embodiment, the at least one sweet taste improving flavorant additive comprises a proprietary sweetener chosen from Döhler™ Natural Flavoring Sweetness Enhancer K14323 (Döhler™, Darmstadt, Germany), Symrise™ Natural Flavor Mask for Sweeteners 161453 or 164126 (Symrise™, Holzminden, Germany), Natural Advantage™ Bitterness Blockers 1, 2, 9 or 10 (Natural Advantage™, Freehold, N.J., U.S.A.), or Sucramask™ (Creative Research Management, Stockton, Calif., U.S.A.)

In another embodiment, a sweetener composition is provided comprising at least one sweetness enhancer and at least one sweetener in combination with at least one sweet taste improving polymer additive chosen from chitosan, pectin, pectic, pectinic, polyuronic, polygalacturonic acid, starch, food hydrocolloid or crude extracts thereof (e.g., gum acacia senegal, gum acacia seyal, carageenan), poly-L-lysine (e.g., poly-L-α-lysine or poly-L-ϵ-lysine), poly-L-ornithine (e.g., poly-L-α-ornithine or poly-L-γ-ornithine), polypropylene glycol, polyethylene glycol, poly(ethylene glycol methyl ether), polyarginine, polyaspartic acid, polyglutamic acid, polyethyleneimine, alginic acid, sodium alginate, propylene glycol alginate, sodium polyethyleneglycolalginate, sodium hexametaphosphate and its salts, or other cationic and anionic polymers.

In another embodiment, a sweetener composition is provided comprising at least one sweetness enhancer and at least one sweetener in combination with at least one sweet taste improving protein hydrolysate additive chosen from bovine serum albumin (BSA), whey protein (including fractions or concentrates thereof such as 90% instant whey protein isolate, 34% whey protein, 50% hydrolyzed whey protein, and 80% whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, theanine, asparagine, glutamine, arginine, valine, isoleucine, leucine, norvaline, methionine, proline, tyrosine, hydroxyproline, or the like).

In another embodiment, a sweetener composition is provided comprising at least one sweetness enhancer and at least one sweetener in combination with at least one sweet taste improving surfactant additive chosen from polysorbates (e.g., polyoxyethylene sorbitan monooleate (polysorbate 80), polysorbate 20, polysorbate 60), sodium dodecylbenzenesulfonate, dioctyl sulfosuccinate or dioctyl sulfosuccinate sodium, sodium dodecyl sulfate, cetylpyridinium chloride, hexadecyltrimethylammonium bromide, sodium cholate, carbamoyl, choline chloride, sodium glycocholate, sodium taurocholate, sodium taurodeoxycholate, lauric arginate, sodium stearoyl lactylate, lecithins, sucrose oleate esters, sucrose stearate esters, sucrose palmitate esters, sucrose laurate esters, and other emulsifiers, or the like.

In another embodiment, a sweetener composition is provided comprising at least one sweetness enhancer and at least one sweetener in combination with at least one sweet taste improving flavonoid additive chosen from catechins, polyphenols, rutins, neohesperidin, naringin, or the like.

In another embodiment, a sweetener composition is provided comprising at least one sweetness enhancer and at least one sweetener in combination with ethanol.

In another embodiment, a sweetener composition is provided comprising at least one sweetness enhancer and at least one sweetener in combination with at least one sweet taste improving astringent compound additive chosen from tannic acid, europium chloride ($EuCl_3$), gadolinium chloride ($GdCl_3$), terbium chloride ($TbCl_3$), alum, tannic acid, and polyphenols (e.g., tea polyphenol).

In another embodiment, a sweetener composition is provided comprising at least one sweetness enhancer and at least one sweetener in combination with at least one sweet taste improving inorganic salt additive chosen from sodium chloride, potassium chloride, sodium dihydrogen phosphate, sodium sulfate, potassium citrate, europium chloride ($EuCl_3$), gadolinium chloride ($GdCl_3$), terbium chloride ($TbCl_3$), magnesium sulfate, magnesium phosphate, alum, magnesium chloride, mono-, di-, tri-basic sodium or potassium salts of phosphoric acid, salts of hydrochloric acid, sodium carbonate, sodium bisulfate, or sodium bicarbonate.

In another embodiment, a sweetener composition is provided comprising at least one sweetness enhancer and at least one sweetener in combination with at least one sweet taste improving organic salt additive chosen from choline chloride, gluconic acid sodium salt, gluconic acid potassium salt, guanidine HCl, glucosamine HCl, monosodium glutamate (MSG), adenosine monophosphate salt, magnesium gluconate, potassium tartrate, and sodium tartrate.

In another embodiment, a sweetener composition is provided comprising at least one sweetness enhancer and at least one sweetener in combination with at least one sweet taste improving nucleotide additive, at least one sweet taste improving carbohydrate additive, and at least one sweet taste improving amino acid additive; wherein the at least one nucleotide additive is chosen from inosine monophosphate (IMP), guanosine monophosphate (GMP), adenosine monophosphate (AMP), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, nucleosides thereof, nucleic acid bases thereof, or salts thereof; wherein the at least one carbohydrate additive is chosen from tagatose, trehalose, galactose, rhamnose, cyclodextrin (e.g., α-cyclodextrin, β-cyclodextrin, and γ-cyclodextrin), maltodextrin (including resistant maltodextrins such as Fibersol-2™), dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, gluconolactone, abequose, galactosamine, beet oligosaccharides, isomalto-oligosaccharides (isomaltose, isomaltotriose, panose and the like), xylo-oligosaccharides (xylotriose, xylobiose and the like), gentio-oligosaccharides (gentiobiose, gentiotriose, gentiotetraose and the like), sorbose, nigero-oligosaccharides, fucose, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, or glucose syrup; and wherein the at least one amino acid additive is chosen from aspartic acid, arginine, glycine, glutamic acid, proline, threonine, theanine, cysteine, cystine, alanine, valine, tyrosine, leucine, isoleucine, asparagine, serine, lysine, histidine, ornithine, methionine, carnitine, aminobutyric acid (alpha-, beta-, and gamma-isomers), glutamine, hydroxyproline, taurine, norvaline, sarcosine, or salts thereof.

In another embodiment, a sweetener composition is provided comprising at least one sweetness enhancer and at least one sweetener in combination with at least one sweet taste improving nucleotide additive and at least one sweet taste improving carbohydrate additive; wherein the at least one nucleotide additive is chosen from inosine monophosphate (IMP), guanosine monophosphate (GMP), adenosine monophosphate (AMP), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, nucleosides thereof, nucleic acid bases thereof, or salts thereof; and wherein the at least one carbohydrate additive is chosen from tagatose, trehalose, galactose, rhamnose, cyclodextrin (e.g., α-cyclodextrin, β-cyclodextrin, and γ-cyclodextrin), maltodextrin (including resistant maltodextrins such as Fibersol-2™), dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, gluconolactone, abequose, galactosamine, beet oligosaccharides, isomalto-oligosaccharides (isomaltose, isomaltotriose, panose and the like), xylo-oligosaccharides (xylotriose, xylobiose and the like), gentio-oligosaccharides (gentiobiose, gentiotriose, genetiotetraose and the like), sorbose, nigero-oligosaccharides, fucose, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, or glucose syrup.

In another embodiment, a sweetener composition is provided comprising at least one sweetness enhancer and at least one sweetener in combination with at least one sweet taste improving nucleotide additive and at least one sweet taste improving polyol additive; wherein the at least one nucleotide additive is chosen from inosine monophosphate (IMP), guanosine monophosphate (GMP), adenosine monophosphate (AMP), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, nucleosides thereof, nucleic acid bases thereof, or salts thereof; and wherein the at least one polyol additive is chosen from erythritol, maltitol, mannitol, sorbitol, lactitol, xylitol, inositol, isomalt, propylene glycol, glycerol (glycerine), threitol, galactitol, reduced isomalto-oligosaccharides, reduced xylo-oligosaccharides, reduced gentio-oligosaccharides, reduced maltose syrup, or reduced glucose syrup.

In another embodiment, a sweetener composition is provided comprising at least one sweetness enhancer and at least one sweetener in combination with at least one sweet taste improving nucleotide additive and at least one sweet taste improving amino acid; wherein the at least one nucleotide additive is chosen from inosine monophosphate (IMP), guanosine monophosphate (GMP), adenosine monophosphate (AMP), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, nucleosides thereof, nucleic acid bases thereof, or salts thereof; and wherein the at least one amino acid additive is chosen from aspartic acid, arginine, glycine, glutamic acid, proline, threonine, theanine, cysteine, cystine, alanine, valine, tyrosine, leucine, isoleucine, asparagine, serine, lysine, histidine, ornithine, methionine, carnitine, aminobutyric acid (alpha-, beta-, and gamma-isomers), glutamine, hydroxyproline, taurine, norvaline, sarcosine, or salts thereof.

In another embodiment, a sweetener composition is provided comprising at least one sweetness enhancer and at least one sweetener in combination with at least one sweet taste improving carbohydrate additive, at least one sweet taste improving polyol additive, and at least one sweet taste improving amino acid additive; wherein the at least one carbohydrate additive is chosen from tagatose, trehalose, galactose, rhamnose, cyclodextrin (e.g., α-cyclodextrin, β-cyclodextrin, and γ-cyclodextrin), maltodextrin (including resistant maltodextrins such as Fibersol-2™), dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, glucono-lactone, abequose, galactosamine, beet oligosaccharides, isomalto-oligosaccharides (isomaltose, isomaltotriose, panose and the like), xylo-oligosaccharides (xylotriose, xylobiose and the like), gentio-oligoscaccharides (gentiobiose, gentiotriose, gentiotetraose and the like), sorbose, nigero-oligosaccharides, fucose, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, or glucose syrup; wherein the at least one polyol additive is chosen from erythritol, maltitol, mannitol, sorbitol, lactitol, xylitol, inositol, isomalt, propylene glycol, glycerol (glycerine), threitol, galactitol, reduced isomalto-oligosaccharides, reduced xylo-oligosaccharides, reduced gentio-oligosaccharides, reduced maltose syrup, or reduced glucose syrup; and wherein the at least one amino acid additive is chosen from aspartic acid, arginine, glycine, glutamic acid, proline, threonine, theanine, cysteine, cystine, alanine, valine, tyrosine, leucine, isoleucine, asparagine, serine, lysine, histidine, ornithine, methionine, carnitine, aminobutyric acid (alpha-, beta-, and gamma-isomers), glutamine, hydroxyproline, taurine, norvaline, sarcosine, or salts thereof.

In another embodiment, a sweetener composition is provided comprising at least one sweetness enhancer and at least one sweetener in combination with at least one sweet taste improving carbohydrate additive and at least one sweet taste improving polyol additive; wherein the at least one carbohydrate additive is chosen from tagatose, trehalose, galactose, rhamnose, cyclodextrin (e.g., α-cyclodextrin, β-cyclodextrin, and γ-cyclodextrin), maltodextrin (including resistant maltodextrins such as Fibersol-2™), dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, glucono-lactone, abequose, galactosamine, beet oligosaccharides, isomalto-oligosaccharides (isomaltose, isomaltotriose, panose and the like), xylo-oligosaccharides (xylotriose, xylobiose and the like), gentio-oligosaccharides (gentiobiose, gentiotriose, gentiotetraose and the like), sorbose, nigero-oligosaccharides, fucose, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, or glucose syrup; and wherein the at least one polyol additive is chosen from erythritol, maltitol, mannitol, sorbitol, lactitol, xylitol, inositol, isomalt, propylene glycol, glycerol (glycerine), threitol, galactitol, reduced iso-malto-oligosaccharides, reduced xylo-oligosaccharides, reduced gentio-oligosaccharides, reduced maltose syrup, or reduced glucose syrup.

In another embodiment, a sweetener composition is provided comprising at least one sweetness enhancer and at least one sweetener in combination with at least one sweet taste improving carbohydrate additive and at least one sweet taste improving amino acid additive; wherein the at least one carbohydrate additive is chosen from tagatose, trehalose, galactose, rhamnose, cyclodextrin (e.g., α-cyclodextrin, β-cyclodextrin, and γ-cyclodextrin), maltodextrin (including resistant maltodextrins such as Fibersol-2™), dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, glucono-lactone, abequose, galactosamine, beet oligosaccharides, isomalto-oligosaccharides (isomaltose, isomaltotriose, panose and the like), xylo-oligosaccharides (xylotriose, xylobiose and the like), gentio-oligoscaccharides (gentiobiose, gentiotriose, gentiotetraose and the like), sorbose, nigero-oligosaccharides, fucose, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, or glucose syrup; and wherein the at least one amino acid additive is chosen from aspartic acid, arginine, glycine, glutamic acid, proline, threonine, theanine, cysteine, cystine, alanine, valine, tyrosine, leucine, isoleucine, asparagine, serine, lysine, histidine, ornithine, methionine, carnitine, aminobutyric acid (alpha-, beta-, and gamma-isomers), glutamine, hydroxyproline, taurine, norvaline, sarcosine, or salts thereof.

In another embodiment, a sweetener composition is provided comprising at least one sweetness enhancer and at least one sweetener in combination with at least one sweet taste improving polyol additive and at least one sweet taste improving amino acid additive; wherein the at least one polyol additive is chosen from erythritol, maltitol, mannitol, sorbitol, lactitol, xylitol, inositol, isomalt, propylene glycol, glycerol (glycerin), threitol, galactitol, reduced isomalto-oligosaccharides, reduced xylo-oligosaccharides, reduced gentio-oligosaccharides, reduced maltose syrup, or reduced glucose syrup; and wherein the at least one amino acid additive is chosen from aspartic acid, arginine, glycine, glutamic acid, proline, threonine, theanine, cysteine, cystine, alanine, valine, tyrosine, leucine, isoleucine, asparagine, serine, lysine, histidine, ornithine, methionine, carnitine, aminobutyric acid (alpha-, beta-, and gamma-isomers), glutamine, hydroxyproline, taurine, norvaline, sarcosine, or salts thereof.

In another embodiment, a sweetener composition is provided comprising at least one sweetness enhancer and at least one sweetener in combination with at least one sweet taste improving polyol additive and at least one sweet taste improving inorganic salt additive; wherein the at least one polyol additive is chosen from erythritol, maltitol, mannitol, sorbitol, lactitol, xylitol, inositol, isomalt, propylene glycol, glycerol (glycerin), threitol, galactitol, reduced isomalto-oligosaccharides, reduced xylo-oligosaccharides, reduced gentio-oligosaccharides, reduced maltose syrup, or reduced glucose syrup; and wherein the at least one inorganic salt additive is chosen from sodium chloride, sodium dihydrogen phosphate, sodium sulfate, potassium citrate, europium chloride (EuCl$_3$), gadolinium chloride (GdCl$_3$), terbium chloride (TbCl$_3$), magnesium sulfate, alum, magnesium chloride, potassium chloride, mono-, di-, tri-basic sodium or potassium salts of phosphoric acid, salts of hydrochloric acid, sodium carbonate, sodium bisulfate, or sodium bicarbonate.

In another embodiment, a sweetener composition is provided comprising at least one sweetness enhancer and at least one sweetener in combination with at least one sweet taste improving carbohydrate additive and at least one sweet taste improving inorganic salt additive; wherein the at least one carbohydrate additive is chosen from tagatose, trehalose, galactose, rhamnose, cyclodextrin (e.g., α-cyclodextrin, β-cyclodextrin, and γ-cyclodextrin), maltodextrin (including resistant maltodextrins such as Fibersol-2™), dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, glucono-lactone, abequose, galactosamine, beet oligosaccharides, isomalto-oligosaccharides (isomaltose, isomaltotriose, panose and the like), xylo-oligosaccharides (xylotriose, xylobiose and the like), gentio-oligoscaccharides (gentiobiose, gentiotriose, gentiotetraose and the like), sorbose, nigero-oligosaccharides, fucose, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, or glucose syrup; and wherein the at least one inorganic salt additive is chosen from sodium chloride, potassium chloride, sodium dihydrogen phosphate, sodium sulfate, potassium citrate, europium chloride (EuCl$_3$), gadolinium chloride (GdCl$_3$), terbium chloride (TbCl$_3$), magnesium phosphate, magnesium sulfate, alum, magnesium chloride, mono-, di-, tri-basic sodium or potassium salts of phosphoric acid, salts of hydrochloric acid, sodium carbonate, sodium bisulfate, or sodium bicarbonate.

In another embodiment, a sweetener composition is provided comprising at least one sweetness enhancer and at least one sweetener in combination with at least one sweet taste improving carbohydrate additive, at least one sweet taste improving amino acid additive, and at least one sweet taste improving inorganic salt additive; wherein the at least one carbohydrate additive is chosen from tagatose, trehalose, galactose, rhamnose, cyclodextrin (e.g., α-cyclodextrin, β-cyclodextrin, and γ-cyclodextrin), maltodextrin (including resistant maltodextrins such as Fibersol-2™), dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, glucono-lactone, abequose, galactosamine, beet oligosaccharides, isomalto-oligosaccharides (isomaltose, isomaltotriose, panose and the like), xylo-oligosaccharides (xylotriose, xylobiose and the like), gentio-oligoscaccharides (gentiobiose, gentiotriose, gentiotetraose and the like), sorbose, nigero-oligosaccharides, fucose, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, or glucose syrup; wherein the at least one amino acid additive is chosen from aspartic acid, arginine, glycine, glutamic acid, proline, threonine, theanine, cysteine, cystine, alanine, valine, tyrosine, leucine, isoleucine, asparagine, serine, lysine, histidine, ornithine, methionine, carnitine, aminobutyric acid (alpha-, beta-, and gamma-isomers), glutamine, hydroxyproline, taurine, norvaline, sarcosine, or salts thereof; and wherein the at least one inorganic salt additive is chosen from sodium chloride, sodium sulfate, potassium citrate, europium chloride (EuCl$_3$), gadolinium chloride (GdCl$_3$), terbium chloride (TbCl$_3$), magnesium phosphate, magnesium sulfate, alum, magnesium chloride, potassium chloride, mono-, di-, tri-basic sodium or potassium salts of phosphoric acid, salts of hydrochloric acid, sodium carbonate, sodium bisulfate, or sodium bicarbonate.

In another embodiment, a sweetener composition is provided comprising at least one sweetness enhancer and at least one sweetener in combination with at least one sweet taste improving polyol additive and at least one sweet taste improving polyamino acid additive; wherein the at least one polyol additive is chosen from erythritol, maltitol, mannitol, sorbitol, lactitol, xylitol, inositol, isomalt, propylene glycol, glycerol (glycerin), threitol, galactitol, reduced isomalto-oligosaccharides, reduced xylo-oligosaccharides, reduced gentio-oligosaccharides, reduced maltose syrup, or reduced glucose syrup; and wherein the at least one polyamino acid additive is chosen from poly-L-aspartic acid, poly-L-lysine (e.g., poly-L-α-lysine or poly-L-ε-lysine), poly-L-ornithine (e.g., poly-L-α-ornithine or poly-L-γ-ornithine), poly-L-arginine, and other polymeric forms of amino acids, or salts thereof.

In another embodiment, a sweetener composition is provided comprising at least one sweetness enhancer and at least one sweetener in combination with at least one sweet taste improving protein or protein hydrolysate additive and at least one sweet taste improving inorganic salt additive; wherein the at least one sweet taste improving protein or protein hydrolysate additive is chosen from bovine serum albumin (BSA), whey protein (including fractions or concentrates thereof such as 90% instant whey protein isolate, 34% whey protein, 50% hydrolyzed whey protein, and 80% whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, theanine, asparagine, glutamine, arginine, valine, isoleucine, leucine, norvaline, methionine, proline, tyrosine, hydroxyproline, or the like), collagen (e.g., gelatin), partially hydrolyzed collagen (e.g., hydrolyzed fish collagen), and collagen hydrolysates (e.g., porcine collagen hydrolysate); and wherein the at least one sweet taste improving inorganic salt additive is chosen from sodium chloride, sodium sulfate, potassium citrate, europium chloride (EuCl$_3$), gadolinium chloride (GdCl$_3$), terbium chloride (TbCl$_3$), magnesium phosphate, magnesium sulfate, alum, magnesium chloride, potassium chloride, mono-, di-, tri-basic sodium or potassium salts of phosphoric acid, salts of hydrochloric acid, sodium carbonate, sodium bisulfate, or sodium bicarbonate.

In another embodiment, a sweetener composition is provided comprising at least one sweetness enhancer and rebaudioside A in combination with at least one sweetener other than rebaudioside-A and at least one sweet taste improving composition.

In another particular embodiment, a sweetener composition is provided comprising at least one sweetness enhancer and rebaudioside A in combination With at least one synthetic high-potency sweetener, wherein the at least one synthetic high-potency sweetener functions as a sweet taste improving composition. Non-limiting examples of suitable sweet taste improving synthetic sweetener additives include sucralose, potassium acesulfame, aspartame, alitame, saccharin, neohesperidin dihydrochalcone, cyclamate, neotame, N-[3-(3-hydroxy-4-methoxyphenyl)propyl]-L-α-aspartyl]-L-phenylalanine 1-methyl ester, N-[3-(3-hydroxy-4-methoxyphenyl)-3-methylbutyl]-L-α-aspartyl]-L-phenylalanine 1-methyl ester, N-[3-(3-methoxy-4-hydroxyphenyl)propyl]-L-α-aspartyl]-L-phenylalanine 1-methyl ester, salts thereof, and the like.

In one embodiment, a sweetener composition comprising at least one sweetness enhancer and a sweetener comprising rebaudioside-A), stevia, stevioside, mogroside IV, mogroside V, Luo Han Guo sweetener, monatin, curculin, sucralose, cyclamate, saccharin, aspartame, acesulfame potassium or other salts, or neotame, in combination with at least one sweet taste improving amino acid additive and at least one sweet taste improving polyol additive is provided. In a particular embodiment, the at least one sweet taste improving amino acid additive is present in an amount from about 100 ppm to about 25,000 ppm of the composition, and the at least one sweet taste improving polyol additive is present in an amount from about 400 to about 80,000 ppm of the composition. In a still more particular embodiment, the at least one sweet taste improving amino acid additive is glycine or alanine, and the at least one sweet taste improving polyol additive is erythritol.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving amino acid additive and at least one sweet taste improving protein or protein hydrolysate additive is provided. In a particular embodiment, the at least one sweet taste improving amino acid additive is present in an amount from about 100 to about 25,000 ppm of the composition, and the at least one sweet taste improving protein or protein hydrolysate additive is present in an amount from about 200 ppm to about 50,000 ppm of the composition. In a still more particular embodiment, the at least one sweet taste improving amino acid additive is glycine or lysine, and the at least one sweet taste improving protein or protein hydrolysate additive is a protein, a hydrolysate, or a reaction product of a hydrolysate of a protein containing glycine, alanine, serine, leucine, valine, isoleucine, proline, or threonine.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving protein or protein hydrolysate additive and at least one sweet taste improving polyol additive is provided. In a particular embodiment, the at least one sweet taste improving protein or protein hydrolysate additive is present in an amount from about 200 ppm to about 50,000 ppm of the composition, and at least one sweet taste improving polyol additive is present in an amount from about 400 to about 80,000 ppm of the composition. In a still more particular embodiment, the at least one sweet taste improving protein or protein hydrolysate additive is a protein, a hydrolysate, or a reaction product of a hydrolysate of proteins containing glycine, alanine, serine, leucine, valine, isoleucine, proline, or threonine, and the at least one sweet taste improving polyol additive is erythritol.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving carbohydrate additive is provided. In a particular embodiment, the at least one sweet taste improving carbohydrate additive is present in an amount from about 1,000 to about 100,000 ppm of the composition. In a still more particular embodiment, the composition comprises rebaudioside A and glucose, sucrose, HFCS, or D-fructose in an amount from about 10,000 ppm to about 80,000 ppm of the composition.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving polyol additive is provided. In a particular embodiment, the at least one sweet taste improving polyol additive is present in an amount from about 400 to about 80,000 ppm of the composition. In another particular embodiment, the at least one sweet taste improving polyol additive is present in an amount from about 5,000 to about 60,000 ppm of the sweetener composition. Non-limiting examples include at least one sweetness enhancer and a sweetener comprising rebaudioside-A (REBA), stevia, stevioside, mogroside IV, mogroside V, Luo Han Guo sweetener, monatin, curculin, sucralose, saccharin, cyclamate, aspartame, acesulfame potassium or other salts, or neotame, in combination with propylene glycol, erythritol, or combinations thereof.

In one embodiment, a sweetener composition comprising rebaudioside-A (with at least 50% rebaudioside A in a steviol glycoside mixture) in combination with at least one sweet taste improving polyol additive is provided. In one embodiment, the at least one sweet taste improving polyol additive comprises erythritol. In a particular embodiment of the sweetener composition, rebaudioside A is present in an amount from about 100 to about 3,000 ppm and the erythritol is present in an amount from about 400 to about 80,000 ppm of the total sweetener composition. In another embodiment of the sweetener composition, rebaudioside A is present in an amount from about 100 to about 3,000 ppm and the erythritol is present in an amount from about 5,000 to about 40,000 ppm of the total sweetener composition. In still another embodiment of the sweetener composition, rebaudioside A is present in an amount from about 100 to about 3,000 ppm and the erythritol is present in an amount from about 10,000 to about 35,000 ppm of the total sweetener composition. In another particular embodiment of the sweetener composition, rebaudioside A and erythritol are present in the sweetener composition in a ratio from about 1:4 to about 1:800, respectively. In yet another particular embodiment of the sweetener composition, rebaudioside A and erythritol are present in the sweetener composition in a ratio from about 1:20 to about 1:600, respectively; more particularly from about 1:50 to about 1:300; and still more particularly from about 1:75 to about 1:150.

In another embodiment, a sweetener composition comprising at least one sweetness enhancer and a sweetener composition comprising rebaudioside-A, stevia, stevioside, mogroside IV, mogroside V, Luo Han Guo sweetener, monatin, or curculin, in combination with at least one sweet taste improving synthetic sweetener additive is provided. In a particular embodiment, the sweetener composition comprises at least one sweetness enhancer and a sweetener comprising rebaudioside-A in combination with saccharin or acesulfame potassium or other salts in an amount from about 10 ppm to about 100 ppm of the composition.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving carbohydrate additive and at least one sweet taste improving polyol additive is provided. In a particular embodiment, the at least one sweet taste improving carbohydrate additive is present in an amount from about 1,000 to about 100,000 ppm of the composition and at least one sweet taste improving polyol additive is present in an amount from about 400 to about 80,000 ppm of the composition. Non-limiting examples include at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with glucose, fructose or sucrose and erythritol.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving inorganic salt additive is provided. Non-limiting examples include at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with sodium chloride, potassium chloride, sodium sulfate, sodium phosphate, magnesium sulfate, $KAl(SO_4)_2$ (alum), magnesium phosphate, magnesium chloride, and potassium phosphate or other combinations thereof. A particularly desirable embodiment comprises the at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with a mixture of inorganic salt additives, such as chlorides, phosphates, and sulfates of sodium, magnesium, potassium, and calcium (e.g., sodium chloride and potassium chloride; potassium phosphate and potassium chloride; sodium chloride and sodium phosphate; calcium phosphate and calcium sulfate; magnesium chloride and magnesium phosphate; and calcium phosphate, calcium sulfate, and potassium sulfate).

In a particular embodiment, a sweetener composition comprising at least one sweetness enhancer and a sweetener comprises aspartame, acesulfame potassium or other salts, and sucralose in combination with at least one sweet taste improving inorganic salt additive. In a particular embodiment, the at least one sweet taste improving inorganic salt additive is present in an amount in the range of about 25 to about 5,000 ppm of the composition. Non-limiting examples include at least one sweetness enhancer and a sweetener comprising aspartame, acesulfame potassium, and sucralose in combination with magnesium chloride; at least one sweetness enhancer and a sweetener comprising aspartame, acesulfame potassium, and sucralose in combination with magnesium sulfate; or at least one sweetness enhancer and a sweetener comprising aspartame, acesulfame potassium, and sucralose in combination with magnesium sulfate and sodium chloride.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving organic acid salt additive is provided. Non-limiting examples include at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with choline chloride in citrate buffer, D-gluconic acid sodium salt, guanidine HCl, D-glucosamine HCl, or combinations thereof.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving organic acid additive is provided. Non-limiting examples include at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with fumaric acid, malic acid, tartaric acid, citric acid, adipic acid, ascorbic acid, tannic acid, succinic acid, glutaric acid, or combinations thereof.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving amino acid additive is provided. In a particular embodiment, the at least one sweet taste improving amino acid additive is present in an amount from about 100 to about 25,000 ppm of the composition. Non-limiting examples include at least one sweetness enhancer and a sweetener comprising rebaudioside-A, stevia, stevioside, mogroside IV, mogroside V, Luo Han Quo sweetener, monatin, curculin, sucralose, saccharin, cyclamate, aspartame, acesulfame potassium or other salts, or neotame, in combination with glycine, L-alanine, L-serine, L-threonine, β-alanine, aminobutyric acid (alpha-, beta-, or gamma-isomers), L-aspartic acid, L-glutamic acid, L-lysine, glycine and L-alanine mixture, salt derivatives or combinations thereof.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving surfactant additive is provided. Non-limiting examples include at least one sweetness enhancer and a sweetener comprising rebaudioside-A, stevia, stevioside, mogroside TV, mogroside V, Luo Han Guo sweetener, monatin, curculin, sucralose, saccharin, cyclamate, aspartame, acesulfame potassium or other salts, or neotame, in combination with dioctyl sulfosuccinate sodium, cetylpyridinium chloride, hexadecyltrimethylammonium bromide, sucrose oleate, polysorbate 20, polysorbate 80, lecithin, or combinations thereof.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving polymer additive is provided. Non-limiting examples include at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with cationic polymer such as polyethyleneimine, poly-L-lysine (e.g., poly-L-α-lysine or poly-L-ε-lysine), poly-L-ornithine (e.g., poly-L-α-ornithine or poly-L-γ-ornithine), chitosan, or combinations thereof.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving polymer additive and at least one sweet taste improving polyol additive is provided. In a particular embodiment, the at least one sweet taste improving polymer additive is present in an amount from about 30 to about 2,000 ppm of the composition, and the at least one sweet taste improving polyol additive is present in an amount from about 400 to about 80,000 ppm of the composition. Non-limiting examples include at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with a hydrocolloid, such as a gum acacia seyal, and erythritol.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving protein or protein hydrolysate additive is provided. Non-limiting examples include at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with bovine serum albumin (BSA), whey protein or combinations thereof.

In one embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving amino acid additive and at least one sweet taste improving inorganic acid salt additive is provided. In a particular embodiment, the at least one sweet taste improving amino acid additive is present in an amount from about 100 to about 25,000 ppm of the composition and the at least one sweet taste improving inorganic acid salt additive is present in an amount from about 25 to about 5,000 ppm of the composition. Non-limiting examples include at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with glycine and alum; rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with glycine and potassium chloride; rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with glycine and sodium chloride; REBA in combination with glycine, potassium dihydrogen phosphate, and potassium chloride; and rebaudioside-A, stevia, stevioside, morgroside IV, morgroside V, Lo Han Guo, monatin, curculin, sucralose, saccharin, aspartame, acesulfame potassium or other salts, or neotame, in combination with glycine, sodium chloride, and potassium chloride.

In another embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving carbohydrate additive and at least one sweet taste improving inorganic acid salt additive is provided. In a particular embodiment, the at least one sweet taste improving carbohydrate additive is present in an amount from about 1,000 to about 100,000 ppm of the composition and the at least one sweet taste improving inorganic acid salt additive is present in an amount from about 25 ppm to about 5,000 ppm. Non-limiting examples include at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with fructose, sucrose, or glucose and alum; at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with fructose, sucrose, or glucose and potassium chloride; at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with fructose, sucrose, or glucose and sodium chloride; at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with fructose, sucrose, or glucose, potassium phosphate, and potassium chloride; and at least one sweetness enhancer and a sweetener comprising rebaudioside-A (REBA), stevia, stevioside, mogroside IV, mogroside V, Luo Han Guo sweetener, monatin, curculin, sucralose, saccharin, cyclamate, aspartame, acesulfame potassium or other salts, or neotame, in combination with fructose, sucrose, or glucose, sodium chloride, and potassium chloride.

In another embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving bitter additive and at least one sweet taste improving inorganic salt additive is provided. A non-limiting example include at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with urea and sodium chloride.

In another embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving amino acid additive and at least one sweet taste improving polyamino acid additive is provided. In a particular embodiment, the at least one sweet taste improving amino acid additive is present in an amount from about 100 to about 25,000 ppm of the composition and the at least one sweet taste improving polyamino acid additive is present in an amount from about 30 to about 2,000 ppm of the composition. Non-limiting examples include at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with glycine and poly-L-α-lysine; and at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with glycine and poly-L-ε-lysine.

In another embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving amino acid additive and at least one sweet taste improving organic acid additive is provided. In a particular embodiment, the at least one sweet taste improving amino acid additive is present in an amount from about 100 to about 25,000 ppm of the composition and the at least one sweet taste improving organic acid additive is present in an amount from about 10 to about 5,000 ppm of the composition. A non-limiting example includes at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with glycine and sodium gluconate.

In another embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving amino acid additive and at least one sweet taste improving carbohydrate additive is provided. In a particular embodiment, the at least one sweet taste improving amino acid additive is present in an amount from about 100 to about 25,000 ppm of the composition and the at least one sweet taste improving carbohydrate additive is present in an amount from about 1,000 to about 100,000 ppm of the composition. A non-limiting example includes at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with L-alanine and fructose.

In another embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving amino acid additive, at least one sweet taste improving polyol additive, at least one sweet taste improving inorganic salt additive, and at least one sweet taste improving organic acid salt additive is provided. In a particular embodiment, the at least one sweet taste improving amino acid additive is present in an amount from about 100 to about 25,000 ppm of the composition, the at least one sweet taste improving polyol additive is present in an amount from about 400 to about 80,000 ppm of the composition, the at least one sweet taste improving inorganic salt additive is present in an amount from about 25 to about 5,000 ppm of the composition, and the at least one sweet taste improving organic acid salt additive is present in an amount from about 20 to about 10,000 ppm of the composition. A non-limiting example includes at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with erythritol, glycine, potassium chloride, potassium phosphate, and choline chloride.

In another embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving amino acid additive, at least one sweet taste improving carbohydrate additive, and at least one sweet taste improving polyol additive is provided. In a particular embodiment, the at least one sweet taste improving amino acid additive is present in an amount from about 100 to about 25,000 ppm of the composition, the at least one sweet taste improving carbohydrate additive is present in an amount from about 1,000 to about 100,000 ppm of the composition, and the at least one sweet taste improving polyol additive is present in an amount from about 400 to about 80,000 ppm of the composition. A non-limiting example includes at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with L-alanine, fructose, and erythritol.

In another embodiment, a sweetener composition comprising at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with at least one sweet taste improving amino acid additive, at least one sweet taste improving polyol additive, and at least one sweet taste improving inorganic acid salt additive is provided. In a particular embodiment, the at least one sweet taste improving amino acid additive is present in an amount from about 100 to about 25,000 ppm of the composition, the at least one sweet taste improving polyol additive is present in an amount from about 400 to about 80,000 ppm of the composition, and the at least one sweet taste improving inorganic acid salt additive is present in an amount from about 25 to about 5,000 ppm of the composition. A non-limiting example includes at least one sweetness enhancer and a sweetener comprising rebaudioside-A, stevia, stevioside, mogroside IV, mogroside V, Luo Han Guo sweetener, monatin, curculin, sucralose, saccharin, cyclamate, aspartame, acesulfame potassium or other salts, or neotame, in combination with erythritol, glycine, potassium chloride, and potassium phosphate.

In another embodiment, a sweetener composition comprising at least one sweetness enhancer and a sweetener comprising rebaudioside-A, stevia, stevioside, mogroside IV, mogroside V, Luo Han Guo sweetener, monatin, curculin, glycyrrihizin such as mono-ammonium glycyrrhizic acid salt hydrate, sucralose, saccharin, cyclamate, aspartame, acesulfame potassium or other salts, or neotame, in combination with a sweet taste improving inorganic acid salt additive is provided. A non-limiting example includes at least one sweetness enhancer and a sweetener comprising rebaudioside-A, stevia, stevioside, mogroside IV, mogroside V, Luo Han Guo sweetener, monatin, curculin, glycyrrihizin such as mono-ammonium glycyrrhizic acid salt hydrate, sucralose, saccharin, cyclamate, aspartame, acesulfame potassium or other salts, or neotame, in combination with sodium chloride.

The desired weight ratio of the sweetness enhanced sweetener composition to sweet taste improving composition(s) in the sweetener composition will depend on the particular degree of sweetness of the sweetness enhanced sweetener composition, and the sweetness and other characteristics desired in the final product or orally ingestible composition. Commercially available sweetness enhancers generally are capable of enhancing the sweetness of sweetener compositions by about 1.5 times to about 10 times a sweetener composition without a sweetness enhancer. In addition, those of ordinary skill in the art will appreciate that high-potency sweetener compositions may vary greatly in their potencies, ranging from about 30 times more potent than sucrose to about 8,000 times more potent than sucrose on a weight basis. Thus, the weight ratio of the sweetness enhanced sweetener composition to sweet taste improving composition will vary depending on the degree of sweetness enhancement and the potency of the sweetener composition for example range from between 10,000:1 and 1:10,000; a further non-limiting example may range from about 9,000:1 to about 1:9,000; yet another example may range from about 8,000:1 to about 1:8,000; a further example may range from about 7,000:1 to about 1:7,000; another example may range from about 6,000:1 to about 1:6000; in yet another example may range from about 5,000:1 to about 1:5,000; in yet another example may range from about 4,000:1 to about 1:4,000; in yet another example may range from about 3,000:1 to about 1:3,000; in yet another example may range from about 2,000:1 to about 1:2,000; in yet another example may range from about 1,500:1 to about 1:1,500; in yet another example may range from about 1,000:1 to about 1:1,000; in yet another example may range from about 900:1 to about 1:900; in yet another example may range from about 800:1 to about 1:800; in yet another example may range from about 700:1 to about 1:700; in yet another example may range from about 600:1 to about 1:600; in yet another example may range from about 500:1 to about 1:500; in yet another example may range from about 400:1 to about 1:400; in yet another example may range from about 300:1 to about 1:300; in yet another example may range from about 200:1 to about 1:200; in yet another example may range from about 150:1 to about 1:150; in yet another example may range from about 100:1 to about 1:100; in yet another example may range from about 90:1 to about 1:90; in yet another example may range from about 80:1 to about 1:80; in yet another example may range from about 70:1 to about 1:70; in yet another example may range from about 60:1 to about 1:60; in yet another example may range from about 50:1 to about 1:50; in yet another example may range from about 40:1 to about 1:40; in yet another example may range from about 30:1 to about 1:30; in yet another example may range from about 20:1 to about 1:20; in yet another example may range from about 15:1 to about 1:15; in yet another example may range from about 10:1 to about 1:10; in yet another example may range from about 9:1 to about 1:9; in yet another example may range from about 8:1 to about 1:8; in yet another example may range from about 7:1 to about 1:7; in yet another example may range from about 6:1 to about 1:6; in yet another example may range from about 5:1 to about 1:5; in yet another example may range from about 4:1 to about 1:4; in yet another example may range from about 3:1 to about 1:3; in yet another example may range from about 2:1 to about 1:2; and in yet another example may be about 1:1; depending on the particular sweetener and sweetness enhancer selected.

It is contemplated that the combination of at least one sweetness enhancer, at least one sweetener, and at least one sweet taste improving composition may be carried out in any pH range that does not materially or adversely affect the taste of the sweetener composition or the sweetened composition. A non-limiting example of the pH range may be from about 2 to about 8. A further example includes a pH range from about 2 to about 5.

One of ordinary skill in the art may combine the at least one sweetener, at least one sweet taste improving composition, and at least one sweetness enhancer in any manner. For example, at least one sweetener and at least one sweetness enhancer may be added to the sweetener composition before the at least one sweet taste improving composition. In another example, at least one sweetener and at least one sweetness enhancer may be added to the sweetener composition after the at least one sweet taste improving composition. In yet another example, at least one sweetener and at least one sweetness enhancer may be added to the sweetener composition simultaneously with the at least one sweet taste improving composition. In another example, at least one sweetener may be added to the sweetener composition before the at least one sweet taste improving composition and at least one sweetness enhancer. In yet another example, at least one sweetener may be added to the sweetener composition after the at least one sweet taste improving composition and at least one sweetness enhancer.

In yet another embodiment, at least one sweetener may be combined with the at least one sweet taste improving composition and at least one sweetness enhancer prior to being added to a orally ingestible composition. For example, the at least one sweetener may be in a pure, diluted, or concentrated form as a liquid (e.g., solution), solid (e.g., powder, chunk, pellet, grain, block, crystalline, or the like), suspension, gas state, or combinations thereof may be contacted with the at least one sweet taste improving composition which may be in a pure, diluted, or concentrated form as a liquid (e.g., solution), solid (e.g., powder, chunk, pellet, grain, block, crystalline, or the like), suspension, gas state, or combinations thereof and with the at least one sweetness enhancer which may be in pure, diluted, or concentrated form as a liquid (e.g., solution), solid (e.g., powder, chunk, pellet, grain, block, crystalline, or the like), suspension, gas state, or combinations thereof before all are contacted with an orally ingestible composition. In yet another embodiment, when there are more than one sweetener, more than one sweet taste improving composition, or more than one sweetness enhancer, each component of the sweetener composition may be added simultaneously, in an alternating pattern, in a random pattern, or any other pattern.

IV. Tabletop Sweetener Compositions

In a particular embodiment of the present invention, the sweetener compositions comprise a tabletop sweetener composition comprising at least one sweetener in combination with: (i) at least one sweetness enhancer; (ii) at least one bulking agent; and (iii) optionally at least one sweet taste improving composition and/or anti-caking agent with improved temporal and/or flavor profile. In accordance with particular embodiments, suitable "bulking agents" include maltodextrin (10 DE, 18 DE, or 5 DE), corn syrup solids (20 or 36 DE), sucrose, fructose, glucose, invert sugar, sorbitol, xylose, ribulose, mannose, xylitol, mannitol, galactitol, erythritol, maltitol, lactitol, isomalt, maltose, tagatose, lactose, inulin, glycerol, propylene glycol, polyols, polydextrose, fructooligosaccharides, cellulose and cellulose derivatives, and the like, and mixtures thereof. Additionally, in accordance with still other embodiments of the invention, granulated sugar (sucrose) or other caloric sweeteners such as crystalline fructose, other carbohydrates, or sugar alcohols can be used as a bulking agent due to their provision of good content uniformity without the addition of significant calories. In one embodiment, a bulking agent may be used as a sweet taste improving composition.

As used herein the phrase "anti-caking agent" and "flow agent" refer to any composition which prevents, reduces, inhibits, or suppresses at least one sweetener molecule from attaching, binding, or contacting to another sweetener molecule. Alternatively, anti-caking agent may refer to any composition which assists in content uniformity and uniform dissolution. In accordance with particular embodiments, non-limiting examples of anti-caking agents include cream of tartar, calcium silicate, silicon dioxide, microcrystalline cellulose (Avicel, FMC BioPolymer, Philadelphia, Pa.), and tricalcium phosphate. In one embodiment, the anti-caking agents are present in the tabletop sweetener composition in an amount from about 0.001 to about 3% by weight of the tabletop sweetener composition.

Tabletop sweetener compositions are embodied and packaged in numerous different forms and it is intended that the tabletop sweetener compositions of the present invention may be of any form known in the art. In accordance with particular embodiments, non-limiting examples include powder form, granular form, packets, tablets, sachets, pellets, cubes, solids, and liquids.

In an embodiment, a tabletop sweetener composition comprises a single-serving (portion control) packet comprising a dry-blend of a sweetener formulation. Dry-blend formulations generally may comprise powder or granules. Although the tabletop sweetener packet may be of any size, an illustrative non-limiting example of conventional portion control tabletop sweetener packets are approximately 2.5 by 1.5 inches and hold approximately 1 gram of a sweetener composition having a sweetness equivalent to 2 teaspoons of granulated sugar (~8 g). The amount of sweetener in a dry-blend tabletop sweetener formulation will vary due to the varying potencies of different sweetness enhanced sweetener compositions. In a particular embodiment, a dry-blend tabletop sweetener formulation may comprise a natural and/or synthetic high-potency sweetener in an amount from about 1% (w/w) to about 10% (w/w) of the tabletop sweetener composition.

Solid tabletop sweetener embodiments include cubes and tablets. A non-limiting example of conventional cubes are equivalent in size to a standard cube of granulated sugar, which is approximately $2.2 \times 2.2 \times 2.2$ cm$^3$ and weigh approximately 8 grams. In one embodiment, a solid tabletop sweetener is in the form of a tablet or any other form known to those skilled in the art.

A tabletop sweetener composition may also be embodied in the form of a liquid, wherein the sweetener is combined with a liquid carrier. Suitable non-limiting examples of carrier agents for liquid tabletop sweeteners include water, alcohol, polyol, glycerin base or citric acid base dissolved in water, and mixtures thereof. Due to the varying potencies of the different sweetness enhanced sweetener compositions, the amount of the sweetness enhanced sweetener composition in a liquid tabletop sweetener formulation will also vary. The sweetness equivalent of a tabletop sweetener composition for any of the forms described herein or known in the art may be varied to obtain a desired sweetness profile. For example, a tabletop sweetener composition may comprise a sweetness comparable to that of an equivalent amount of standard sugar. In another embodiment, the tabletop sweetener composition may comprise a sweetness of up to 100 times that of an equivalent amount of sugar. In another embodiment, the tabletop sweetener composition may comprise a sweetness of up to 90 times, 80 times, 70 times, 60 times, 50 times, 40 times, 30 times, 20 times, 10 times, 9 times, 8 times, 7 times, 6 times, 5 times, 4 times, 3 times, and 2 times that of an equivalent amount of sugar.

In one embodiment, the tabletop sweetener composition may also be formulated for targeted uses, for example, in beverage, food, pharmaceutical, cosmetics, herbal/vitamins, tobacco, and in any other products which may be sweetened. For example, a tabletop sweetener composition for baking may be formulated having additional protecting agents such as encapsulants. Other forms will be readily apparent to those skilled in the tabletop sweetener art.

Commonly used methods for making powder or granulated sweetener formulations for packets include fluid bed agglomeration processes. Other methods for making tabletop sweetener compositions are well known to those of ordinary skill in the art.

Those skilled in the art appreciate that the amount of sweetness enhanced sweetener composition and amount and types of sweet taste improving composition, bulking agent, and/or anti-caking agent can be modified in order to tailor the taste of the tabletop sweetener composition to a desired profile and end use.

Specific embodiments of tabletop sweetener compositions and methods of making tabletop sweetener compositions are disclosed in U.S. patent application Ser. No. 11/555,962, filed on Nov. 2, 2006, by Prakash, et al., the disclosure of which is incorporated herein by reference in its entirety.

V. Orally Ingestible Compositions

As used herein, "orally ingestible composition" and "sweetenable composition" are synonymous and mean substances which are contacted with the mouth of man or animal, including substances which are taken into and subsequently ejected from the mouth and substances which are drunk, eaten, swallowed or otherwise ingested, and are safe for human or animal consumption when used in a generally acceptable range. These compositions include food, beverage, pharmaceutical, tobacco, nutraceutical, oral hygienic/cosmetic products, and the like. Non-limiting examples of these products include non-carbonated and carbonated beverages such as colas, ginger ales, root beers, ciders, fruit-flavored soft drinks (e.g., citrus-flavored soft drinks such as lemon-lime or orange), powdered soft drinks, and the like; fruit juices originating in fruits or vegetables, fruit juices including squeezed juices or the like, fruit juices containing fruit particles, fruit beverages, fruit juice beverages, beverages containing fruit juices, beverages with fruit flavorings, vegetable juices, juices containing vegetables, and mixed juices containing fruits and vegetables; sport drinks, energy drinks, near water and the like drinks (e.g., water with natural or synthetic flavorants); tea type or favorite type beverages such as coffee, cocoa, black tea, green tea, oolong tea and the like; beverages containing milk components such as milk beverages, coffee containing milk components, café au lait, milk tea, fruit milk beverages, drinkable yogurt, lactic acid bacteria beverages or the like; dairy products; bakery products; desserts such as yogurt, jellies, drinkable jellies, puddings, Bavarian cream, blancmange, cakes, brownies, mousse and the like, sweetened food products eaten at tea time or following meals; frozen foods; cold confections, e.g. types of ice cream such as ice cream, ice milk, lacto-ice and the like (food products in which sweeteners and various other types of raw materials are added to milk products, and the resulting mixture is agitated and frozen), and ice confections such as sherbets, dessert ices and the like (food products in which various other types of raw materials are added to a sugary liquid, and the resulting mixture is agitated and frozen); ice cream; general confections, e.g., baked confections or steamed confections such as cakes, crackers, biscuits, buns with bean-jam filling and the like; rice cakes and snacks; table top products; general sugar confections such as chewing gum (e.g. including compositions which comprise a substantially water-insoluble, chewable gum base, such as chicle or substitutes thereof, including jetulong, guttakay rubber or certain comestible natural synthetic resins or waxes), hard candy, soft candy, mints, nougat candy, jelly beans and the like; sauces including fruit flavored sauces, chocolate sauces and the like; edible gels; crèmes including butter crèmes, flour pastes, whipped cream and the like; jams including strawberry jam, marmalade and the like; breads including sweet breads and the like or other starch products; spice; general condiments including seasoned soy sauce used on roasted meats, roast fowl, barbecued meat and the like, as well as tomato catsup, sauces, noodle broth and the like; processed agricultural products, livestock products or seafood; processed meat products such as sausage and the like; retort food products, pickles, preserves boiled in soy sauce, delicacies, side dishes; snacks such as potato chips, cookies, or the like; cereal products; drugs or quasi-drugs that are administered orally or used in the oral cavity (e.g., vitamins, cough syrups, cough drops, chewable medicine tablets, amino acids, bitter-tasting drug or pharmaceutical agents, acidulants or the like), wherein the drug may be in solid, liquid, gel, or gas form such as a pill, tablet, spray, capsule, syrup, drop, troche agent, powder, and the like; personal care products such as other oral compositions used in the oral cavity such as mouth freshening agents, gargling agents, mouth rinsing agents, toothpaste, tooth polish, dentrifices, mouth sprays, teeth-whitening agents and the like; dietary supplements; tobacco products including smoke and smokeless tobacco products such as snuff, cigarette, pipe and cigar tobacco, and all forms of tobacco such as shredded filler, leaf, stem, stalk, homogenized leaf cured, reconstituted binders and reconstituted tobacco from tobacco dust, fines or ether sources in sheet, pellet or other forms, tobacco substitutes formulated from non-tobacco materials, dip or chewing tobacco; animal feed; and nutraceutical products, which includes any food or part of a food that may provide medicinal or health benefits, including the prevention and treatment of disease (e.g., cardiovascular disease and high levels of cholesterol in the blood, diabetes, osteoporosis, inflammation, or autoimmune disorders).

Generally, the amount of sweetness enhanced sweetener composition present in a sweetened composition varies widely depending on the particular type of sweetened composition and its desired sweetness. Those of ordinary skill in the art can readily discern the appropriate amount of sweetener to put in the sweetened composition.

In one embodiment, an orally ingestible composition comprises a carbonated beverage comprising at least one natural and/or synthetic high-potency sweetener, at least one sweet taste improving composition, and at least one sweetness enhancer; wherein the at least one natural and/or synthetic high-potency sweetener comprises rebaudioside A, rebaudioside B, rebaudioside C (dulcoside B), rebaudioside D, rebaudioside E, rebaudioside F, dulcoside A, rubusoside, stevia, stevioside, mogroside IV, mogroside V, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobtain, baiyunoside, osladin, polypodoside A, pterocaryoside A, pterocaryoside B, mukurozioside, phlomisoside I, periandrin I, abrusoside A, cyclocarioside I, sucralose, acesulfame potassium or other salts, aspartame, alitame, saccharin, neohesperidin dihydrochalcone, cyclamate, neotame, N-[3-(3-hydroxy-4-methoxyphenyl)propyl]-L-α-aspartyl]-L-phenylalanine 1-methyl ester, N-[3-(3-hydroxy-4-methoxyphenyl)-3-methylbutyl]-L-α-aspartyl]-L-phenylalanine 1-methyl ester, N-[3-(3-methoxy-4-hydroxyphenyl)propyl]-L-α-aspartyl]-L-phenylalanine 1-methyl ester, salts thereof, or combinations thereof; wherein the at least one sweet taste improving composition is selected from the group consisting of carbohydrates, polyols, amino acids and their corresponding salts, polyamino acids and their corresponding salts, sugar acids and their corresponding salts, organic acids, inorganic acids, organic salts, inorganic salts, bitter compounds, flavorants, astringent compounds, polymers, proteins or protein hydrolysates, surfactants, emulsifiers, flavonoids, alcohols, and combinations thereof, and wherein the at least one sweetness enhancer comprises at least one hydroxybenzoic acid, isoxazole, amide, urea, thiourea, benzisoxazole, salts thereof, or combinations thereof. Specific combinations of sweet taste improving compositions are disclosed in U.S. patent application Ser. Nos. 11/561,148 and 11/561,158.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description therein, may suggest themselves to those skilled in the art without departing from the spirit of the present invention and/or the scope of the appended claims. Unless otherwise specified, percentages (%'s) are by weight.

EXAMPLE 1

Evaluation of Sweetness Linger of Sweetness Enhanced Sweetener

An isoxazole (3 ppm) is combined with sucrose (60 g) in 1 L of carbon-treated water. Phosphoric acid (75%, 0.43 mL) is added until a pH between 2.4 and 2.5 was reached.

The same sweetness enhanced sweetener composition is combined with poly-L-lysine to evaluate the modulation of the flavor and/or temporal profile. The sweetness linger of each solution is evaluated and the effect on sweetness linger compared.

EXAMPLE 2

Evaluation of Hydroxybenzoic Acids as Sweetness Enhancers

Dihydroxybenzoic acid has been reported as enhancing the sweetness of carbohydrate sweeteners such as sucrose, glucose, and fructose. For example, PCT Publication No. WO 99/15032 discloses that a 28% sweetness enhancement is observed upon the addition of 500 ppm dihydroxybenzoic acid with 400 ppm aspartame. Bench screening tests of dihydroxybenzoic acid determined that the sweetness recognition threshold of dihydroxybenzoic acid is 500 ppm (at this level there was no perceived sweetness from the dihydroxybenzoic acid itself). Sweetness enhancement also was observed in the range of 20 to 30% for combinations of dihydroxybenzoic acid in both citrate and phosphate buffers (pH 3) with sucrose, fructose, or glucose. These results led to following experiments in which the sweetness-enhancing effects of dihydroxybenzoic acid derivatives were measured.

2-Hydroxybenzoic acid derivatives having the general chemical structure

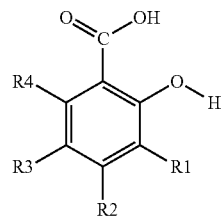

were prepared from a 2,4-dihydroxybenzoic acid solution by making substitutions on one or more of the groups $R_1$-$R_4$. For example, 2,4-dihydroxybenzoic acid (0.08 moles, 12.3 g) (Aldrich cat. #D10940-1) was dissolved in DMF (250 mL) and heated to 50-55° C. NaOH (40%, 16 mL, 0.16 mole) was added to the solution which then was heated for 1 hr at 60-70° C., concentrated under vacuum to approximately 50 mL, and diluted with DMF (200 mL). To this was added 0.08 moles of alkyl halide and the mixture was heated at 70-75° C. for 3 hr. The solvent was removed under reduced pressure and the solid residue taken up in 500 mL water and filtered. The filtrate was adjusted to pH 3 with 25% sulfuric acid and the resultant solid filtered off and washed with 100 mL cold water. The solid was air dried on the filter and recrystallized from ethanol/water (carbon treatment if necessary) to provide 2-hydroxy-4-alkoxy-benzoic acids. Typical UV absorption: 247, 290 nm. A listing of the 2-hydroxybenzoic acids prepared is provided in Table 8 below.

The hydroxybenzoic acid derivatives were tasted by themselves in water at a concentration of 3 mM prior to tasting with sucrose, glucose, or fructose to determine enhancement activities. After it was determined that the hydroxybenzoic acid derivatives themselves would contribute no sweetness, they were added to solutions with; 5% fructose, 9% glucose and 6% sucrose. These solutions were adjusted to roughly neutral pH using dilute NaOH solution. The sweetness of the fructose, glucose, and sucrose solutions were evaluated both without and with the hydroxybenzoic acid derivatives using independent sweetness intensity scales for sucrose, fructose, and glucose which were scaled according to references provided for each sweetener, Thus, for sucrose, sweetness references provided were 6, 8, and 10% sucrose and the sweetness intensities of unknown samples were scaled on this 6-10 scale. For fructose, 5, 7.5, and 9% fructose references were provided and the sweetness intensities of unknown samples were scaled on this 5-9 scale. For glucose, 9, 10.5, and 12% glucose references were provided and the sweetness intensities of unknown samples were scaled on this 9-12 scale. These results are summarized in Table 8 below, with the first number describing the sweetness rating of a solution without the hydroxybenzoic acid derivatives and the second number describing the sweetness rating of a solution with the hydroxybenzoic acid derivatives. NSE (No Significant Effect) was used to denote when the hydroxybenzoic acid derivatives did not produce a significant sweetness enhancing effect on the fructose, sucrose, or glucose solutions as compared to the fructose, sucrose, or glucose solutions without the hydroxybenzoic acid derivative.

TABLE 8

Sucrose, Fructose, and Glucose Sweetness Enhancement Effects of 2-Hydroxybenzoic Acid Derivatives

| # | R1 | R2 | R3 | R4 | Sucrose | Fructose | Glucose |
|---|---|---|---|---|---|---|---|
| 1 | OCH3 | H | H | H | NSE | NSE | NSE |
| 2 | H | OCH3 | H | H | NSE | NSE | NSE |
| 3 | H | H | OCH3 | H | NSE | NSE | NSE |
| 4 | H | H | H | OCH3 | NSE | NSE | NSE |
| 5 | OH | H | H | H | 6 => 7 | 5 => 6 | 9 => 11 |
| 6 | H | OH | H | H | 6 => 8 | 5 => 7 | 9 => 10 |
| 7 | H | H | OH | H | 6 => 7 | 5 => 6 | 9 => 12 |
| 8 | H | H | H | OH | NSE | 5 => 5 | 9 => 9 |
| 9 | H | H | H | H | 6 => 7 | 5 => 6 | 9 => 10 |
| 10 | CH3 | H | H | H | 6 => 7.5 | 5 => 6.5 | 9 => 10 |
| 11 | H | CH3 | H | H | NSE | NSE | NSE |
| 12 | H | H | CH3 | H | NSE | NSE | NSE |
| 13 | CH(CH3)2 | H | H | H | 6 => 5 | 5 => 4 | 5 => 5 |
| 14 | H | OCH2CH3 | H | H | NSE | NSE | NSE |
| 15 | Cl | H | H | H | 6 => 7 | 5 => 5 | 9 => 9 |
| 16 | H | Cl | H | H | 6 => 6 | 5 => 5 | 9 => 10 |
| 17 | H | H | Cl | H | 6 => 7 | 5 => 6 | 9 => 10 |
| 18 | NO2 | H | H | H | NSE | NSE | NSE |
| 19 | H | NO2 | H | H | 6 => 7 | 5 => 5.5 | 9 => 9.5 |

TABLE 8-continued

Sucrose, Fructose, and Glucose Sweetness Enhancement Effects of 2-Hydroxybenzoic Acid Derivatives

| # | R1 | R2 | R3 | R4 | Sucrose | Fructose | Glucose |
|---|----|----|----|----|---------|----------|---------|
| 20 | H | H | NO2 | H | NSE | NSE | 9 => 10 |
| 21 | H | OH | H | OH | 6 => 6.5 | 5 => 5.5 | 9 => 9.5 |
| 22 | H | F | H | H | 6 => 7 | 5 => 6 | 9 => 10 |
| 23 | H | H | F | H | NSE | NSE | NSE |
| 24 | H | H | H | F | NSE | NSE | NSE |
| 25 | CH3 | OH | H | H | NSE | NSE | NSE |
| 26 | OH | OH | H | H | NSE | NSE | NSE |
| 27 | SO3H | H | NH2 | H | NSE | NSE | NSE |
| 28 | NH2 | H | H | H | NSE | NSE | NSE |
| 29 | H | NH2 | H | H | 6 => 7 | NSE | 9 => 9.5 |
| 30 | H | H | NH2 | H | NSE | NSE | NSE |
| 31 | CH3 | H | CH3 | H | NSE | NSE | NSE |
| 32 | H | H | CHO | H | NSE | NSE | NSE |
| 33 | H | H | CO2H | H | NSE | NSE | NSE |
| 34 | H | O(CH2)2—CH3 | H | H | NSE | NSE | NSE |
| 35 | H | OCH2Ph | H | H | NSE | NSE | NSE |
| 36 | H | O(CH2)3-Ph | H | H | NSE | NSE | NSE |
| 37 | H | OCH2CO2CH3 | H | H | NSE | NSE | NSE |
| 38 | H | OCH2CO2H | H | H | NSE | NSE | NSE |
| 39 | H | O(CH2)2OH | H | H | NSE | NSE | NSE |
| 40 | H | O(CH2)4OH | H | H | NSE | NSE | NSE |
| 41 | H | OCH2CONH2 | H | H | NSE | NSE | NSE |

Upon addition of the hydroxybenzoic acid derivatives to the solution, enhanced sweetness was observed for selected compounds as noted in Table 8. The capability of the hydroxybenzoic acid derivatives to enhance sweetness appeared to be consistent across the three carbohydrate sweeteners tasted such that if the compound enhanced the sweetness of one carbohydrate sweetener it enhanced the sweetness of all carbohydrate sweeteners tested.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereof.

We claim:

1. A sweetener composition comprising:
at least one compound selected from the group consisting of sucrose, glucose, fructose or a combination thereof, wherein the sucrose, fructose, glucose or combination thereof is present in the sweetener composition in an amount from 1,000 ppm to 100,000 ppm; and
at least one sweetness enhancer is selected from the group consisting of 2-hydroxy-3-methylbenzoic acid; 2-hydroxy-5-chlorobenzoic acid; 2-hydroxy-4-nitrobenzoic acid; 2-hydroxy-4-fluorobenzoic acid; (R)—N-(5,7-dimethyl-1,2,3,4-tetrahydronaphthalen-1-yl)-isoxazole-5-carboxamide; (R)-4-methyl-N-(1,2,3,4-tetrahydronaphthalen-1-yl)isoxazole-5-carboxamide; (R)—N-(1,2,3,4-tetrahydronaphthalen-1-yl)isoxazole-5-carboxamide; (R)-3-chloro-2-hydroxy-N-(5-methoxy-1,2,3,4-tetrahydronaphthalen-1-yl)benzamide; 2,3,5,6-tetrafluoro-4-methyl-N-(2-methylcyclohexyl)benzamide; 2,6-dimethyl-N-(2-methylcyclohexyl)benzamide; (S)-2,3,5,6-tetrafluoro-4-methyl-N-(3-methylbutan-2-yl)benzamide; N-(4-chloro-2,6-difluorophenyl)-4-methylisoindoline-2-carboxamide; N-(2,4-dimethylphenyl)-4-methylisoindoline-2-carboxamide; N-(benzo[d][1,3]dioxol-5-yl)isoindoline-2-carboxamide; N-((1H-pyrrol-3-yl methyl)-3-(4-isopropoxyphenyl)thiourea; N-(4-ethoxyphenyl)-3-(furan-2-ylmethyl)thiourea; 3-3(hydroxyl-4-methoxyphenethyl)-4,6-hydroxybenzo[d]isoxazole; 1-(2,6-dihydroxyphenyl)-3-(3-hydroxy-4-methoxyphenyl)propan-1-one and combinations thereof,
wherein the at least one sweetness enhancer is present in the sweetener composition in an amount from 0.01 ppm to 1000 ppm.

2. The sweetener composition of claim 1, wherein the sweetener composition contains one compound selected from the group consisting of sucrose, fructose and glucose; and
two sweetness enhancers.

3. The sweetener composition of claim 1, wherein the at least one compound is sucrose.

4. The sweetener composition of claim 1, wherein the at least one compound is glucose.

5. The sweetener composition of claim 1, wherein the at least one compound is fructose.

6. The sweetener composition of claim 1, wherein the at least one sweetness enhancer is selected from the group consisting of 2-hydroxy-3-methylbenzoic acid; 2-hydroxy-5-chlorobenzoic acid; 2-hydroxy-4-nitrobenzoic acid; 2-hydroxy-4-fluorobenzoic acid and combinations thereof.

7. The sweetener composition of claim 1, wherein the at least one sweetness enhancer is selected from the group consisting of (R)—N-(5,7-dimethyl-1,2,3,4-tetrahydronaphthalen-1-yl)-isoxazole-5-carboxamide; (R)-4-methyl-N-(1,2,3,4-tetrahydronaphthalen-1-yl)isoxazole-5-carboxamide; (R)—N-(1,2,3,4-tetrahydronaphthalen-1-yl)isoxazole-5-carboxamide and combinations thereof.

8. The sweetener composition of claim 1, wherein the at least one sweetness enhancer is selected from the group consisting of (R)-3-chloro-2-hydroxy-N-(5-methoxy-1,2,3,4-tetrahydronaphthalen-1-yl)benzamide; 2,3,5,6-tetrafluoro-4-methyl-N-(2-methylcyclohexyl)benzamide; 2,6-dimethyl-N-(2-methylcyclohexyl)benzamide; (S)-2,3,5,6-tetrafluoro-4-methyl-N-(3-methylbutan-2-yl)benzamide and combinations thereof.

9. The sweetener compositions of claim 1, wherein the at least one sweetness enhancer is selected from the group consisting of N-(4-chloro-2,6-difluorophenyl)-4-methylisoindoline-2-carboxamide; N-(2,4-dimethylphenyl)-4-methyl-isoindoline-2-carboxamide; N-(benzo[d][1,3]dioxol-5-yl)isoindoline-2-carboxamide and combinations thereof.

10. The sweetener compositions of claim 1, wherein the at least one sweetness enhancer is selected from the group consisting of N-((1H-pyrrol-3-yl methyl)-3-(4-isopropoxyphenyl)thiourea, N-(4-ethoxyphenyl)-3-(furan-2-ylmethyl)thiourea and combinations thereof.

11. The sweetener composition of claim 1, wherein the at least one sweetness enhancer is selected from the group consisting of 3-3(hydroxyl-4-methoxyphenethyl)-4,6-hydroxybenzo[d]isoxazole; 1-(2,6-dihydroxyphenyl)-3-(3-hydroxy-4-methoxyphenyl)propan-1-one and combinations thereof.

12. The sweetener composition of claim 1, further comprising at least one sweet taste improving composition selected from the group consisting of carbohydrates, polyols, amino acids and their corresponding salts, sugar acids and their corresponding salts, organic acids, inorganic acids, organic salts, inorganic salts, bitter compounds, flavorants, proteins or protein hydrosylates, surfactants, emulsifyiers, flavonoids, alcohols and combinations thereof.

13. The sweetener composition of claim 12, wherein the at least one sweet taste improving composition is a polyol.

14. A sweetened composition comprising a sweetenable composition and the sweetener composition of claim 1.

15. The sweetened composition of claim 14, wherein the at least one sweetness enhancer and at least one compound selected from the group consisting of sucrose, fructose, glucose and combinations thereof are present in the sweetened composition in an amount effective for the sweetener composition to impart an osmolarity from about 10 mOsmole/L to about 500 mOsmol/L to an aqueous solution of the sweetener composition, when the at least one compound selected from the group consisting of sucrose, fructose, glucose and combinations thereof and at least one sweetener enhancer are present in the aqueous solution in an amount sufficient to impart a sweetness intensity equivalent to that of a 10% aqueous solution of sucrose by weight.

16. A method for imparting a more sugar-like temporal profile, more sugar-like flavor profile, or both, to a sweetener composition comprising combining
at least one compound selected from the group consisting of sucrose, glucose, fructose or a combination thereof, wherein the sucrose, fructose, glucose or combination thereof is present in the sweetener composition in an amount from 1,000 ppm to 100,000 ppm; and
at least one sweetness enhancer is selected from the group consisting of 2-hydroxy-3-methylbenzoic acid; 2-hydroxy-5-chlorobenzoic acid; 2-hydroxy-4-nitrobenzoic acid; 2-hydroxy-4-fluorobenzoic acid; (R)—N-(5,7-dimethyl-1,2,3,4-tetrahydronaphthalen-1-yl)-isoxazole-5-carboxamide; (R)-4-methyl-N-(1,2,3,4-tetrahydronaphthalen-1-yl)isoxazole-5-carboxamide; (R)—N-(1,2,3,4-tetrahydronaphthalen-1-yl)isoxazole-5-carboxamide; (R)-3-chloro-2-hydroxy-N-(5-methoxy-1,2,3,4-tetrahydronaphthalen-1-yl)benzamide; 2,3,5,6-tetrafluoro-4-methyl-N-(2-methylcyclohexyl)benzamide; 2,6-dimethyl-N-(2-methylcyclohexyl)benzamide; (S)-2,3,5,6-tetrafluoro-4-methyl-N-(3-methylbutan-2-yl)benzamide; N-(4-chloro-2,6-difluorophenyl)-4-methylisoindoline-2-carboxamide; N-(2,4-dimethylphenyl)-4-methylisoindoline-2-carboxamide; N-(benzo[d][1,3]dioxol-5-yl)isoindoline-2-carboxamide; N-((1H-pyrrol-3-yl methyl)-3-(4-isopropoxyphenyl)thiourea; N-(4-ethoxyphenyl)-3-(furan-2-ylmethyl)thiourea; 3-3(hydroxyl-4-methoxyphenethyl)-4,6-hydroxybenzo[d]isoxazole; 1-(2,6-dihydroxyphenyl)-3-(3-hydroxy-4-methoxyphenyl)propan-1-one and combinations thereof,
wherein the at least one sweetness enhancer is present in the sweetener composition in an amount from 0.01 ppm to 1000 ppm.

17. The method claim 16, wherein the sweetener composition contains one compound selected from the group consisting of sucrose, fructose and glucose; and
two sweetness enhancers.

18. The method of claim 16, wherein the at least one compound is sucrose.

19. The method of claim 16, wherein the at least one compound is glucose.

20. The method of claim 16, wherein the at least one compound is fructose.

21. The method of claim 16, wherein the at least one sweetness enhancer is selected from the group consisting of 2-hydroxy-3-methylbenzoic acid; 2-hydroxy-5-chlorobenzoic acid; 2-hydroxy-4-nitrobenzoic acid; 2-hydroxy-4-fluorobenzoic acid and combinations thereof.

22. The method of claim 16, wherein the at least one sweetness enhancer is selected from the group consisting of (R)—N-(5,7-dimethyl-1,2,3,4-tetrahydronaphthalen-1-yl)-isoxazole-5-carboxamide; (R)-4-methyl-N-(1,2,3,4-tetrahydronaphthalen-1-yl)isoxazole-5-carboxamide; (R)—N-(1,2,3,4-tetrahydronaphthalen-1-yl)isoxazole-5-carboxamide and combinations thereof.

23. The method of claim 16, wherein the at least one sweetness enhancer is selected from the group consisting of (R)-3-chloro-2-hydroxy-N-(5-methoxy-1,2,3,4-tetrahydronaphthalen-1-yl)benzamide; 2,3,5,6-tetrafluoro-4-methyl-N-(2-methylcyclohexyl)benzamide; 2,6-dimethyl-N-(2-methylcyclohexyl)benzamide; (S)-2,3,5,6-tetrafluoro-4-methyl-N-(3-methylbutan-2-yl)benzamide and combinations thereof.

24. The method of claim 16, wherein the at least one sweetness enhancer is selected from the group consisting of N-(4-chloro-2,6-difluorophenyl)-4-methylisoindoline-2-carboxamide; N-(2,4-dimethylphenyl)-4-methylisoindoline-2-carboxamide; N-(benzo[d][1,3]dioxol-5-yl)isoindoline-2-carboxamide and combinations thereof.

25. The method of claim 16, wherein the at least one sweetness enhancer is selected from the group consisting of N-((1H-pyrrol-3-yl methyl)-3-(4-isopropoxyphenyl)thiourea; 1-(4-ethoxyphenyl)-3-(furan-2-ylmethyl)thiourea and combinations thereof.

26. The method of claim 16, wherein the at least one sweetness enhancer is selected from the group consisting of 3-3(hydroxyl-4-methoxyphenethyl)-4,6-hydroxybenzo[d]isoxazole; 1-(2,6-dihydroxyphenyl)-3-(3-hydroxy-4-methoxyphenyl)propan-1-one and combinations thereof.

27. The method of claim 16, wherein the sweetener composition further comprises at least one sweet taste improving composition selected from the group consisting of carbohydrates, polyols, amino acids and their corresponding salts, sugar acids and their corresponding salts, organic acids, inorganic acids, organic salts, inorganic salts, bitter compounds, flavorants, proteins or protein hydrosylates, surfactants, emulsifyiers, flavonoids, alcohols and combinations thereof.

28. The method of claim 27, wherein the at least one sweet taste improving composition is a polyol.

29. The method of claim 16, wherein the at least one sweetness enhancer and at least one compound selected from the group consisting of sucrose, fructose, glucose and combinations thereof are added to the sweetened composition in an amount effective for the sweetener composition to impart an osmolarity from about 10 mOsmole/L to about 500 mOsmol/L to an aqueous solution of the sweetener composition, when the at least one compound selected from the group consisting of sucrose, fructose, glucose and combinations thereof and at least one sweetener enhancer are present in the aqueous solution in an amount sufficient to impart a sweetness intensity equivalent to that of a 10% aqueous solution of sucrose by weight.

30. A method for imparting a more sugar-like temporal profile, more sugar-like flavor profile, or both, to a sweetened composition comprising combining:
a sweetenable composition;
at least one compound selected from the group consisting of sucrose, glucose, fructose or a combination thereof, wherein the sucrose, fructose, glucose or combination thereof is present in the sweetener composition in an amount from 1,000 ppm to 100,000 ppm; and
at least one sweetness enhancer is selected from the group consisting of 2-hydroxy-3-methylbenzoic acid; 2-hydroxy-5-chlorobenzoic acid; 2-hydroxy-4-nitrobenzoic acid; 2-hydroxy-4-fluorobenzoic acid; (R)—N-(5,7-dimethyl-1,2,3,4-tetrahydronaphthalen-1-yl)-isoxazole-5-carboxamide; (R)-4-methyl-N-(1,2,3,4-tetrahydronaphthalen-1-yl)isoxazole-5-carboxamide; (R)—N-(1,2,3,4-tetrahydronaphthalen-1-yl)isoxazole-5-carboxamide; (R)-3-chloro-2-hydroxy-N-(5-methoxy-1,2,3,4-tetrahydronaphthalen-1-yl)benzamide; 2,3,5,6-tetrafluoro-4-methyl-N-(2-methylcyclohexyl) benzamide; 2,6-dimethyl-N-(2-methylcyclohexyl) benzamide; (S)-2,3,5,6-tetrafluoro-4-methyl-N-(3-methylbutan-2-yl)benzamide; N-(4-chloro-2,6-difluorophenyl)-4-methylisoindoline-2-carboxamide; N-(2,4-dimethylphenyl)-4-methylisoindoline-2-carboxamide; N-(benzo[d][1,3]dioxol-5-yl)isoindoline-2-carboxamide; N-((1H-pyrrol-3-yl methyl)-3-(4-isopropoxyphenyl)thiourea; N-(4-ethoxyphenyl)-3-(furan-2-ylmethyl)thiourea; 3-3(hydroxyl-4-methoxyphenethyl)-4,6-hydroxybenzo[d]isoxazole; 1-(2,6-dihydroxyphenyl)-3-(3-hydroxy-4-methoxyphenyl)propan-1-one and combinations thereof,
wherein the at least one sweetness enhancer is present in the sweetener composition in an amount from 0.01 ppm to 1000 ppm.

31. The method claim 30, wherein the sweetener composition contains
one compound selected from the group consisting of sucrose, fructose and glucose; and
two sweetness enhancers.

32. The method of claim 30, wherein the at least one compound is sucrose.

33. The method of claim 30, wherein the at least one compound is glucose.

34. The method of claim 30, wherein the at least one compound is fructose.

35. The method of claim 30, wherein the at least one sweetness enhancer is selected from the group consisting of 2-hydroxy-3-methylbenzoic acid; 2-hydroxy-5-chlorobenzoic acid; 2-hydroxy-4-nitrobenzoic acid; 2-hydroxy-4-fluorobenzoic acid and combinations thereof.

36. The method of claim 30, wherein the at least one sweetness enhancer is selected from the group consisting of (R)—N-(5,7-dimethyl-1,2,3,4-tetrahydronaphthalen-1-yl)-isoxazole-5-carboxamide; (R)-4-methyl-N-(1,2,3,4-tetrahydronaphthalen-1-yl)isoxazole-5-carboxamide; (R)—N-(1,2,3,4-tetrahydronaphthalen-1-yl)isoxazole-5-carboxamide and combinations thereof.

37. The method of claim 30, wherein the at least one sweetness enhancer is selected from the group consisting of (R)-3-chloro-2-hydroxy-N-(5-methoxy-1,2,3,4-tetrahydronaphthalen-1-yl)benzamide; 2,3,5,6-tetrafluoro-4-methyl-N-(2-methylcyclohexyl)benzamide; 2,6-dimethyl-N-(2-methylcyclohexyl)benzamide; (S)-2,3,5,6-tetrafluoro-4-methyl-N-(3-methylbutan-2-yl)benzamide and combinations thereof.

38. The method of claim 30, wherein the at least one sweetness enhancer is selected from the group consisting of N-(4-chloro-2,6-difluorophenyl)-4-methylisoindoline-2-carboxamide; N-(2,4-dimethylphenyl)-4-methylisoindoline-2-carboxamide; N-(benzo[d][1,3]dioxol-5-yl)isoindoline-2-carboxamide and combinations thereof.

39. The method of claim 30, wherein the at least one sweetness enhancer is selected from the group consisting of N-((1H-pyrrol-3-yl methyl)-3-(4-isopropoxyphenyl)thiourea; N-(4-ethoxyphenyl)-3-(furan-2-ylmethyl)thiourea and combinations thereof.

40. The method of claim 30, wherein the at least one sweetness enhancer is selected from the group consisting of 3-3(hydroxyl-4-methoxyphenethyl)-4,6-hydroxybenzo[d]isoxazole; 1-(2,6-dihydroxyphenyl)-3-(3-hydroxy-4-methoxyphenyl)propan-1-one and combinations thereof.

41. The method of claim 30, wherein the sweetener composition further comprises at least one sweet taste improving composition selected from the group consisting of carbohydrates, polyols, amino acids and their corresponding salts, sugar acids and their corresponding salts, organic acids, inorganic acids, organic salts, inorganic salts, bitter compounds, flavorants, proteins or protein hydrosylates, surfactants, emulsifyiers, flavonoids, alcohols and combinations thereof.

42. The method of claim 41, wherein the at least one sweet taste improving composition is a polyol.

* * * * *